(12) United States Patent
Clos et al.

(10) Patent No.: US 10,858,060 B2
(45) Date of Patent: Dec. 8, 2020

(54) ROLLER BOARD WITH ONE OR MORE USER-MANEUVERABLE TRUCKS AND NORTH-SEEKING RETURN MECHANISM

(71) Applicant: Roll, Inc., Howard Lake, MN (US)

(72) Inventors: Dave Clos, Plant City, FL (US); William Charles Vetter, Yorba Linda, CA (US); Troy A. Pongratz, Minneapolis, MN (US)

(73) Assignee: Roll, Inc., Howard Lake, MN (US)

( * ) Notice: Subject to any disclaimer, the term of this patent is extended or adjusted under 35 U.S.C. 154(b) by 5 days.

(21) Appl. No.: 16/363,561

(22) Filed: Mar. 25, 2019

(65) Prior Publication Data

US 2019/0217915 A1 Jul. 18, 2019

Related U.S. Application Data

(63) Continuation-in-part of application No. 15/897,943, filed on Feb. 15, 2018, now Pat. No. 10,238,952,
(Continued)

(51) Int. Cl.
*A63C 17/01* (2006.01)
*B62K 21/10* (2006.01)
(Continued)

(52) U.S. Cl.
CPC .............. *B62K 21/10* (2013.01); *B62K 3/002* (2013.01); *B62K 21/24* (2013.01)

(58) Field of Classification Search
CPC ... A63C 17/011; A63C 17/012; A63C 17/013; A63C 17/015
See application file for complete search history.

(56) References Cited

U.S. PATENT DOCUMENTS 3,069,182 A * 12/1962 Hufford ................. B62K 3/002
 280/87.01
3,771,811 A * 11/1973 Bueno ................... A63C 17/013
 280/87.042
(Continued)

*Primary Examiner* — Katy M Ebner
(74) *Attorney, Agent, or Firm* — DeWitt LLP

(57) ABSTRACT

A roller board device like a skateboard or scooter operated by a user with one or more user-maneuverable wheel assemblies that are automatically returned to their "true north" position is provided according to the invention. The roller board device comprises an elongated deck, at least one wheel assembly, a rotation assembly operatively engaging and extending through the opening in the deck, one end of the rotation assembly being connected to the wheel assembly positioned below the deck, the other end of the rotation assembly being connected to a user interface member extending upward beyond the top surface of the deck, and a north-seeking return mechanism secured to the deck containing an engagement member movable along a linear axis within a housing and engaging a spring disposed between the engagement member and an interior wall of the housing, the rotation assembly operatively connected to the engagement member to convert rotational movement of the rotation member into linear movement of the engagement member. When the user applies rotational force to the user engagement member to turn it to the left or right, the rotation assembly and wheel assembly are rotated in the same direction and degree to allow the roller board device to be turned, the rotated rotation assembly interacting with the engagement member of the north-seeking return mechanism to move the engagement member along its linear axis to a retracted position to compress the spring. But, when the user releases the rotational force upon the user interface member, the spring extends from its compressed state to its elongated state to move the engagement member of the north-seeking return mechanism back along the linear axis from its retracted position to its standby position, counter interacting (Continued)

US 10,858,060 B2
Page 2 with the rotation assembly to return the wheel assembly of the roller board device to its true north position.

19 Claims, 67 Drawing Sheets

Related U.S. Application Data which is a continuation-in-part of application No. 15/433,842, filed on Feb. 15, 2017, now Pat. No. 9,987,546.

(51) Int. Cl.
*B62K 3/00* (2006.01)
*B62K 21/24* (2006.01)

(56) References Cited

U.S. PATENT DOCUMENTS

| | | | | |
|---|---|---|---|---|
| 4,160,554 A | * | 7/1979 | Cooney | A63C 17/01 280/87.042 |
| 4,202,559 A | * | 5/1980 | Piazza, Jr. | A63C 17/013 280/11.27 |
| 4,230,330 A | * | 10/1980 | Muhammad | A63C 17/01 280/87.042 |
| 4,783,091 A | * | 11/1988 | Chi | A63B 22/20 280/218 |
| 4,955,626 A | * | 9/1990 | Smith | A63C 5/16 280/11.28 |
| 5,236,208 A | * | 8/1993 | Welsh | A63C 17/013 280/11.27 |
| 5,458,351 A | * | 10/1995 | Yu | A63C 17/01 280/11.28 |
| 6,341,790 B1 | * | 1/2002 | Chen | A63C 17/01 280/267 |
| 6,511,083 B1 | | 1/2003 | Tsai | |
| 8,226,095 B2 | | 7/2012 | Reyes, Jr. | |
| 8,608,185 B2 | * | 12/2013 | Bermal | A63C 17/015 280/87.042 |
| 8,925,936 B1 | * | 1/2015 | Clos | A63C 17/015 280/87.042 |
| 9,393,483 B2 | * | 7/2016 | Tan | A63C 17/011 |
| 9,987,546 B1 | | 6/2018 | Clos et al. | |
| 10,238,952 B2 | | 3/2019 | Clos et al. | |
| 2001/0040352 A1 | * | 11/2001 | Wang | A63C 17/01 280/87.01 |
| 2003/0011159 A1 | * | 1/2003 | Tsai | B62K 3/002 280/87.041 |
| 2004/0104551 A1 | * | 6/2004 | Jacobs | A63C 17/262 280/87.042 |
| 2005/0173879 A1 | * | 8/2005 | Park | A63C 17/016 280/87.041 |
| 2009/0066150 A1 | * | 3/2009 | O'Rourke, Sr. | A63C 17/013 16/18 R |
| 2009/0200764 A1 | * | 8/2009 | Jang | A63C 17/0033 280/87.042 |
| 2010/0201089 A1 | | 8/2010 | Durbin | |
| 2010/0301572 A1 | * | 12/2010 | Newton | A63C 17/12 280/11.27 |
| 2014/0070509 A1 | | 3/2014 | Chen et al. | |
| 2015/0238845 A1 | * | 8/2015 | Clayton | A63C 17/015 280/87.042 |
| 2017/0120138 A1 | * | 5/2017 | Kang | A63C 17/011 |
| 2017/0209745 A1 | * | 7/2017 | Kramer | A63C 17/265 |

* cited by examiner

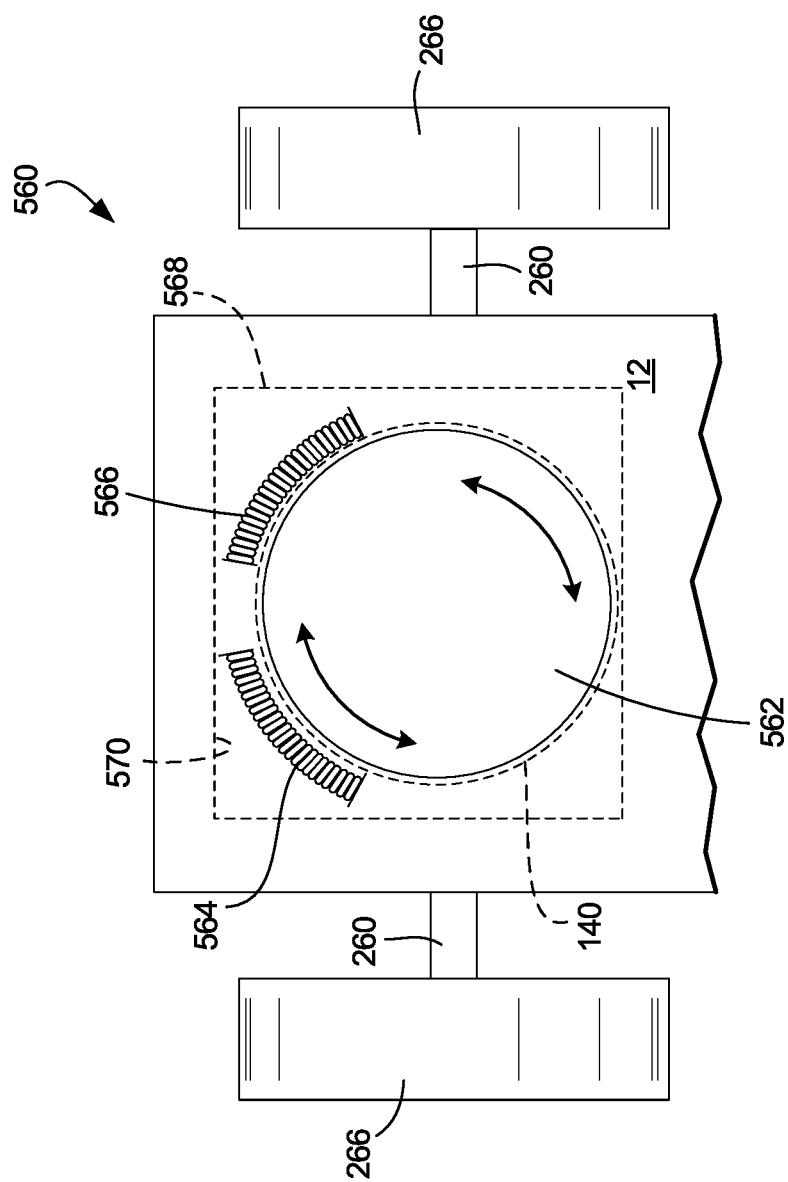

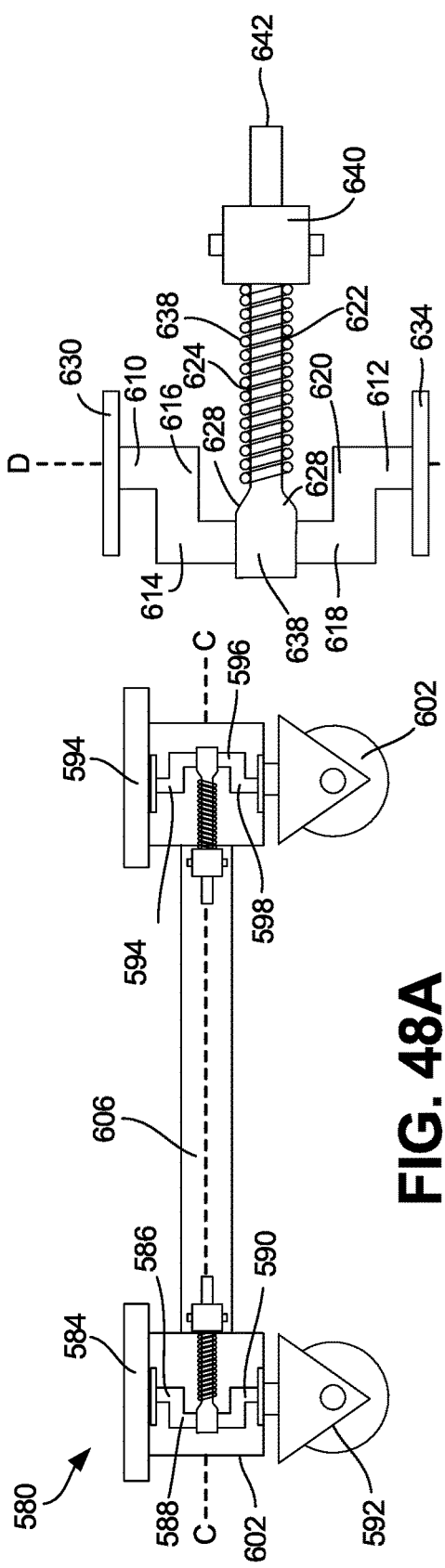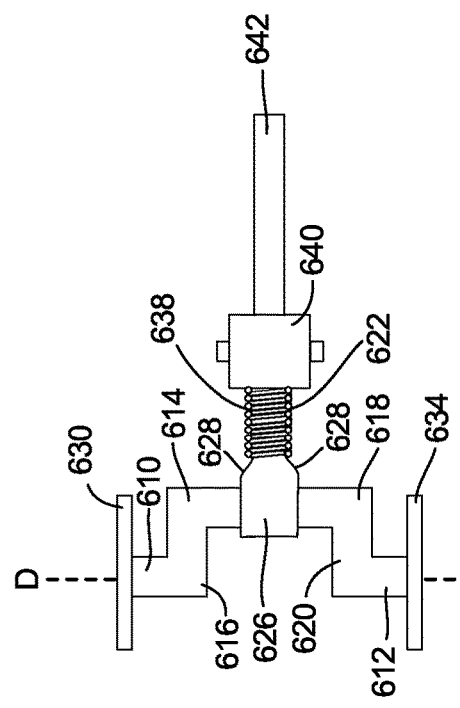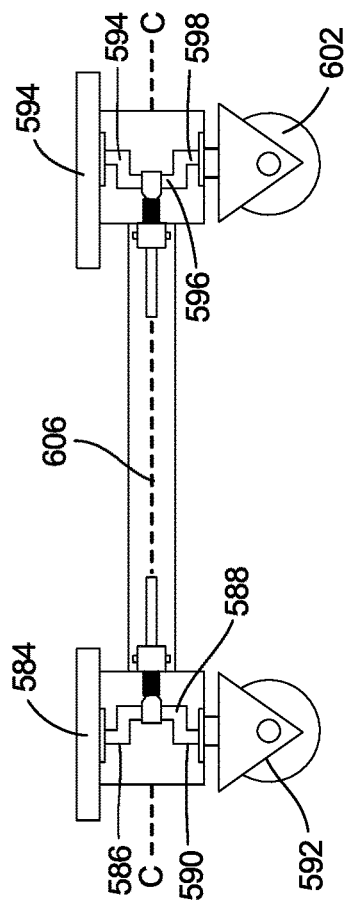

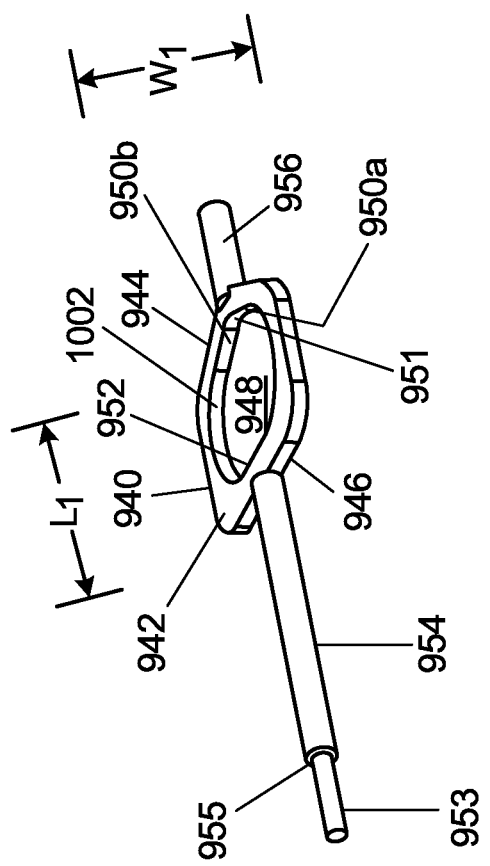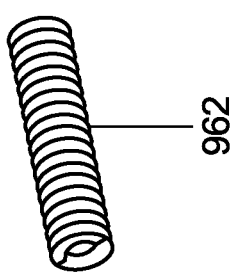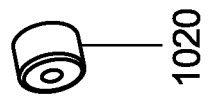
FIG. 63

ROLLER BOARD WITH ONE OR MORE USER-MANEUVERABLE TRUCKS AND NORTH-SEEKING RETURN MECHANISM

CROSS-REFERENCE TO RELATED APPLICATION

This application is a continuation-in-part of U.S. Ser. No. 15/897,943 filed on Feb. 15, 2018, which is a continuation-in-part of U.S. Ser. No. 15/433,842 filed on Feb. 15, 2017, both of which are hereby incorporated in their entirety.

FIELD OF THE INVENTION

The present invention relates to self-propelled roller boards like skateboards and scooters, and more particularly to a skateboard or scooter with one or more steerable trucks that may be independently maneuvered by the user while riding the skateboard or scooter to steer it in a desired direction, and automatically returned to their standby "true north" position once the user is no longer steering them.

BACKGROUND OF THE INVENTION

Skateboarding has become a popular recreation and sport. Derived from the late-1940's surfing scene in California as an activity for when the waves were flat, early skateboards were comparatively primitive devices comprising wooden boxes with roller skate wheels attached to their bottom surface. Eventually, the boxes were replaced by wooden planks with metal or "clay" wheels. In the early 1970's, polyurethane wheels providing significantly improved traction and performance were introduced. Such skateboards were easier to ride, increasing the popularity. Today, skateboarding represents a $4.8 billion industry with more than 11 million active skateboarders in the world. It will become an Olympic event in 2020.

The user stands with his feet on the skateboard and uses one foot to manually propel the skateboard forward. The skateboard can also be ridden downhill using gravity to propel the device.

A modern skateboard typically features a deck that is 7-10½ inches wide and 28-33 inches long. "Long" boards are usually over 36 inches long. Two metal trucks connect the wheels to the bottom surface of the deck. The wheels of the wheel assemblies rotate along an axle that runs through the hanger portion of the truck. A baseplate forms the top portion of the truck and is used to mount the truck to the deck. Rubber bushings positioned between the baseplate and the hanger cushion the truck when it is turned. Each of the wheels is mounted on its axle via two bearings.

The wheel truck assemblies are typically mounted to the skateboard in a fixed relationship without any ability to pivot the wheels to steer. Instead, the user must lean sideways while riding the skateboard to shift his center of gravity away from the skateboard to turn the skateboard to the left or right. This action requires balance and coordination by the user and can provide challenges to a beginner or novice rider.

The need for a more-maneuverable skateboard arises for a user who is engaging in skateboard tricks which has become a sport in its own right. Once content with two-dimensional freestyle tricks such as wheelies, manuals, and pivots, popular skateboard tricks have become more complicated, three-dimensional, aerial maneuvers. For example, an "ollie" jump is accomplished by snapping down the tail of the skateboard and sliding the user's front foot forward to launch the skateboard in the air. While floating in the air, the user can use his hand to hold the skateboard against his feet in a maneuver called an "indy grab." Often times, aerial rotations are combined to produce a "kick flip." Riding the skateboard's deck or truck along a street curb, ledge, or rail yields a "slide" or "grind," respectively. Specially-built skateboard parks with ramped surfaces provide the perfect environment for these highly imaginative and acrobatic aerial maneuvers, which require the user to produce quick turns on his skateboard.

U.S. Pat. No. 4,955,626 issued to Smith, et al. discloses a device comprising two skateboards connected to each other by means of a spacer element. The user stands with his left foot on the one skateboard and his right foot on the other skateboard. By shifting body weight relative to the two feet, the user can pivot the skateboards inwards or outwards with respect to the longitudinal direction of travel to execute a turn. But this device requires more balance and coordination then many users can muster.

U.S. Pat. No. 6,511,083 issued to Tsai discloses a skateboard featuring a rear wheel assembly that is fixed with respect to the longitudinal axis of the deck, and a front wheel assembly that pivots with respect to the longitudinal axis by means of a steering shaft that extends vertically from the deck. While convenient for a user riding along a street or sidewalk for recreation, this steering shaft can interfere with aerial trick maneuvers. It can also provide a safety hazard to the user.

U.S. Pat. No. 3,069,182 issued to Hufford in 1962 provides an example of a four-wheeled coaster wagon that a user rides in along a downwardly-ramped surface. The front axle assembly is mounted to turn by means of a handle bar around a vertical bolt with respect to the wagon carriage. A disc positioned between the carriage and wheel assembly provides high resistance against the front axle turning when a wheel strikes an obstruction. A compression spring connected between this disc and the bottom of the chassis of the wagon further limits the degree to which the front axle may be turned upon impact with an impediment, and biases the front wheels to their centered position. However, the limited ability of the compression spring to pull the front axle back to its "true center" position is acceptable, because the user may easily use the handle bar to steer the wagon.

More advanced skateboarders demand skateboards that are more maneuverable to allow them to perform tricks like jumps and spins. U.S. Pat. No. 4,160,554 issued to Cooney discloses a conventional skateboard having non-pivotable front and rear axle assemblies, but with a "lazy susan"-like rotating disk mounted to the top surface of the board. The user stands on top of the disk and can turn the disk and his body with respect to the independently moving skateboard as it is propelled by the user's foot in a linear direction. But the user still must rely upon leaning towards the left or right sides and shifting his weight with respect to the longitudinal axis of the skateboard to turn it, because rotating the disk does not rotate the front or rear axle assemblies. Thus, the skateboard according to Cooney does not provide the kind of maneuverability required for tricks. This is particularly the case for novice skateboarders. See also U.S. Pat. No. 4,230,330 issued to Muhammed.

U.S. Pat. No. 3,771,811 issued to Bueno does disclose a skateboard exhibiting some degree of axle maneuverability. The front axle assembly is fixed with respect to the longitudinal axis of the skateboard. The rear axle assembly pivots with respect to the skateboard and is mounted to a circular platform above the top surface of the board. The user places his left foot on the front portion of the board, and his right foot on top of the circular platform. By turning his right foot, he pivots the circular platform and the rear axle assembly mounted thereto in a crude manner to turn the skateboard. However, the user's right foot is positioned above the left foot which can throw off balance. Moreover, the large circular platform extends from the rear end of the skateboard, which interferes with the downward stomp exerted by users on the rear end of the board necessary for executing jump tricks. It is also difficult for the user to control the maneuverability of the rear axle assembly given the simple nature of the mechanism, nor does the axle assembly return to its true forward-facing position on its own.

U.S. Pat. No. 4,202,559 issued to Piazza, Jr. discloses a similar skateboard construction, but where the rear axle assembly is fixed with respect to the longitudinal axis of the skateboard, while the front axle assembly is pivotably mounted to the board by means of a hollow bearing that passes through a bearing collar affixed to the circumference of a hole formed in the board. A steering platform rests on top of the hollow bearing and above the skateboard. A torsion spring is positioned inside the hollow bearing with one end connected to the steering platform and its other end connected to the skateboard to limit the radius of pivotable steering of the front axle. The user stands with his right foot on top of the steering platform and can turn the platform with his foot to pivot the front axle assembly. When the user releases the rotational force applied to the steering platform, the torsion spring "tends to act to return the steering platform to its normal standby orientation." But this single torsion spring only provides limited ability to bias the steering platform and its axle.

U.S. Pat. No. 8,608,185 issued to Bermal discloses a skateboard truck assembly with an integrated combination of gears resembling planetary gears that allow both wheels and a caster to remain on the ground while the skateboard travels along the longitudinal axis. When the user leans to the left side or right side, the gear assembly causes the "downhill" wheel to rise in the air and the caster to be displaced so that the user can slide or drift laterally as though he were riding a snowboard down a ski slope. The raised downhill wheel will not catch any street irregularities or rocks that would stop the skateboard from rolling. While this type of skateboard provides a degree of lateral sliding maneuverability, it does not allow an axle assembly to be directly pivoted by the skateboarder with his foot to turn the skateboard.

U.S. Pat. No. 8,925,936 filed by one of the inventors of the present Application and owned by the Applicant of this Application discloses a skateboard having a user engagement member rotatably mounted inside the board that is directly connected to the truck and axle assembly. The user engagement member can be operated by the foot of a user standing on top of the moving skateboard. With two such truck and axle assemblies mounted to the skateboard, the user may turn the front and rear axles independently of each other. The trucks can be rotated 360°. But, the user still must keep track of the pivoted position of each axle with respect to the longitudinal axis of the skateboard to counter turn the user engagement member to return the axle back to its standby, forward-facing position after a turning or spinning maneuver has been executed before approaching the next maneuver. It can be difficult to counter turn the user engagement members to the axle's standby position necessary to achieve this "true north" position while the skateboard is moving, which can harm the user's confidence in executing tricks. Moreover, a skateboard having its two axle assemblies pointed in different directions will typically provide an unstable ride with the tip or tail of the skateboard nose diving. This increases the risk of wipeouts and injury to a beginner or skilled user.

Meanwhile, scooters are popular recreational vehicles for children. Consisting generally of a narrow foot board mounted between two wheels tandem with an upright steering handle attached to the front wheel, the child places one foot on the scooter board, while using the other foot to push off the ground to provide the necessary motive force. The steering handle provides direct maneuverability to the user of the front wheel. But the turned wheel does not return to its "true north" position unless it is counter turned by the user.

Thus, it would be beneficial to produce a skateboard or scooter structure having independently pivotable front and rear axle assemblies mounted to foot disks operatively turned by the user's feet standing on top of the moving skateboard where the axle assemblies automatically are returned to their true north positions with respect to the longitudinal axis of the board when the turning force is released from the user foot disks within the board. Likewise, a scooter having a front wheel that is maneuvered by a steering handle coupled with a north-seeking return mechanism when the user no longer is exerting turning force on the steering handle would also be highly beneficial.

SUMMARY OF THE INVENTION

A roller board device like a skateboard or scooter operated by a user with one or more user-maneuverable wheel assemblies that are automatically returned to their "true north" position is provided according to the invention. The roller board device comprises an elongated deck having a longitudinal axis and one or more openings extending through the deck, the deck having a top surface and a bottom surface; at least one wheel assembly comprising a truck and axle with at least one wheel rotatably mounted to the axle; a rotation assembly operatively engaging and extending through the opening in the deck, one end of the rotation assembly being connected to the wheel assembly positioned below the deck, the other end of the rotation assembly being connected to a user interface member extending upward beyond the top surface of the deck; and a north-seeking return mechanism secured to the deck, the north-seeking return mechanism having a housing containing an engagement member movable along a linear axis within the housing and engaging a spring disposed between the engagement member and an interior wall of the housing, the rotation assembly operatively connected to the engagement member to convert rotational movement of the rotation member into linear movement of the engagement member. In its true north position, the axle of the wheel assembly is substantially transverse to the longitudinal axis of the deck with the engagement member in its standby position along the linear axis inside the north-seeking return mechanism housing. When the user applies rotational force to the user engagement member to turn it to the left or right, the rotation assembly and wheel assembly are rotated in the same direction and degree to allow the roller board device to be turned, the rotated rotation assembly interacting with the engagement member of the north-seeking return mechanism to move the engagement member along its linear axis to a retracted position to compress the spring. But, when the user releases the rotational force upon the user interface member, the spring extends from its compressed state to its elongated state to move the engagement member of the north-seeking return mechanism back along the linear axis from its retracted position to its standby position, counter interacting with the rotation assembly to return the wheel assembly of the roller board device to its true north position.

In its preferred embodiment, the rotation assembly comprises a crankshaft having a drive peg extending from its bottom surface, and a crankshaft receptor having a through hole for accepting the drive peg. An opening is formed within the engagement member having a leading edge and a trailing edge, the drive peg of the crankshaft extending through the opening in the engagement member. When the rotation assembly is turned by the user force applied to the user interface member, the crankshaft and crankshaft assembly are rotated in the same direction and degree as the user interface member to turn the wheel assembly of the roller board device, and the drive peg along the rotated crankshaft bears against the trailing edge of the opening of the engagement member of the north-seeking return mechanism to move it along the linear axis to its retracted position. When the user ceases to apply rotational force to the user interface member and the spring in the north-seeking return mechanism housing expands from its compressed state, the leading edge of the opening of the engagement member bears against the drive peg to counter-rotate the crankshaft and crankshaft receptor to their standby positions, thereby returning the wheel assembly to its true-north position. One or more roller bearings may be added to the rotation assembly to enhance the reliable operation of the rotation assembly as it is turned by means of the user interface member to turn the wheel assembly of the roller board device.

In its preferred embodiment, the engagement member of the north-seeking return mechanism comprises a Scotch yoke. Moreover, at least one piston rod is provided inside the north-seeking return mechanism housing along which the engagement member is moved along the linear axis between its standby position and its retracted position. This provides additional stability for the linear motion of the engagement member so that it can be reliably moved between its standby position and its retracted position. The spring that is compressed by the engagement member as it is moved along the linear axis to its retracted position, and expands to return the engagement member along the linear axis to its standby position is preferably a compression spring.

In the case of the skateboard, the user interface member can be a foot pad attached to the top of the rotation assembly, the foot pad preferably extending slightly above the top surface of the skateboard deck to enable the user to easily find the foot pad by touch of his foot. In the case of the scooter, the user interface member can be a vertical post and handle bar extending upwardly from the scooter deck. The skateboard or scooter may feature two user-maneuverable wheel assemblies which can be operated independently of each other.

The forward edge of the opening in the engagement member can feature a V-shaped surface along which the drive peg of the crankshaft moves to facilitate return of the engagement member of the north-seeking return mechanism to its standby position and the wheel assembly to its true north position.

A limiter plate may be prepositioned within the housing of the north-seeking return mechanism with respect to the engagement member to limit the movement of the engagement member along its linear axis, and consequently the degree of rotation of the wheel assembly with respect to the longitudinal axis of the deck of the roller board device. This can be helpful to novice users who are learning how to ride a skateboard or scooter, or perform aerial tricks.

A simpler north-seeking return mechanism includes a housing attached to the bottom of the roller board deck into which the crankshaft attached to the foot pad depends. Two coil springs are also contained inside the housing. One end of each of the springs is attached to the 9:00 (left) and 3:00 (right) side positions, respectively, of the crankshaft. The other ends of the compression springs are attached to the forward interior wall of the housing.

When the user's foot turns the foot pad, e.g., in a clockwise direction, the wheel assembly will be turned in a rightward direction via the interlocking crankshaft, crankshaft receptor, truck plate, and wheel assembly that are operatively connected to the rotated foot pad. Bearings contained inside the upper and lower bearing housings ensure smooth turning operation. At the same time, the clockwise turning of the foot pad will compress one coil spring and stretch the other coil spring. When the user removes the rotational force applied by his foot to foot pad, the energy stored in the springs will cause compression spring to push the crankshaft in a counterclockwise direction, while compression spring pulls the crankshaft also in the counterclockwise direction, thereby resulting in the foot pad and wheel assembly being counter-rotated toward the true-north position. If compression springs and are properly balanced in terms of their length and resistance, this mechanism will result in the wheel assembly recovering its true-north position. This alternative north-seeking return mechanism should accommodate approximately a 90 degree range of rotation for the wheel assembly, instead of the 360 degree range of rotation permitted by the Scotch yoke of the previously described true-north return mechanism.

Yet another embodiment of a north-seeking return mechanism comprises a flat-plane crankshaft. It is vertically mounted in its housing along a vertical axis. A connecting rod comprises a piston with a circular linkage at its one end. The circular linkage surrounds the eccentrically mounted wing of the crankshaft. A foot pad is attached to the inlet crank portion of the crankshaft. The outlet crank portion 612 is attached to the truck plate of the wheel assembly. In this manner, when the user's foot rotates the foot pad in the clockwise or counterclockwise direction, the crankshaft will be rotated inside the housing in the same direction and to the same degree as the rotated foot pad, as will the wheel assembly that is connected to the outlet crank portion of the crankshaft. Meanwhile, a compression spring surrounds the piston portion of the connecting rod. Its one end touches the shoulder of the connecting rod, while its other end touches pivot block that engages the distal end of the connecting rod.

In its true-north position for the wheel assembly where its axle is traverse to axis of the deck, the vertical intermediate leg of the planar crankshaft is the furthest distance from the piston block. In this position, the connecting rod is withdrawn as fully as possible forward or rearward from the support tube of the deck. The compression spring resides in its low-energy state.

But, when the crankshaft is rotated in a clockwise or counterclockwise direction by means of the foot pad, the eccentrically-oriented wing and its vertical intermediate leg will be rotated in an arc towards the support tube. This will cause the connecting rod that is rotatably connected to the crankshaft's vertically intermediate leg by means of circular linkage end to extend into the hollow tubular support, contracting compression spring in the process.

When the user's foot releases the rotational force from the foot pad, the stored energy in the retracted compression spring will cause the spring to expand to its original length to push against the shoulder of connecting rod to extend the connecting rod outwardly from pivot block and out of the tubular support, counter-rotating the crankshaft in the process to return it to its true-north position. Thus, this north-seeking return mechanism converts the rotational movement of the crankshaft into linear movement of the connecting rod similarly to the north-seeking return mechanism translating the rotational movement of crankshaft into linear movement of Scotch yoke. Moreover, mechanism enables 360 degree rotation and counter rotation of the wheel assembly just like mechanism 42 achieves. The foot pad and wheel assembly can also be turned by the user in a counterclockwise direction with the same effect.

Still another embodiment of a north-seeking return mechanism comprises a unitary crankshaft having an offset cam lobe. It interacts with a Scotch yoke that is moved along a linear axis within a housing. A piston shaft extends from the Scotch yoke outside the housing. A single compression spring is disposed along the piston shaft between an exterior wall of the housing and a bushing or nut. When the rotation assembly is turned by the user, force is applied to the user interface member, the crankshaft is rotated in the same direction and degree as the user interface member to turn the wheel assembly of the roller board device, and the offset cam lobe of the rotated crankshaft bears against the trailing edge of an open window in the Scotch yoke of the north-seeking return mechanism to move it along the linear axis to its retracted position. When the user ceases to apply rotational force to the user interface member and the single spring in the north-seeking return mechanism expands from its compressed state, the leading edge of the opening window of the Scotch yoke bears against the offset cam lobe to counter-rotate the crankshaft to its standby position, thereby returning the wheel assembly to its true-north position. One or more roller bearings may be added to the rotation assembly to enhance the reliable operation of the rotation assembly as it is turned by means of the user interface member to turn the wheel assembly of the roller board device.

An adjustable nut may be added to the end of the piston shaft of the Scotch yoke bearing against the spring end or a bushing positioned between the spring end and the nut. The nut may be turned along the piston shaft to reduce the length of the spring in its standby state. This will increase the compression load on the spring so that the north-seeking return mechanism returns more forcefully to its standby position when the user releases the rotational force applied to the user interface, thereby allowing the compressed spring to expand to its extended, standby condition.

A set screw may be prepositioned to extend into the housing of the north-seeking return mechanism to limit the linear movement of the Scotch yoke within the housing, and consequently, the degree of rotation of the wheel assembly with respect to the longitudinal axis of the roller board device. This can be helpful to inexperienced riders learning how to ride a skateboard or scooter.

The roller board device does not have to contain a deck for the user to stand on. Instead, it may comprise an elongated structure to which the user interface, rotational assembly, and north-seeking return mechanism are operatively attached. The user stand on the user interfaces (foot pads).

BRIEF DESCRIPTION OF THE DRAWINGS

In the accompanying drawings:

FIG. 47 is a cut-away plan view of a second embodiment of the north-seeking return mechanism of the present invention.

FIG. 48A is a side view of an alternative skateboard containing a third-embodiment of the north-seeking return mechanism shown in its standby, true-north position.

FIG. 48B is a side view of an alternative skateboard containing a third-embodiment of the north-seeking return mechanism shown in its fully-retracted, true-south position.

FIG. 49A is a side view of the FIG. 48A third-embodiment of the north-seeking return mechanism shown in its standby, true-north position.

FIG. 49B is a side view of the FIG. 48B third-embodiment of the north-seeking return mechanism shown in its fully-retracted, true-south position.

FIG. 63 is perspective view of the Scotch yoke, compressions spring, bushing, and adjustable nut of the north-seeking return mechanism.

DESCRIPTION OF THE PREFERRED EMBODIMENT

A roller board device like a skateboard or scooter operated by a user with one or more user-maneuverable wheel assemblies that are automatically returned to their "true north" position is provided according to the invention. The roller board device comprises an elongated deck having a longitudinal axis and one or more openings extending through the deck, the deck having a top surface and a bottom surface; at least one wheel assembly comprising a truck and axle with at least one wheel rotatably mounted to the axle; a rotation assembly operatively engaging and extending through the opening in the deck, one end of the rotation assembly being connected to the wheel assembly positioned below the deck, the other end of the rotation assembly being connected to a user interface member extending upward beyond the top surface of the deck; and a north-seeking return mechanism secured to the deck, the north-seeking return mechanism having a housing containing an engagement member movable along a linear axis within the housing and engaging a spring disposed between the engagement member and an interior wall of the housing, the rotation assembly operatively connected to the engagement member to convert rotational movement of the rotation member into linear movement of the engagement member. In its true-north position, the axle of the wheel assembly is substantially transverse to the longitudinal axis of the deck with the engagement member in its standby position along the linear axis inside the north-seeking return mechanism housing. When the user applies rotational force to the user engagement member to turn it to the left or right, the rotation assembly and wheel assembly are rotated in the same direction and degree to allow the roller board device to be turned, the rotated rotation assembly interacting with the engagement member of the north-seeking return mechanism to move the engagement member along its linear axis to a retracted position to compress the spring. But, when the user releases the rotational force upon the user interface member, the spring extends from its compressed state to its elongated state to move the engagement member of the north-seeking return mechanism back along the linear axis from its retracted position to its standby position, counter interacting with the rotation assembly to return the wheel assembly of the roller board device to its true-north position.

Figure 1:
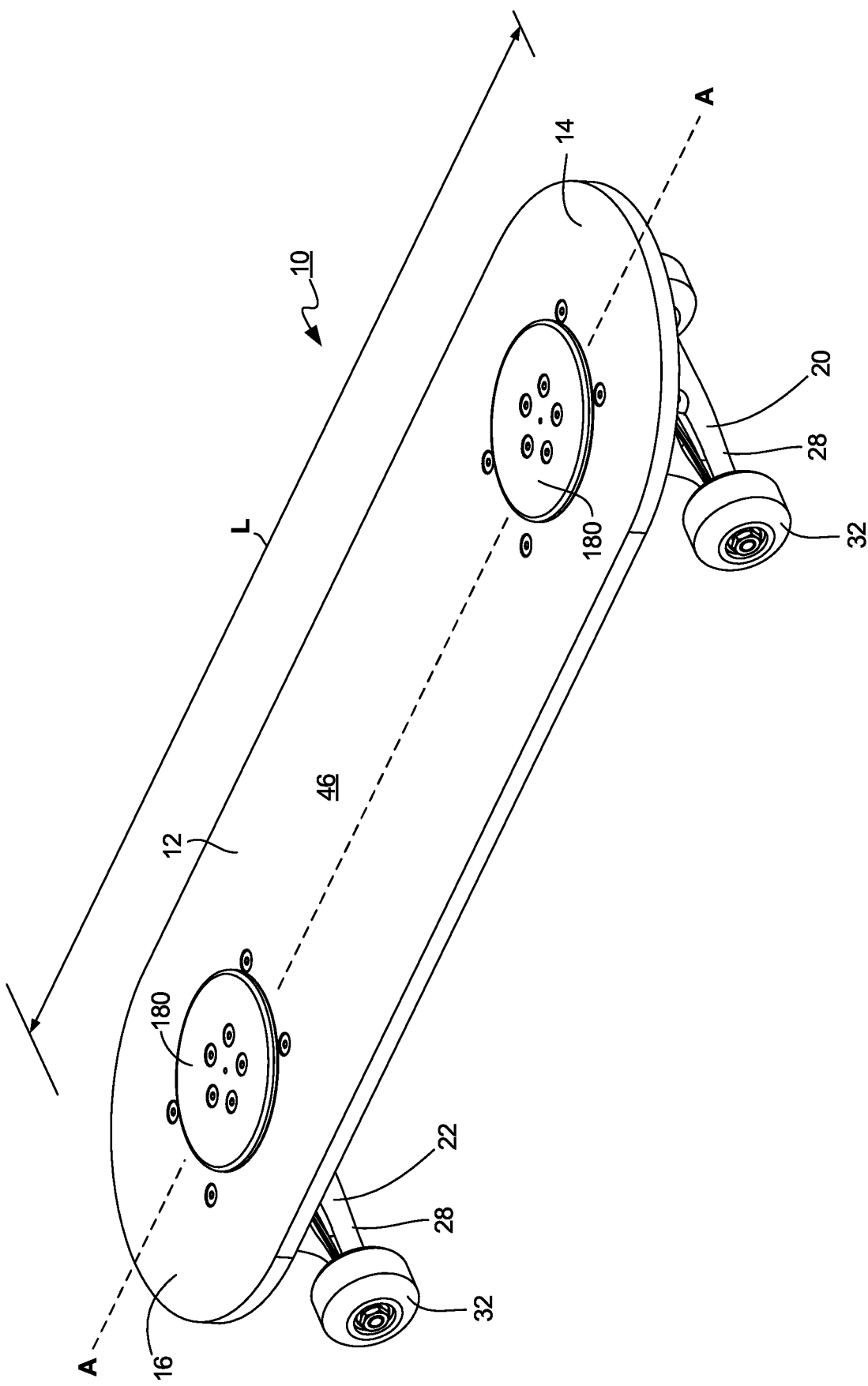
FIG. 1 is a perspective view of the skateboard having user-maneuverable trucks with a north-seeking return mechanism of the present invention.
Figure 2:
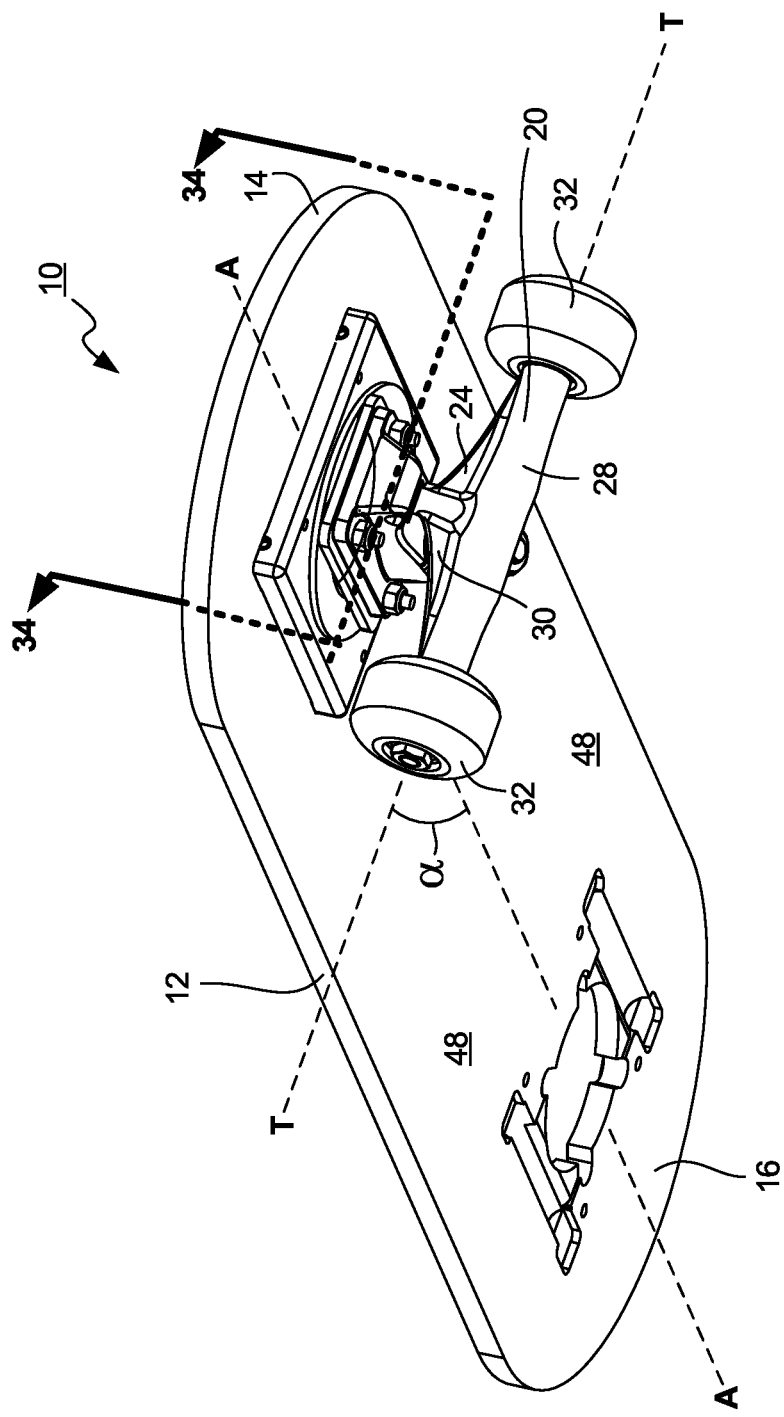
FIG. 2 is a bottom perspective view of the skateboard of FIG. 1 with the rear wheel assembly removed for the sake of clarity.

The skateboard 10 of the present invention having one or more user-maneuverable trucks and a "north-seeking" self-returning mechanism is shown in FIGS. 1-2. It comprises an elongated deck 12 made from an appropriate material such as wood, fiberglass, nylon, plastic or a Kevlar composite material. The deck 12 has a top surface 46 and a bottom surface 48. It also typically features a rounded front end 14 and a rounded rear end 16 that avoids sharp edges that could collide with a curb, wall, or other impediment where a user is riding the skateboard, or injure the user during a fall or crash. The deck 12 will be approximately 28-33 inches long for standard boards, and approximately up to 48 inches long for long boards. The deck 12 may optionally contain along all or a portion of its top surface 46 a traction panel made from a traction-providing material like abrasive coated grip tape or coating paint containing abrasive particles like sand to help to maintain the user's foot from slipping off the board. The bottom surface 48 of the deck 12 may contain graphical material used to provide an appealing design to the skateboard. If this graphical design element is added instead to the top surface 46 of the deck 12, then clear grip tape may be used for the traction panel in order not to interfere with the graphical element. Finally, the skateboard 10 has a longitudinal axis A-A running along its length L.

Mounted to the bottom surface 48 of skateboard deck 12 are a plurality of wheel assemblies 20, typically two in number shown as 20 and 22. One wheel assembly 20 should be located near the front of the deck, and the other wheel assembly 22 should be located near the rear of the deck to provide a stable ride to the user. Each wheel assembly 20, 22 comprises a truck 24 having a flat planar top surface 26, and a transverse axle 28 connected to its bottom surface 30 via a hanger 29. Wheels 32 are connected to each end of the axle 28. The wheels are made from a suitable material like polyurethane or other polymer plastic that provides traction and durability over time as the skateboard is ridden by the user on abrasive surfaces like concrete or asphalt, while also providing some measure of cushion to the user as the skateboard wheels travel over bumps along the riding surface like a street, driveway, sidewalk, trail, or ramped skateboard park. In its standby position, the transverse axle 28 is defined by transverse axis T-T which is approximately perpendicular to longitudinal axis A-A of the skateboard deck 12. In this manner, the skateboard 10 travels on its wheels in a forward or backwards direction substantially parallel to longitudinal axis A-A.

At least one of the wheel assemblies 20, 22 of skateboard 10 may be pivotable so that the transverse axis T-T of the axle 28 can be maneuvered by the user's foot to turn at an angle ∝ with respect to the longitudinal axis A-A of deck 12 that is greater than or less than 90°. This pivotable wheel assembly may be mounted to the front portion or rear portion of the skateboard. The other wheel assembly (not shown) may comprise a transverse axle 28 that is fixed with respect to the longitudinal axis A-A as is known in the prior art. Alternatively, this other wheel assembly may comprise a second pivotable wheel assembly that also can be maneuvered by the user's other foot while riding the skateboard. In the case of two such pivotable wheel assemblies 20, they may be maneuvered by the user's two feet independently with respect to each other. The pivotable wheel assemblies 20, 22 may be maneuvered by the user along a full 360° arc of motion. Alternatively, the permitted arc of motion may be restricted to less than 360°, as described below.

Figure 3:
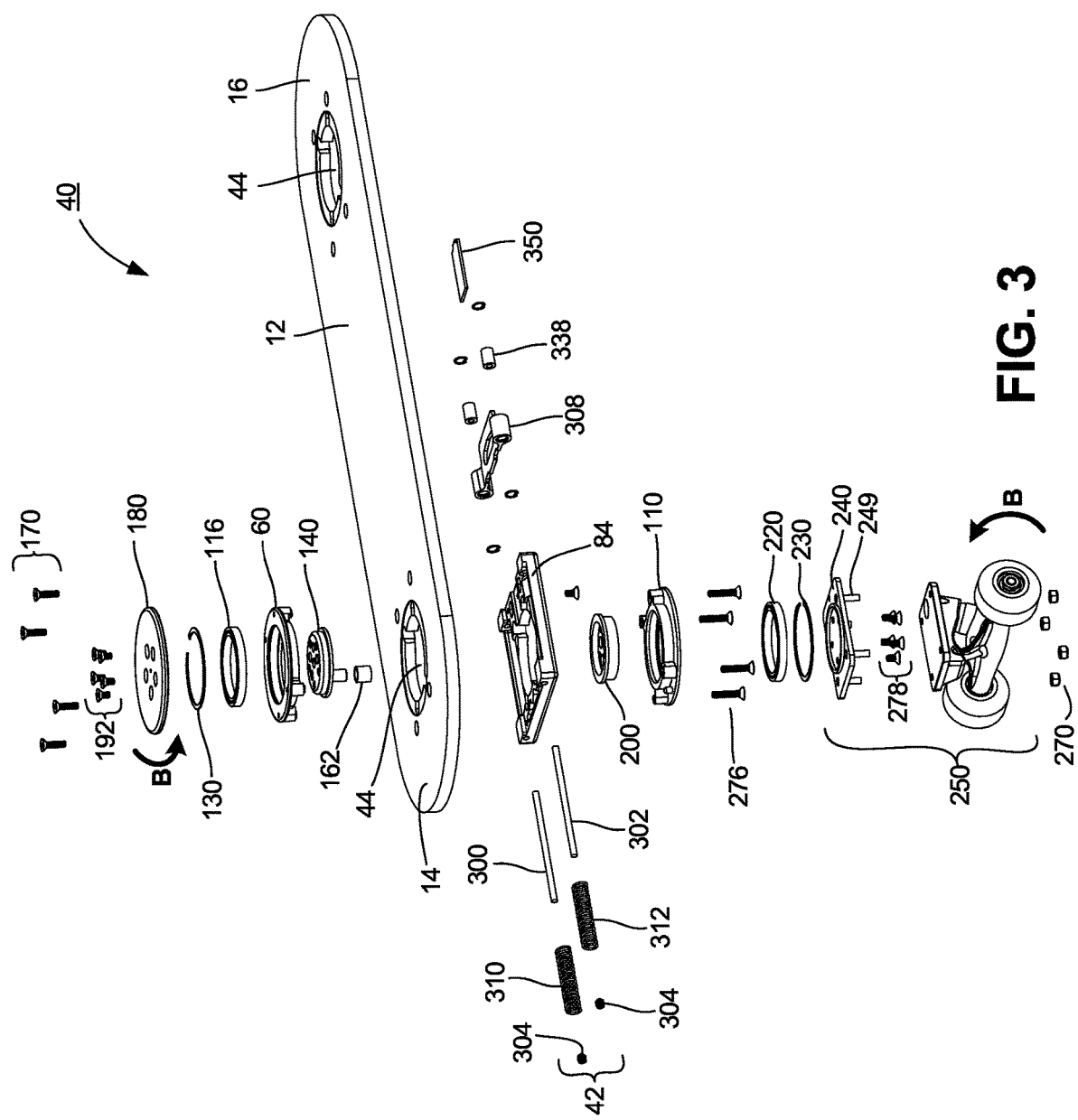
FIG. 3 is an exploded perspective view of the skateboard of the present invention.
Figure 4:
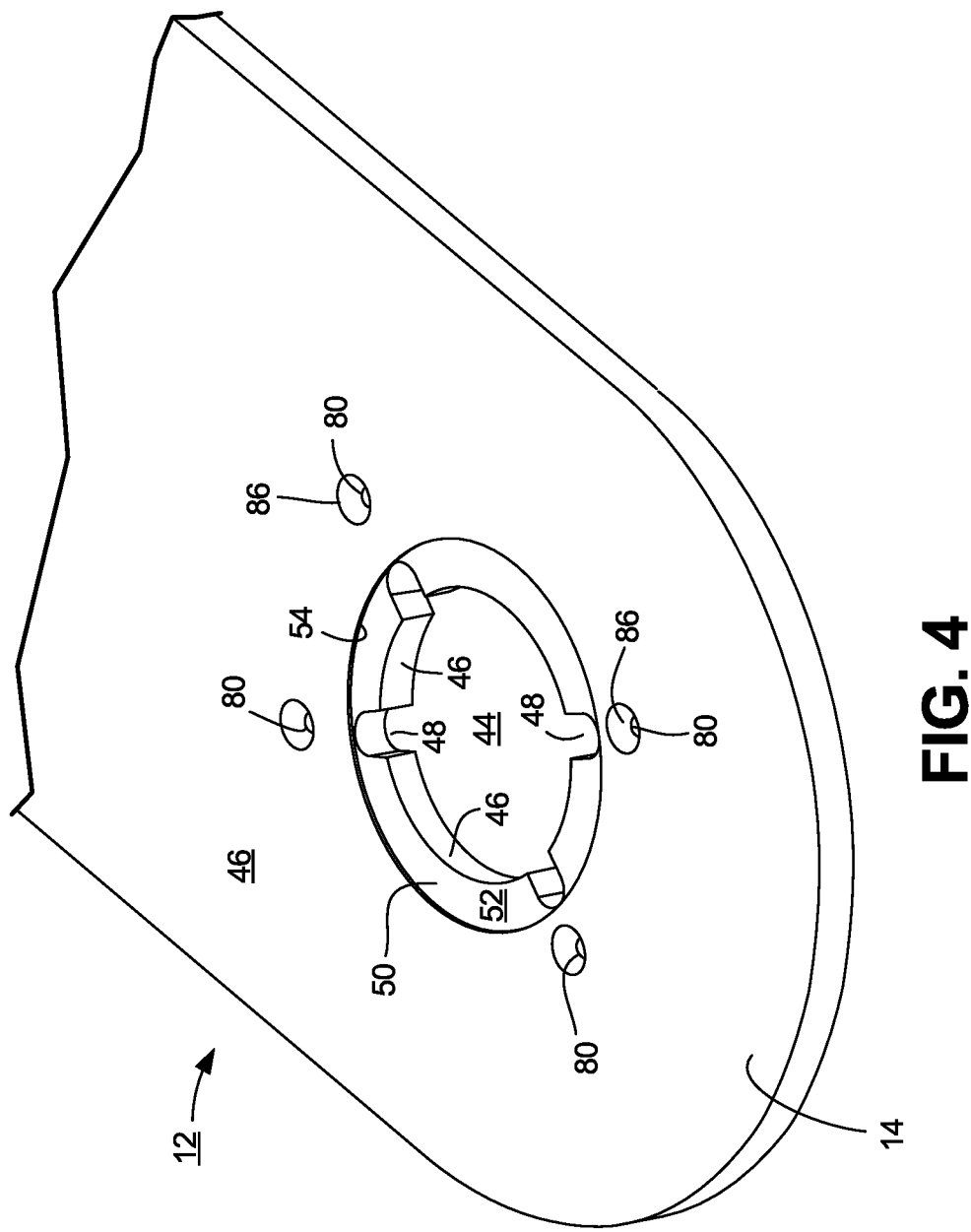
FIG. 4 is a top partial perspective view of the skateboard deck for the skateboard.

The skateboard assembly 40 of the present invention having user-maneuverable wheel assemblies 20, 22 and a north-seeking return mechanism 42 are shown in the exploded view of FIG. 3. In the case where the skateboard 10 features two user-maneuverable wheel assemblies 20, 22, the deck 12 of the skateboard comprises a pair of openings 44. As shown more clearly in FIGS. 4-5, each opening is preferably circular in shape defined by inner wall 46, although any other shape will suffice. The inner wall 46 is interrupted by a plurality, preferably four, of ears 48 extending outwardly from the inner wall ring 46. Annular ledge 50 having bottom surface 52 and sidewall 54 is formed within the upper portion of the deck surrounding the perimeter of the inner wall ring (see FIG. 4).

Figure 5:
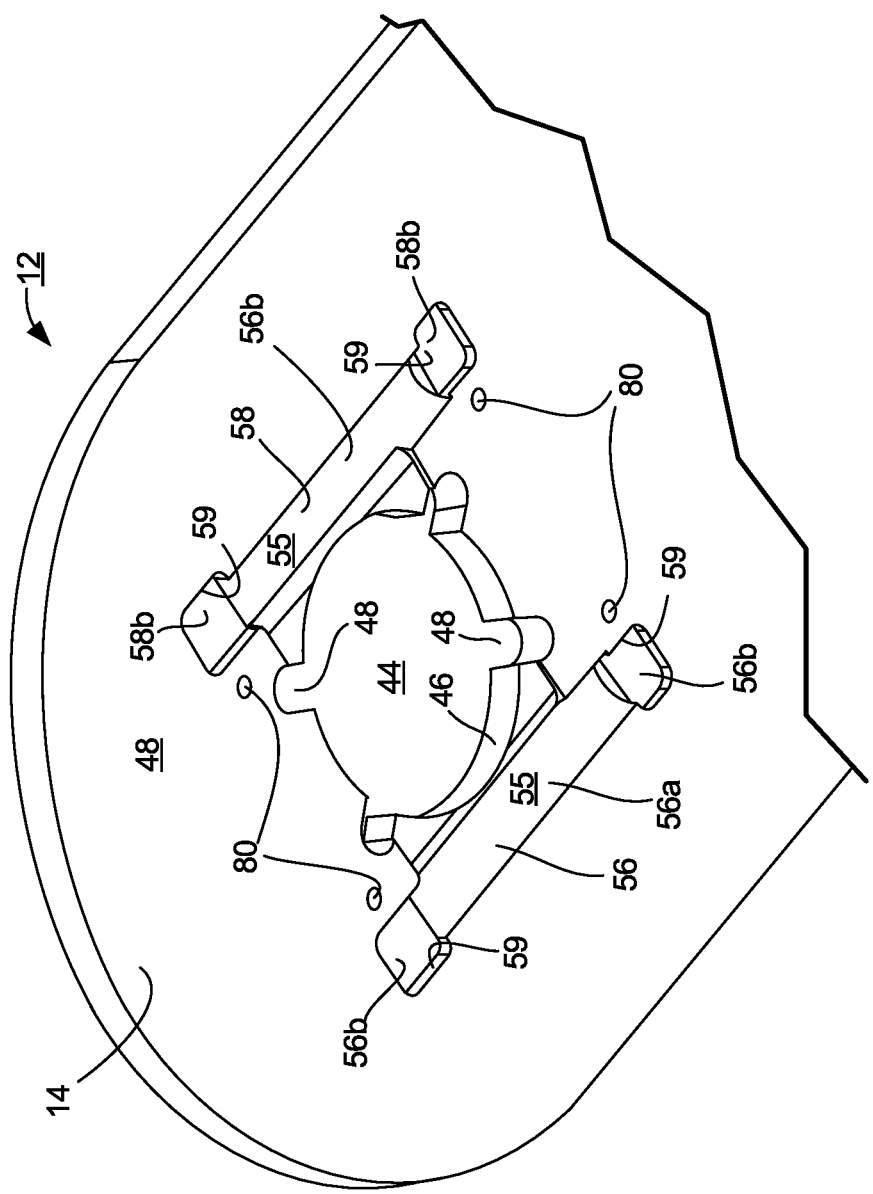
FIG. 5 is a bottom partial perspective view of the skateboard deck of FIG. 4.

As shown more clearly in FIG. 5, the bottom surface 48 of the skateboard deck 12 features a pair of partially-recessed regions 56 and 58 positioned along each side of opening 44 running parallel to the longitudinal axis A-A of the deck. The regions extend partially into the bottom surface of the deck 12 and features partially-cylindrical recessed central portions 56a and 58a terminating in recessed square end portions 56b and 58b at each end of the central portions 56a and 56b. These square regions 56b and 58b are partially depressed into the deck 12. Perimeter walls 59 are formed within the deck 12 around the square perimeters of the square recessed regions 56b and 58b and the bottom surface 48 of the deck. These perimeter walls are preferably ⅜ inch high and provide abutment surfaces for securing in place the square corner bosses 88 of the housing 84 for the north-seeking return mechanism 42, as described below. Note that other shapes for recessed regions 56b and 58b are possible as long as they mirror the shaped features of the housing 84. Meanwhile, partially cylindrically-shaped recessed regions 56a and 56b of the deck 12 cooperate with partially recessed wells 94 and 95 formed in housing 84 to provide cylindrical chambers for the springs of the north seeking return mechanism 42, as described more fully below.

Figure 6:
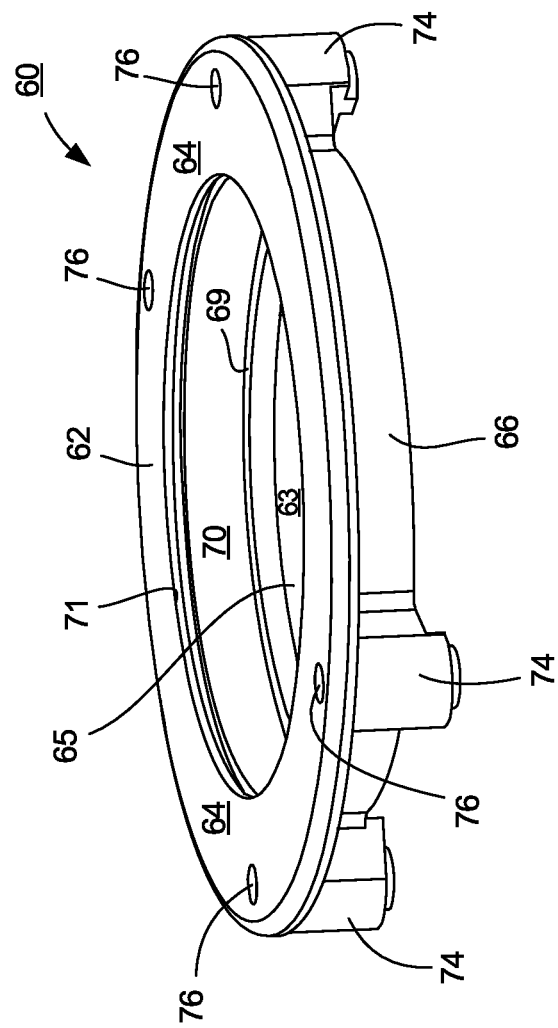
FIG. 6 is a top perspective view of the upper bearing housing for the skateboard.
Figure 7:
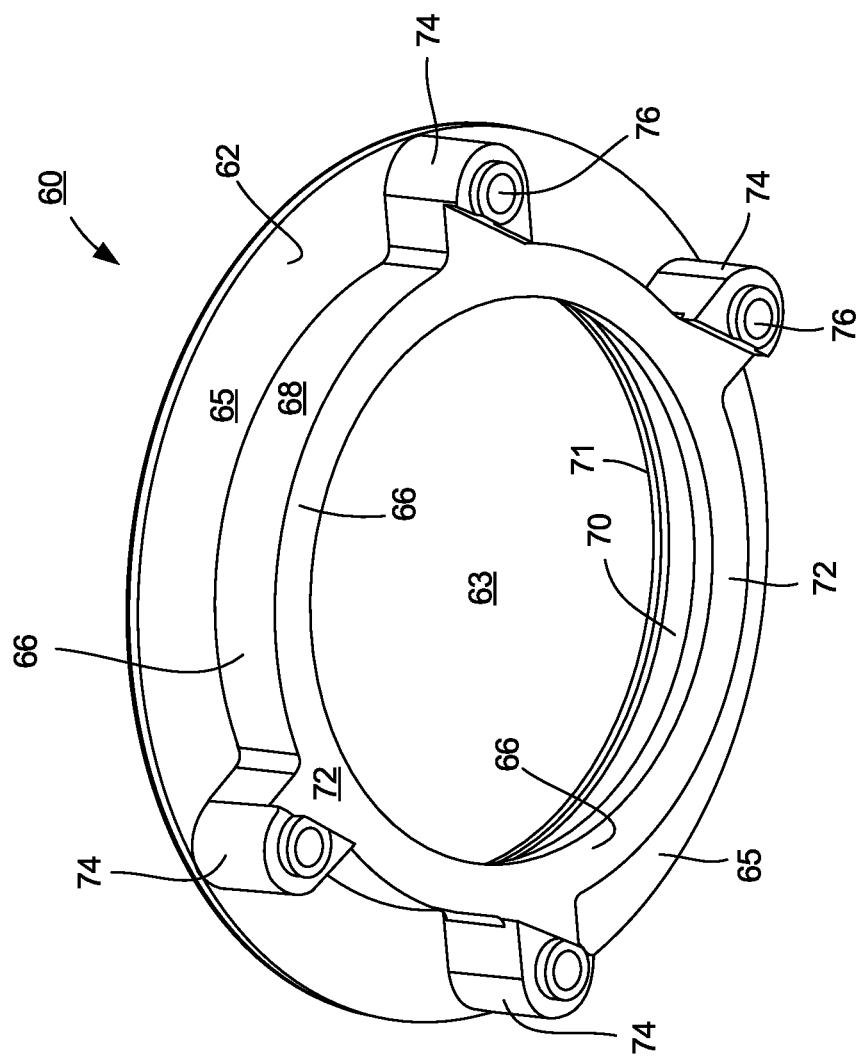
FIG. 7 is a bottom perspective view of the upper bearing housing of FIG. 6.

Bearing housing 60 is shown more clearly in FIGS. 6-7. It comprises a disk portion 62 having a top surface 64 and a bottom surface 65. Disk 62 has a circular opening 63. Extending downwardly from the disc portion is annular ring wall 66 having an outer surface 68, inner surface 70, and bottom planar surface 72. Four lugs 74 extend outwardly from annular ring wall 66 with their rounded outside surfaces contributing to the outer perimeter of annular ring wall 66. Through bores 76 extend downwardly through the lugs 74.

The diameter of opening 63 of bearing housing is approximately 2-2½ inches. The height of surface 67 of the inner surface 70 of annular ring wall 66 is approximately ⅜ inches.

The bearing housing 60 may be made from any suitable material providing the required combination of strength and lightweightness like aluminum, steel, polycarbonate, or polyethylene. It is preferably formed from cast aluminum.

Figure 8:
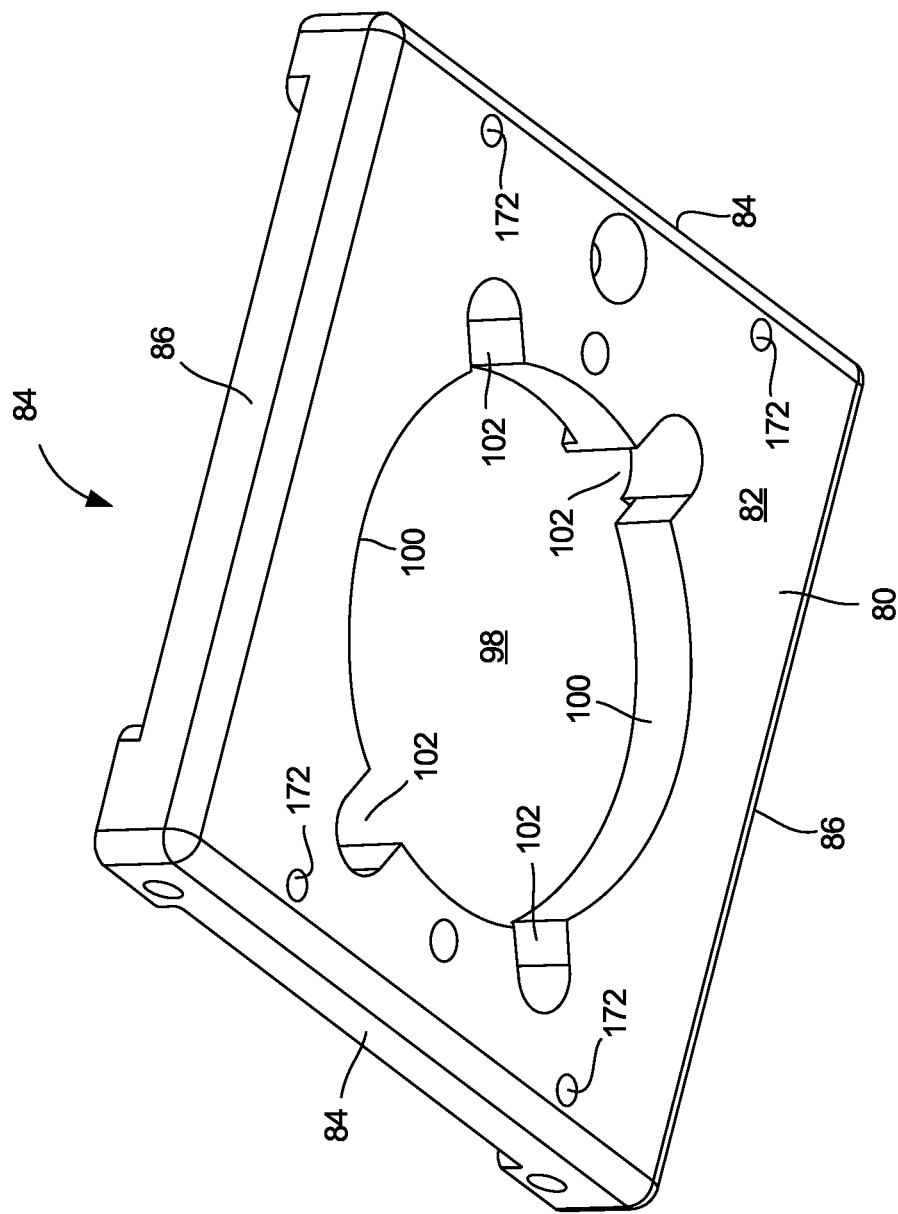
FIG. 8 is a bottom perspective view of the north-seeking return mechanism housing for the skateboard.
Figure 9:
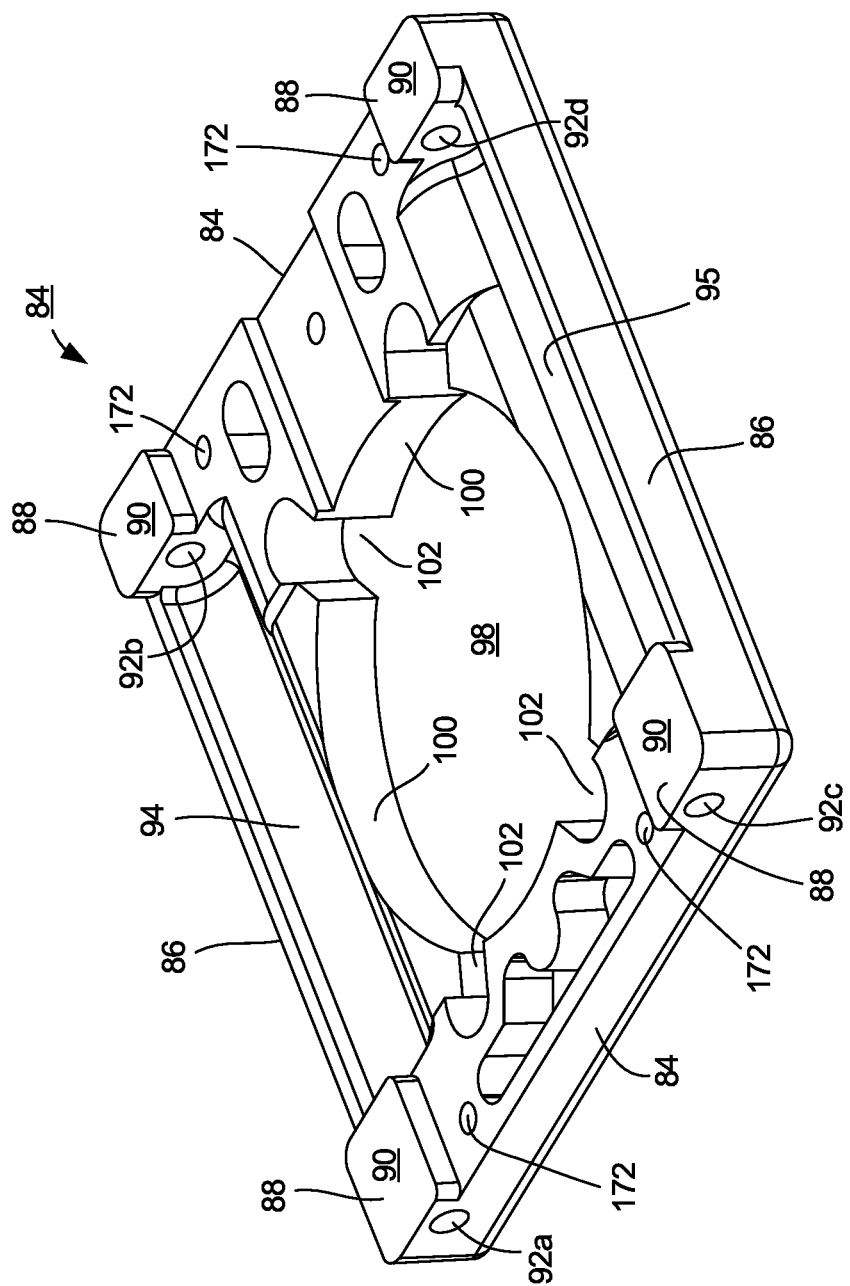
FIG. 9 is a top perspective view of the housing of FIG. 8.

The housing 84 for the north-seeking return mechanism 42 for the user-maneuverable wheel assembly is shown in greater detail in FIGS. 8-9. It comprises a main body 80 having a flat exterior surface 82 and sidewalls 84 and 86. Square-shaped bosses 88 extend upwardly from the four corners of sidewalls 84 and 86. The bosses 88 have a flat planar bottom surface 90. Channel 92 extends through the side of each boss with channels 92a and 92b being co-axial. Channels 92c and 92d likewise are co-axial. Open-faced wells 94 that constitute a roughly half cylinder are formed within sidewalls 86 between the square bosses.

Main body 80 of housing 84 also has a circular opening 98 defined by inner wall 100 that is interrupted by a plurality, preferably four, of ears 102 extending outwardly from inner wall ring 100. The main housing body 80 may be made from a 3D-printed polymer material like polycarbonate. But it is preferably formed from cast aluminum due to the combination of strength and lightweightness of this material. The circular opening 98 is approximately 2½-3 inches in diameter. The rounded region 103 of ears 102 is approximately ⅜ inch in diameter. The inner ring wall 102 and interior surface of ears 102 need only be approximately 1/16 inch tall to provide an abutment surface for the annular ring wall 66 and lugs 74 of the bearing housing.

Another shape besides a circle can be used for opening 98 and inner ring wall 100. However, the openings 98 and 44, ring walls 100 and 46, and ears 102 and 48 for the respective housing 84 and skateboard deck 12 should be similar in shape and dimensions to coordinate with the shape and dimensions of annular ring wall 66 and lugs 74 of bearing housing 60.

Figure 10:
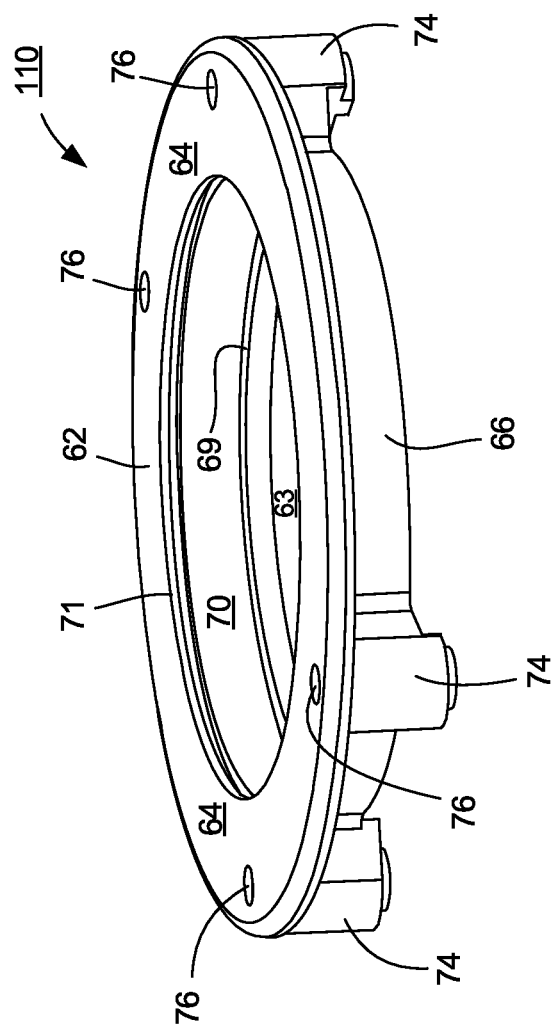
FIG. 10 is a bottom perspective view of the lower bearing housing for the skateboard.
Figure 11:
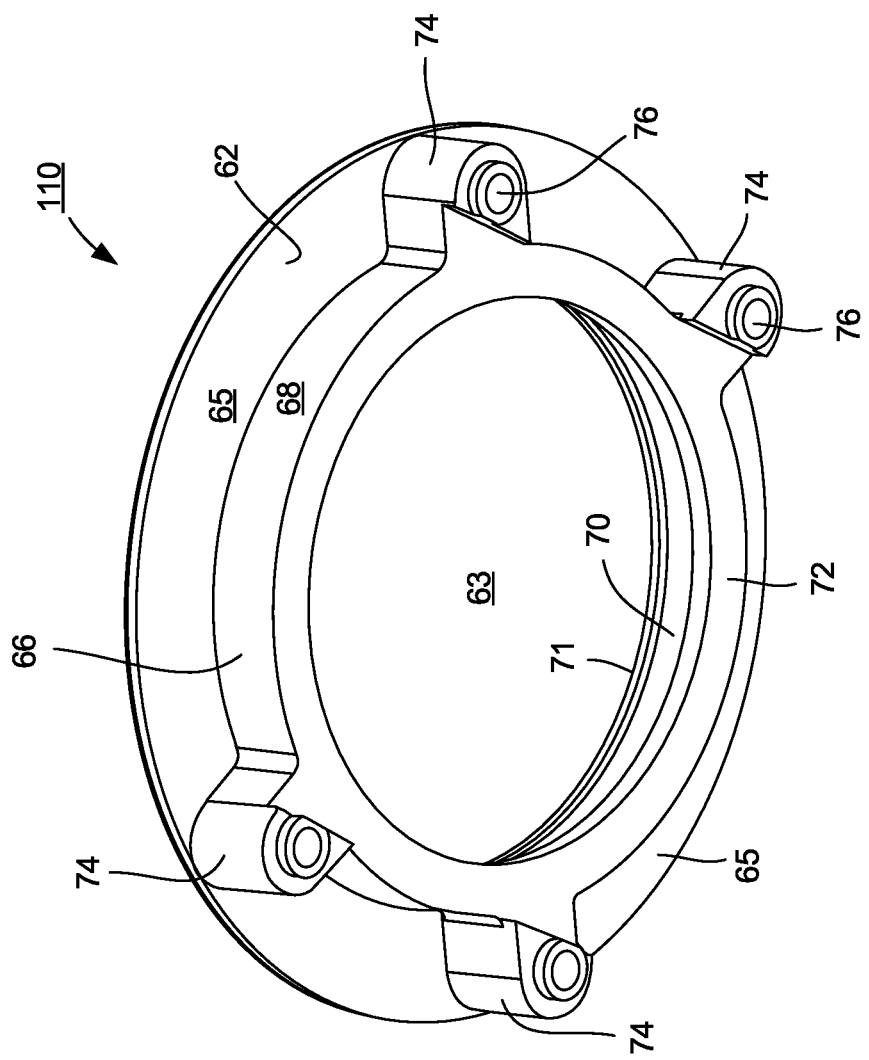
FIG. 11 is a top perspective view of the lower bearing housing of FIG. 10.

Lower bearing housing 110 is shown in FIGS. 10-11. It preferably is made of the same design, shape, and dimensions as those pertaining to upper bearing housing 60. The same numbers for the various parts of upper bearing housing 60 shown in FIGS. 6-7 are therefore used for the corresponding parts of lower bearing housing shown in FIGS. 10-11.

Figure 12:
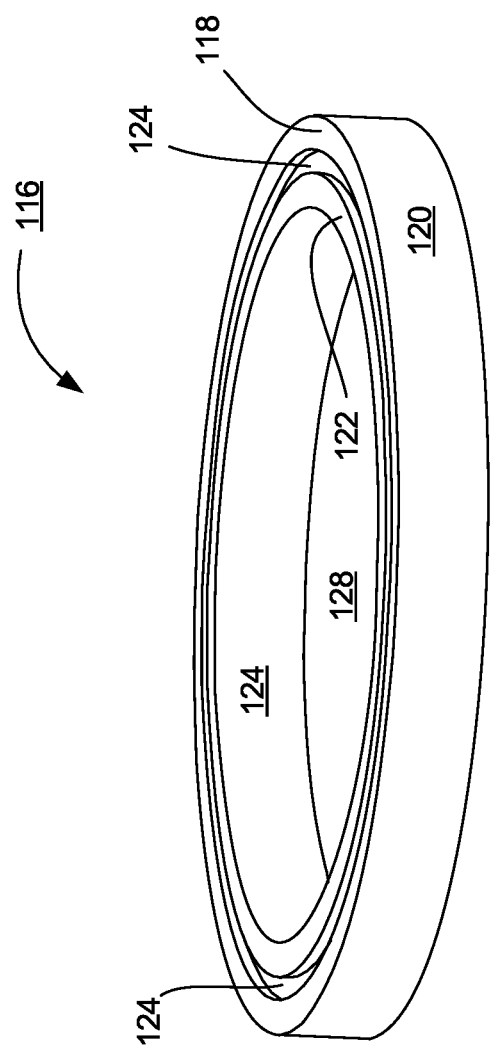
FIG. 12 is a perspective view of the roller bearing for the upper bearing housing and lower bearing housing for the skateboard.

Upper bearing 116 is shown in FIG. 12. It comprises a roller bearing mechanism that is known in the art. It is preferably circular in shape having an outer ring wall 118 called a "race" with an exterior surface 120 and an inner ring wall 122 with an inner surface 124. The outer ring wall 118 and inner ring wall 122 cooperate to define an annular channel 124 there between. A plurality of spherical ball bearings 126 made from hardened steel (not shown) are positioned inside annular channel 124 around the perimeter of the roller bearing 116. Such a roller bearing 116 may be sourced from the Silverthin Bearings Group of Mechatronics, Inc. of Preston, Wash. The ball bearings come with the roller bearing product.

Figure 13:
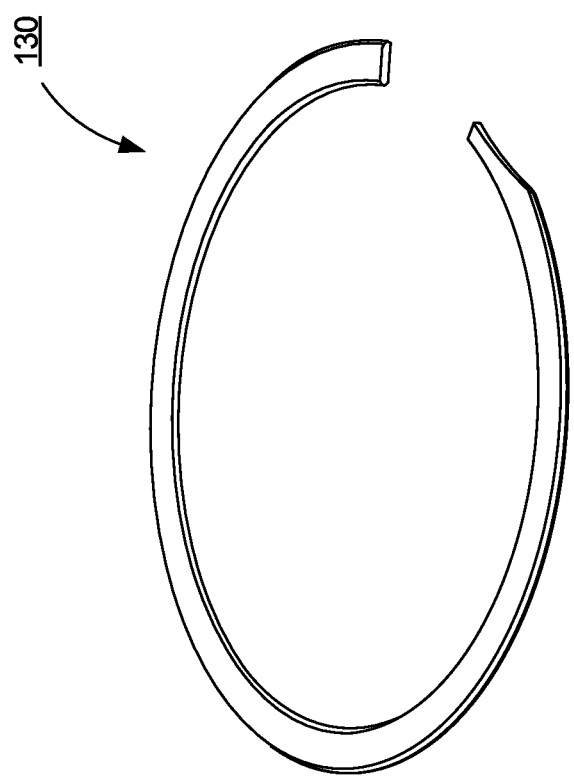
FIG. 13 is a perspective view of the snap ring for the upper bearing housing and lower bearing housing for the skateboard.

Upper roller bearing 116 is press fit into the cylindrical chamber 65 formed inside upper bearing housing 60 defined by sidewall 70 and bottom ledge wall 69, and peripheral lip 71. In this manner, exterior surface 120 of roller bearing 116 abuts sidewall 70 of upper bearing housing chamber 65, while the bottom surface of roller bearing 116 abuts bottom ledge wall 69 of upper bearing housing 60. Peripheral lip 71 of the upper bearing housing 60 extends partially over the top of roller bearing 116 to keep it securely in position inside chamber 65 of upper bearing housing 60. Snap ring 130 (see FIG. 13) is then snapped into position to engage peripheral lip 71 of the bearing housing and keep roller bearing 116 in a fixed relationship to the upper bearing housing 60. The plurality of ball bearings 126 contained inside annular channel 124 (not shown) extend above the roller bearing inside chamber 65.

Figure 14:
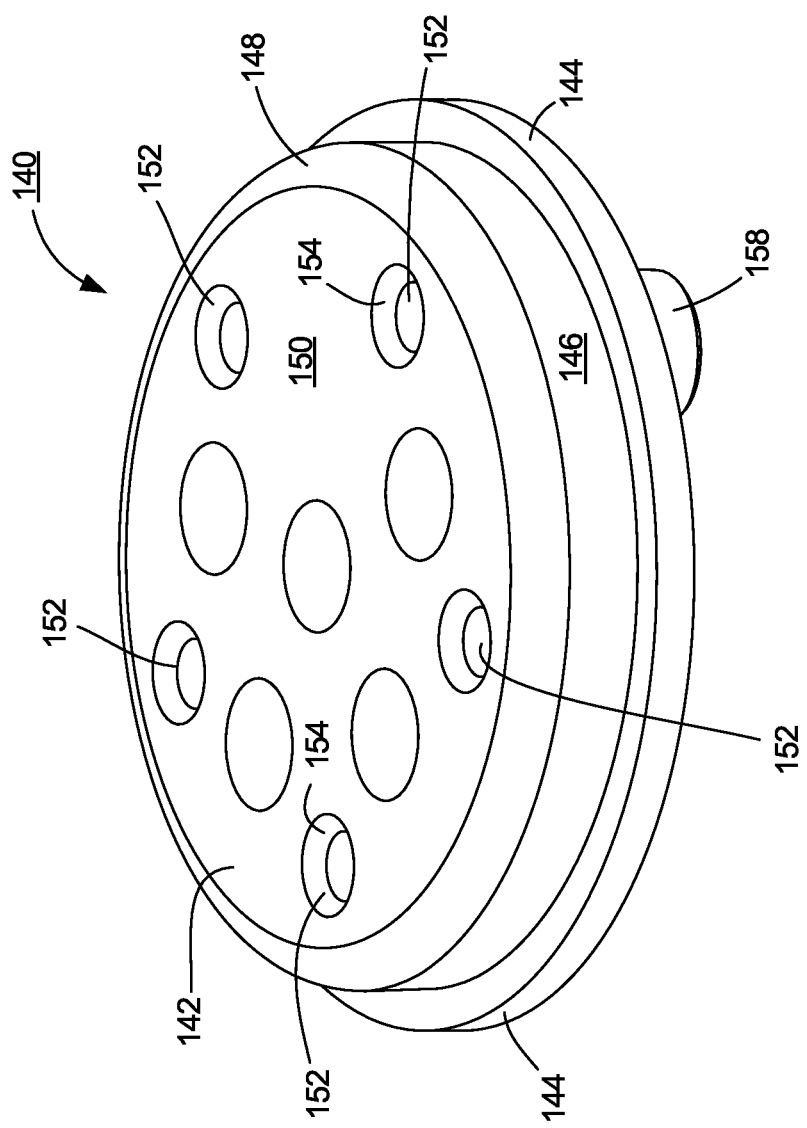
FIG. 14 is a top perspective view of the crankshaft for the skateboard.
Figure 15:
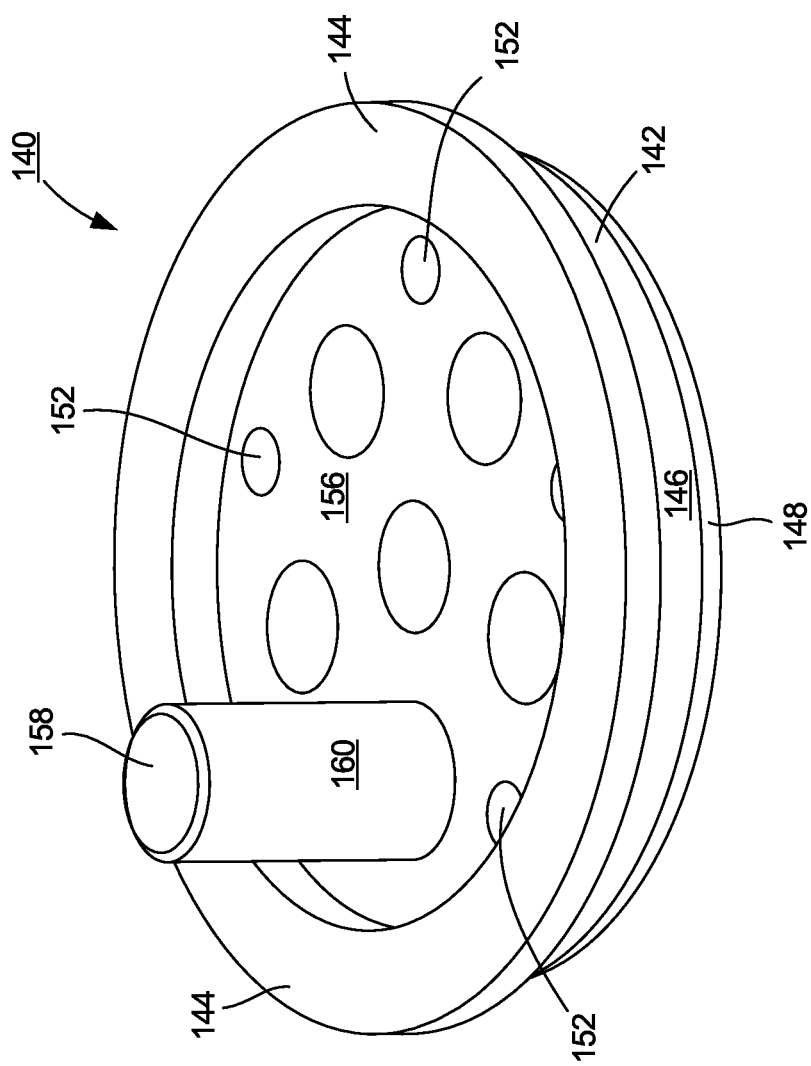
FIG. 15 is a bottom perspective view of the crankshaft of FIG. 14.

Crankshaft 140 is shown in FIGS. 14-15. It comprises a main body 142 and an annular skirt 144 extending laterally from the bottom of the main body. The main body sidewalls 146 yield to a tapered periphery 148 and a flat top surface 150. A plurality (preferably five) of threaded through bores 152 are formed inside upper body 142 around the perimeter of top surface 150. The bores have chamfered top portions 154 to accommodate the heads of bolts 192 (see FIG. 3). The crankshaft is fabricated from a strong material that is easy to machine, such as 316 stainless steel.

As shown in FIG. 14, extending from bottom surface 156 of crankshaft 140 is drive peg 158. It is approximately cylindrical in shape having exterior surface 160. The drive peg 158 may be made from steel. Alternatively, all of crankshaft 140 may be made from the same steel material. Bushing 162 fits around drive peg 158 (see FIG. 3). It may be made from silicon bronze. The bushing 162 provides a lubricated interface between the drive peg 158 and the Scotch yoke 308 of the north-seeking return mechanism.

Crankshaft 140 is inserted into the open chamber 63 of upper bearing housing 60 with sidewall 146 of the crankshaft abutting interior wall 124 of roller bearing 116. Peripheral skirt 144 of crankshaft 140 abuts bottom surface 72 of the upper bearing housing. Meanwhile the upper bearing housing 60 is inserted into opening 44 formed in skateboard deck 12 with exterior surface 68 of annular ring wall 66 abutting inner wall 46 of the skateboard opening and lugs 74 in the upper bearing housing 60 fitting inside ears 48 with the skateboard deck 12. Bottom surface 65 of disk 62 of upper bearing housing 60 abuts surface 52 of annular region 50 surrounding the opening 44 in the skateboard deck 12. This depressed annular region 50 enables the disk 62 of the upper bearing housing 60 to sit inside the depressed region with the top surface 64 of the upper bearing housing 60 being relatively co-planar with the top surface 46 of the skateboard deck 12. A plurality of bolts 170 pass through channels 76 formed inside lugs 74 of upper bearing housing 60 and into threaded holes 172 formed in the housing 84. In this manner, upper bearing housing 60 is secured to housing 84 of the north-seeking return mechanism 42 with the skateboard deck 12 contained between these two housings which are fixed in place with respect to the deck.

Figure 16:
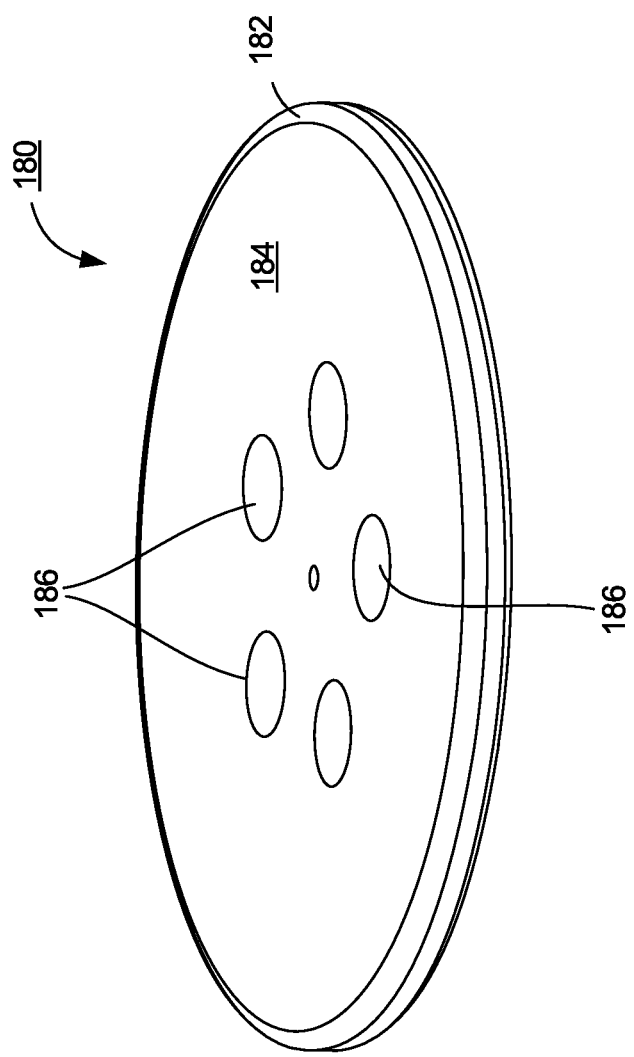
FIG. 16 is a top perspective view of the foot disk for the skateboard.
Figure 17:
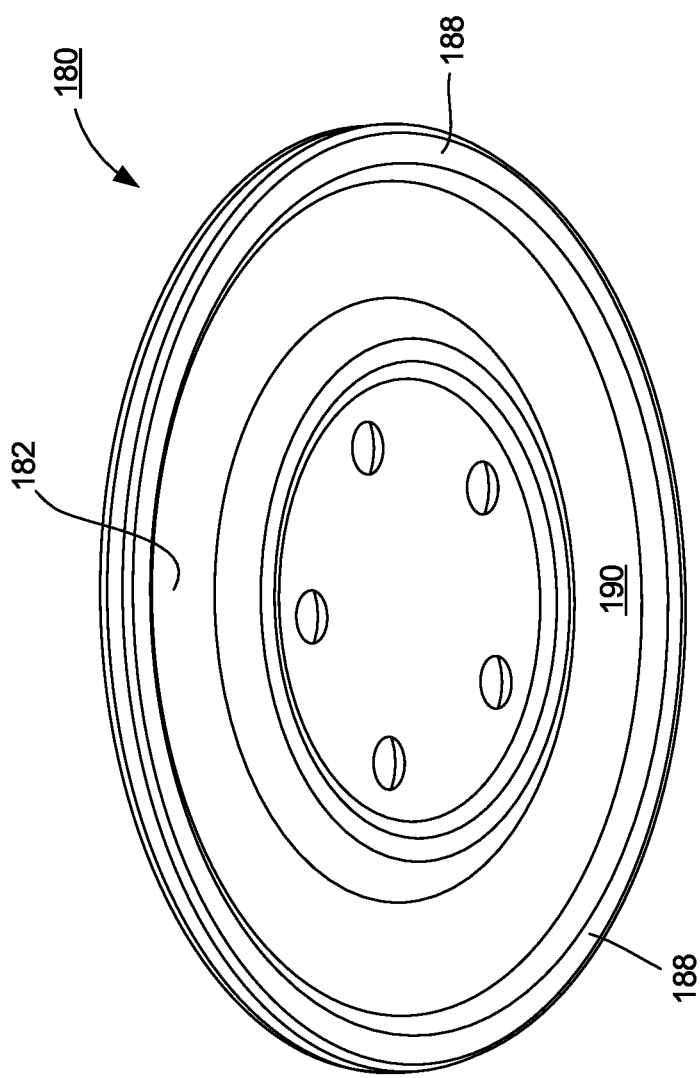
FIG. 17 is a bottom perspective view of the foot disk of FIG. 16.

At the same time, crankshaft 140 can freely turn inside the opening 44 in the skateboard deck contained between the upper bearing housing 60 and housing 84. Foot disk 180 is shown in FIGS. 16-17. It comprises a body 182 formed from a durable material like cast aluminum. A further traction enhancement material like grip tape can be added to the top surface 184 of the body 182 to provide traction for the user's foot, or else ribs can be molded into the top surface of the disk to help to prevent the user's foot from slipping off the foot disk. The body 182 is defined along its bottom peripheral surface by annular lip 188 surrounding chamber 190 formed inside the bottom of the disk. The foot disk 180 is positioned on top of opening 42 of skateboard deck 12 and upper bearing housing 60 with the chamber 63 accommodating the upper portion of the housing. A plurality of bolts 192 pass through a plurality of holes 186 formed within the foot disk. The end of the bolts 192 are screwed into the holes 152 formed within crankshaft 140. In this manner, when the user turns the disk pad 180 with his foot while riding skateboard 10, the crankshaft 140 connected to the foot pad 180 by means of the bolts 192 will turn in the same direction and to the same degree.

The foot pad should ideally extend 1/16-1/8 inch above the skateboard deck 12 to enable the user's foot to find the foot pad by touch without having to look at the deck. This is particularly important during the execution of a skateboard trick or aerial maneuver.

Figure 18:
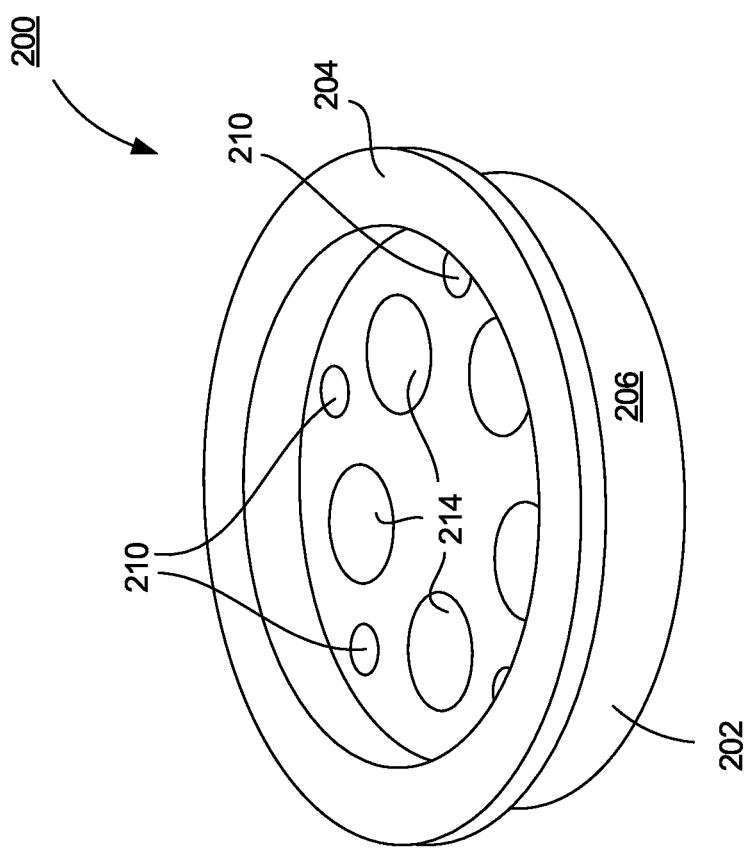
FIG. 18 is a top perspective view of the crankshaft receptor for the skateboard.
Figure 19:
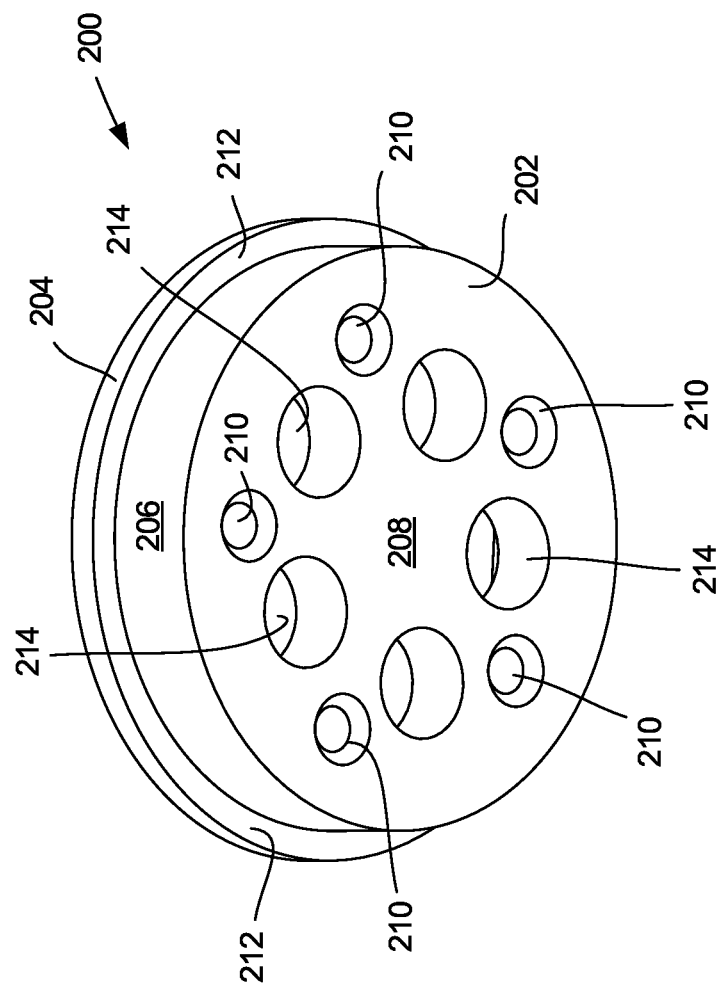
FIG. 19 is a bottom perspective view of the crankshaft receptor of FIG. 18.

Crankshaft receptor 200 is shown in FIGS. 18-19. It comprises a round main body 202 and an annular skirt 204 extending laterally around the perimeter of the top of the main body. The main body features an exterior surface 206 and a flat bottom surface 208. A plurality (preferably five) of threaded bores 210 are formed in the main body around its perimeter region. The annular skirt 204 has a bottom surface 212 that surrounds the main body sidewalls 206. A plurality of reception holes 214 are also formed in the main body 202 for alternatively receiving drive peg 158 of crankshaft 140, as described below.

Figure 20:
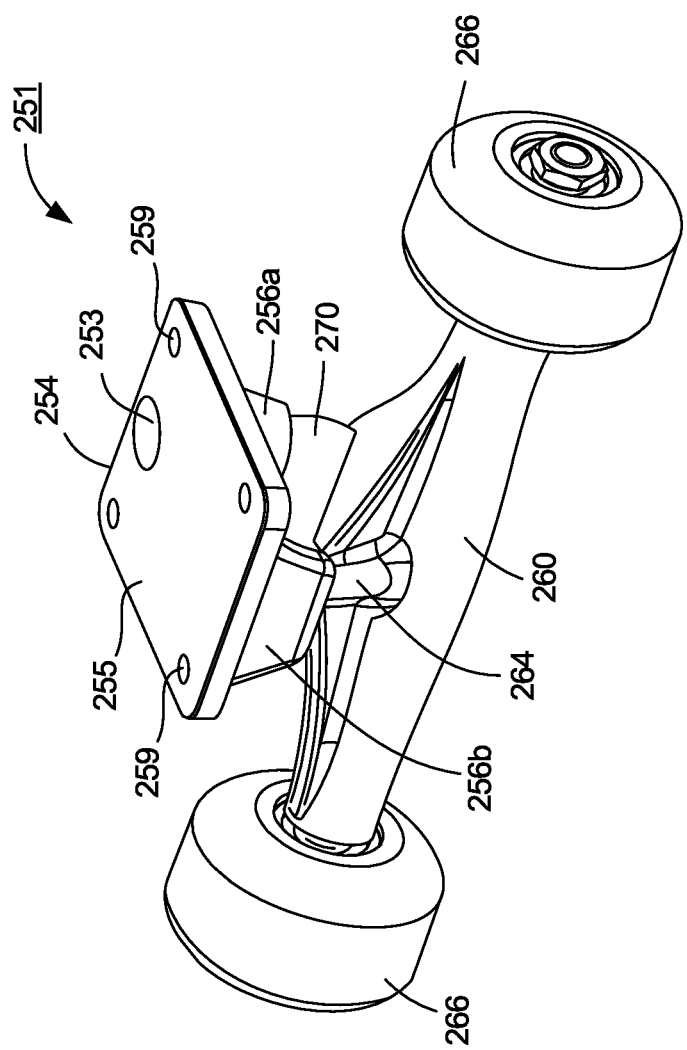
FIG. 20 is a front perspective view of the truck assembly for the skateboard.
Figure 21:
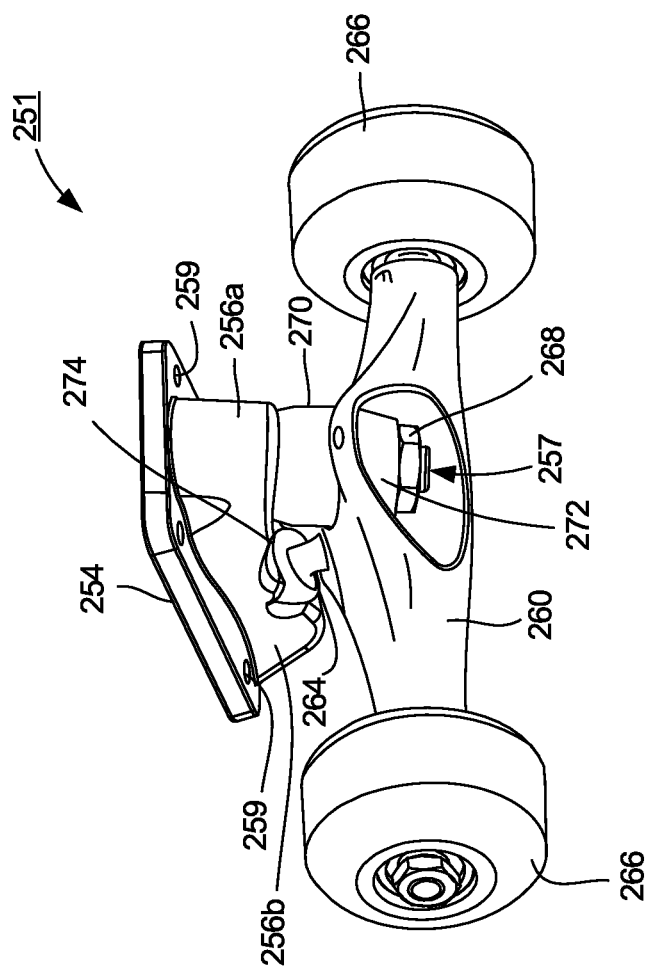
FIG. 21 is a rear perspective view of the truck assembly of FIG. 20.

The truck 251 of wheel assembly 250 is shown in FIGS. 20-21. The truck provides the necessary axle assembly for connecting the wheels 266 to the deck 12 of the skateboard 10, and sustain the weight-bearing load of the user riding the skateboard.

A base plate 252 comprises a unitary construction featuring a top portion 254 having a flat top surface 255, and a lower body portion 256. End 256a of the lower body portion of the base plate 252 is oriented towards the center of the skateboard deck 12 when the base plate is secured to the deck, while end 256b is oriented towards the forward (tip) end or back (tail) end of the deck, depending upon which end of the deck the resulting truck 251 is secured to. A partially-threaded bolt 257 called a "kingpin" extends through hole 253 in the flat, upper portion 254 of the base plate and then downwardly through a channel (not shown) formed within end portion 256a of the base plate. Meanwhile, a hollowed receptacle 258 called a "pivot cup" is formed within end portion 256b of the base plate lower body. Finally, holes 259 are formed near each of the four corners of the flat top portion 254 of the base plate 252.

Hanger 260 contains a through channel (not shown) with a metal axle running through it extending from it on either side. Machined into the upper region 262 of the hanger is a hole 263 (not shown) for receiving the kingpin 257. A pivot point 264 extends in an upwards and forward direction from the hanger 260 when, e.g., the hanger is part of a front truck for the skateboard.

Wheels 266 made from a durable but cushioned material that provides some measure of traction like polyurethane or other polymer plastic are connected to each end of the axle of the hanger 260 to freely rotate with respect to the axle. The hanger 260 is connected to base plate 252 with pivot point 264 of the hanger extended into pivot cup 258 of the base plate 252, and kingpin 257 of the base plate extending downwardly through the associated hole 263 formed with the hanger 260. A nut 268 is tightened along the threaded end of kingpin 257 to secure the hanger to the base plate. This king pin 257 enables the base plate 252 to rotate slightly with respect to hanger 260 as the user leans to one side of the skateboard in the conventional manner to steer it.

Bushings 270 and 272 represent donut-shaped polyurethane pieces that are inserted onto the kingpin 257. Upper bushing 270 is positioned along the kingpin 257 between the body end portion 256a of the base plate 252 and hanger 260. Lower bushing 272 is positioned along the kingpin 257 between the hanger and tightening nut 268. These bushing provide some measure of shock absorbency to the skateboard 10 to enable a more-comfortable ride for the user as he travels over bumps or hits the ground following a jump or other aerial maneuver. The bushings also compress on one side to allow the board 12 to lean with respect to the wheels 266.

Moreover, adjusting the kingpin nut 268 to tighten or loosen the bushings 270 and 272 will adjust the turning radius and response of the truck 251, itself. Tighter bushings will typically provide a stiffer truck with less opportunity for wheel bite. On the other hand, looser bushings generally provide easier turning of the skateboard, but with a greater propensity for wheel bite. In this manner, the skateboard's truck 251 can be adjusted for the preference and skill level of the end user.

A pivot bushing 274 in the form of a plastic cup-shaped piece rests inside the pivot cup 258 of the base plate 252 to support the pivot point 264 of the hanger 260 extending into the pivot cup. This allows the truck 251 to pivot smoothly. The pivot bushing 274 acts to prevent frictional contact between the hanger's pivot point 264, and the base plate's pivot cup 258, while providing cushioning along this critical junction.

Suitable wheel truck assemblies for purposes of this invention may be sourced from Independent Trucks distributed by www.SkateAmerica.com. Such truck assemblies normally are available within the commercial market with hangers defining a range of different distances between the wheels (e.g., 146, 156, or 179 mm), different wheel sizes and compositions providing different types of rides, and bushings supplying different levels of cushioning and turning radius for the skateboard. Because of the design of the mechanical interface of the skateboard 10 between the board deck 12 and the truck (11292664.1 assemblies 151 for allowing the user to maneuver the directions of the truck assemblies from the deck, and automatically return the truck assemblies to their standby, true-north positions, it is simple and easy for the user to customize the trucks, wheels, bearings, and bushings from a large array of commercially-available products, using a conventions skateboard key. Such an approach can tailor the performance of the skateboard to the technical characteristics that the user depending upon his or her experience and skill level, as well as the user's desired aesthetic appearance for the skateboard.

Figure 22:
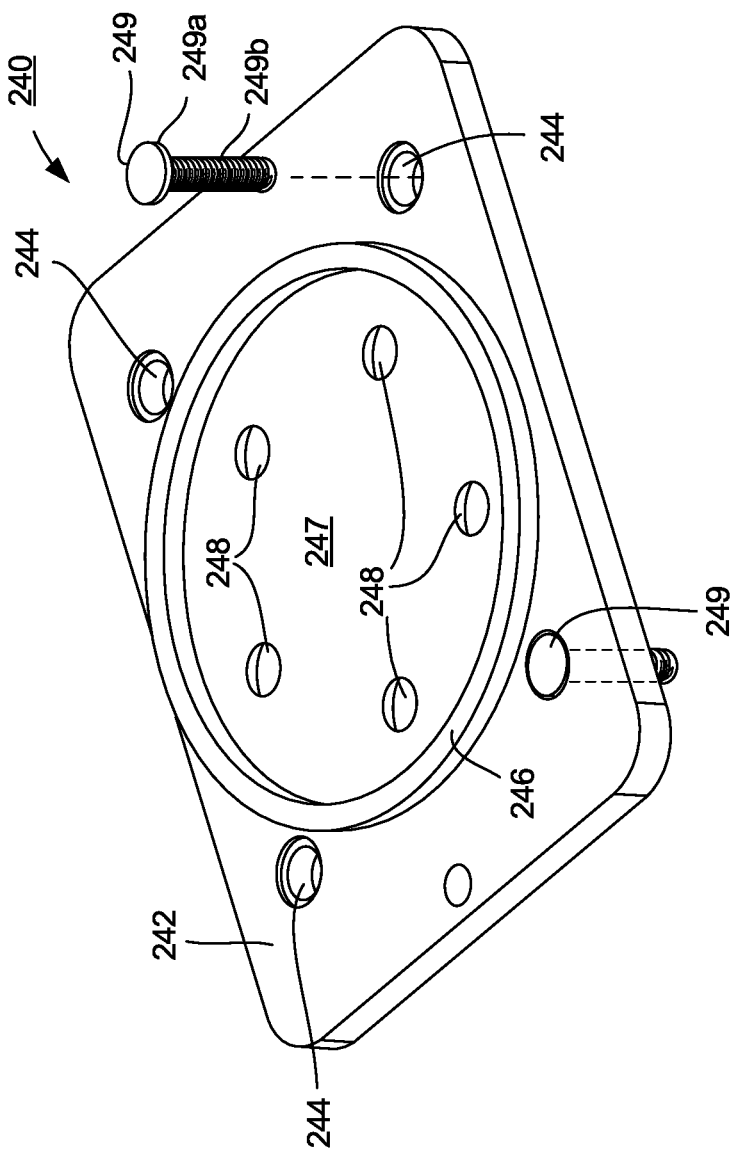
FIG. 22 is a top perspective view of the truck plate for the skateboard.
Figure 23:
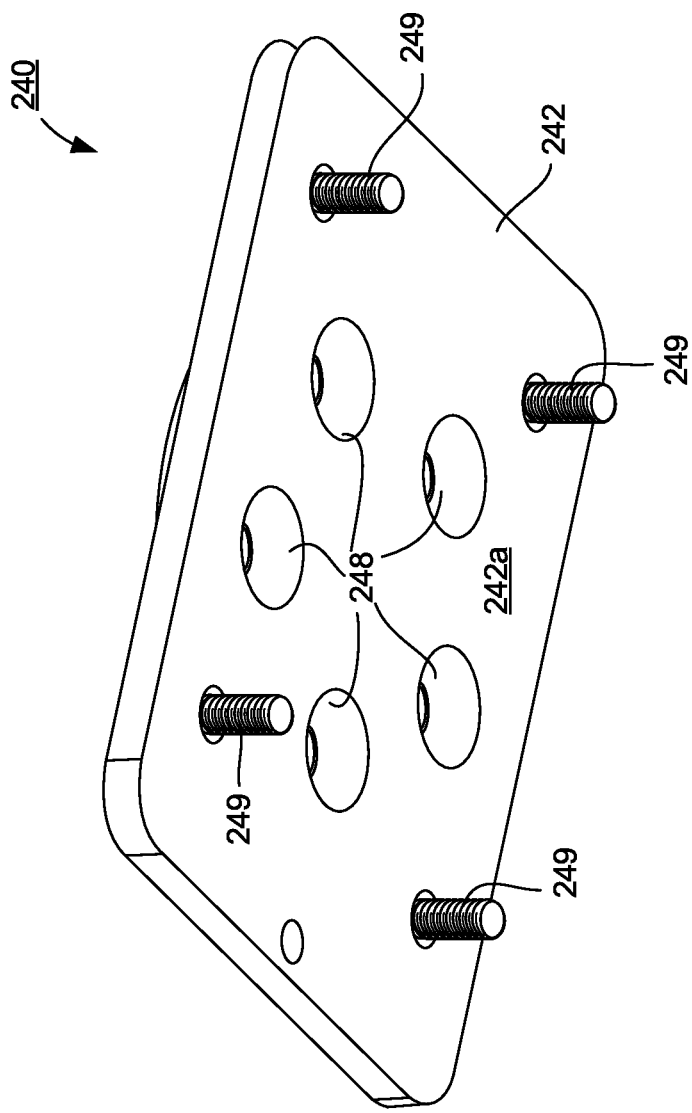
FIG. 23 is a bottom perspective view of the truck plate of FIG. 22.

Truck plate 240 for wheel assembly 250 is shown in FIGS. 22-23. It comprises a rectangular body 242 having holes 244 near its four corners. Circular ring wall 246 is integrally formed in the truck plate to extend above the rectangular body. Ring wall 246 defines reception region 247 for crankshaft receptor 200. Five holes 248 are formed within this reception region 247 of the rectangular body 242. Studs 249 having a head 249a and a threaded shank 249b are inserted through holes 244 to extend below the rectangular body.

Lower bearing housing 110 contains a roller bearing 220 and a snap ring 230 that are of the same construction and design as roller bearing 116 and snap ring 130 discussed above.

Wheel assembly 250 is completed by connecting truck plate 240 to base plate 254 of truck 251 by means of the threaded studs 249. The ends of the studs 249 are inserted through holes 258 formed in the base plate 254 so that the bottom surface 242a of the rectangular body 242 of the truck plate 240 abuts top surface 256 of truck 251. Nuts 270 are then attached to the threaded regions of the shank 249b of the studs to securely connect the truck plate 240 to the truck 251.

Meanwhile, crankshaft receptor 200 is inserted into the open chamber 63 of lower bearing housing 110 with sidewall 206 of the crankshaft receptor abutting interior wall 124 of roller bearing 220. Peripheral skirt 204 of crankshaft receptor 200 abuts top surface 72 of the lower bearing housing. Meanwhile the lower bearing housing 110 is inserted into opening 98 formed in the housing 84 of the north-seeking return mechanism 42 with exterior surface 68 of annular ring wall 66 abutting inner wall 100 of the housing opening 98 and lugs 74 in the lower bearing housing 110 fitting inside ears 102 while the top surface 65 of disk 62 of lower bearing housing 110 abuts bottom surface 82 of the housing surrounding the opening 98 in the housing. A plurality of bolts 276 pass through channels 76 formed inside lugs 74 and into threaded holes 172 formed in the housing 84. In this manner, lower bearing housing 110 is secured to housing 84 of the north-seeking return mechanism 42. At the same time, crankshaft receptor 200 can freely turn inside the opening 98 in the housing 84.

Drive peg 160 of crankshaft 140 extends down into housing 84 and is inserted into one of the holes 214 formed in crankshaft receptor 200 (see FIGS. 18-19). Bushing 162 inserted around drive peg 160 provides a secure fit of the drive peg of crankshaft 140 into the hole 214 of crankshaft receptor 200. In this manner, the upper bearing housing 60 is coupled to the lower bearing housing 110. When the user riding the skateboard 10 turns foot disk 180 with his foot in a counter-clockwise direction B (see FIG. 3), because the foot disk is operatively connected to crankshaft 140 via bolts 192, which in turn is operatively connected to crankshaft receptor 200 via drive peg 160, which in turn is operatively connected to truck plate 240 via bolts 278, which in turn is operatively connected to truck 151 via studs 249, the truck 151 will be turned in the same counter-clockwise direction B and to the same degrees of rotation as the foot disk 180 was turned. In this manner, the user can freely and confidently maneuver, e.g., the front truck 151 of the skateboard 10 while riding the skateboard without any need to use his other foot to laterally push off the ground or lean his body towards the right side of the skateboard as is necessary to steer a conventional skateboard with fixed wheel assemblies. Note that the rear wheel assembly 250 of skateboard 10 may comprise this same or similar user-maneuverable assembly so that the user may independently steer the front and rear wheel assemblies while riding the skateboard for optimal maneuverability and control. The enhanced maneuverability and control produced by skateboard 10 of the present invention can be highly beneficial to beginners learning to ride a skateboard, convenient for users traveling recreationally along a street or park, or enabling for more advanced users who want to perform tricks.

Figure 24:
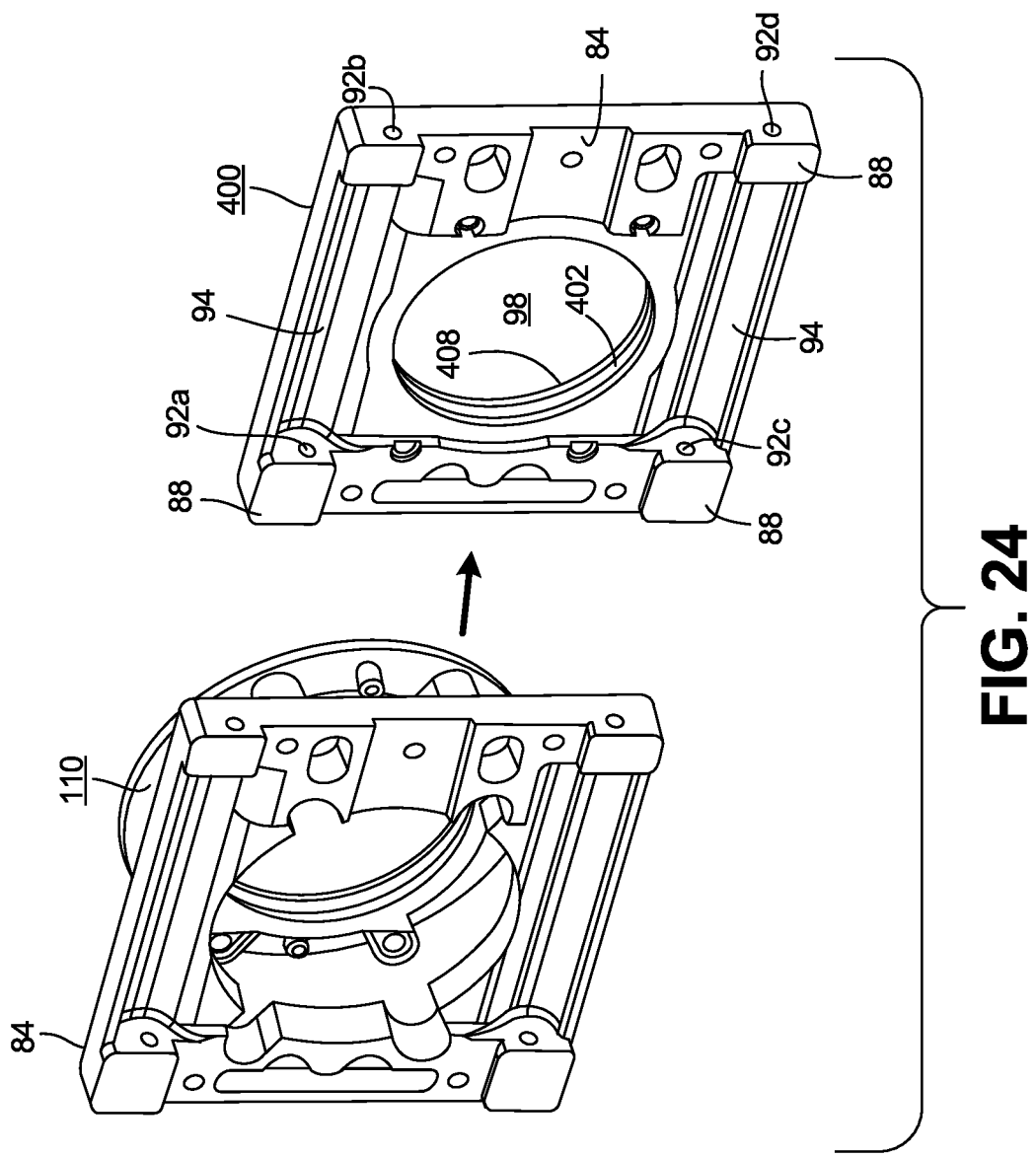
FIG. 24 is a top perspective view of an alternative embodiment of the north-seeking return mechanism having integrally formed therein the structural features of the lower bearing housing.
Figure 25:
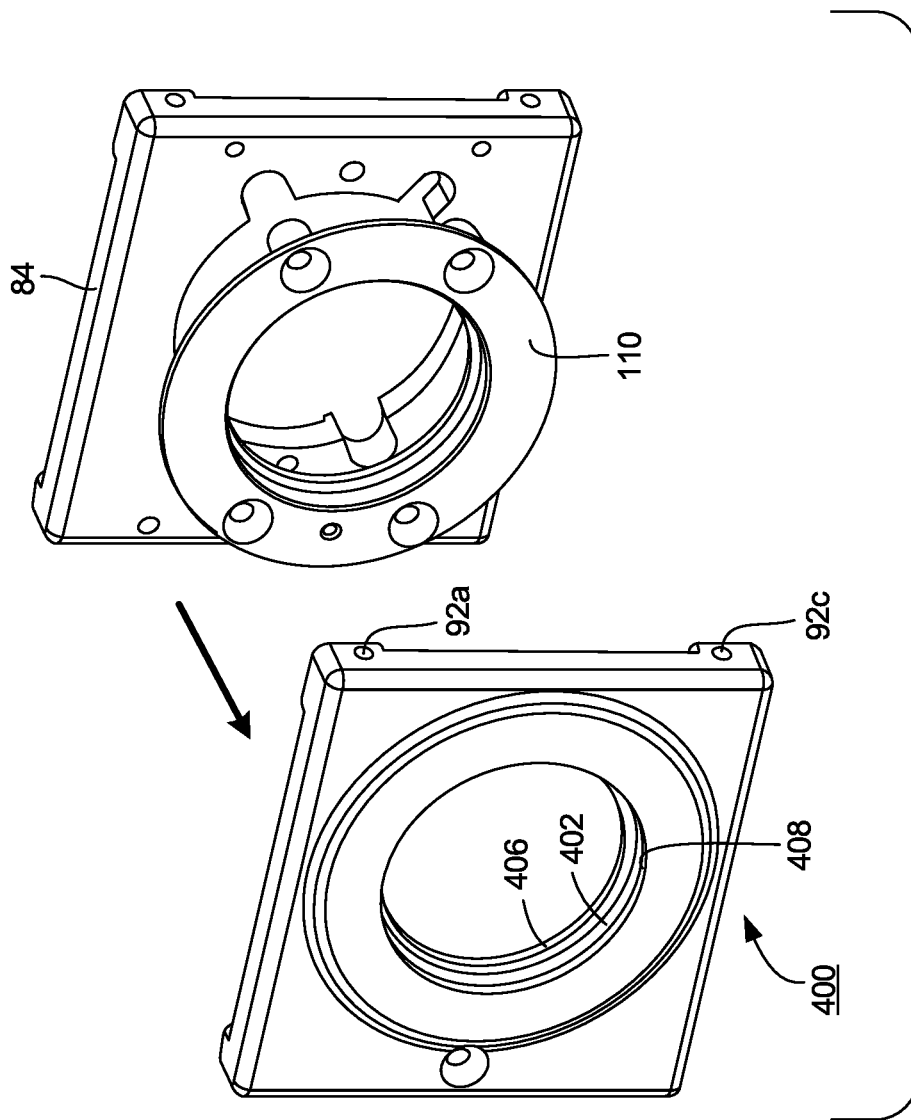
FIG. 25 is a top perspective view of the modified housing of FIG. 24.

In a preferred embodiment of the present invention, the lower bearing housing may be integrally formed within the north-seeking return mechanism housing 84 without a separate lower bearing housing 110, as described above. As shown in FIGS. 24-25, the opening 98 of the housing 400 does not feature the plurality of ears 102 shown in FIG. 8, nor the smooth sidewall 100. Likewise, the annular ring wall 66 and plurality of lugs 74 shown in FIG. 7 are absent. Instead, sidewall 402 of the north-seeking return mechanism housing 400 defines the cylindrical chamber 404 formed by the sidewall 402, bottom ledge wall 406, and peripheral lip 408. In this manner upper roller bearing 116 is press fit into the cylindrical chamber 65 formed inside upper bearing housing 60 defined by sidewall 70 and bottom ledge wall 69, and peripheral lip 71. Exterior surface 120 of roller bearing 116 abuts sidewall 402 of the integral chamber 404, while the bottom surface of roller bearing 116 abuts bottom ledge wall 406. Peripheral lip 408 of the housing 400 extends partially over the top of roller bearing 116 to keep it securely in position inside chamber 404 of the housing 400. Snap ring 130 (see FIG. 13) is then snapped into position to engage peripheral lip 408 and keep roller bearing 116 in a fixed relationship to the housing 400. The plurality of ball bearings 126 contained inside annular channel 124 (not shown) extend above the roller bearing inside chamber 404.

The housing 400 that integrally includes the structural features of the lower bearing housing 110 made from a non-plastic material like aluminum, steel, or stainless steel, which may be stronger than polymer plastics including polycarbonate. It preferable is made from aluminum. Also, a single housing 400 containing the lower bearing housing features 110 provides greater strength than separate housing 84 and lower bearing housing 110 described above. This enhanced strength is particularly important for skateboard 10, given the significant downward forces of 5,000 pounds typically applied to the truck assemblies 250 when the skateboard lands on the ground or skateboard ramp following an aerial maneuver. This preferred design will help to prevent the truck assemblies 250 from breaking loose from the skateboard deck 12.

Moreover, a user performing aerial tricks on a skateboard that requires turning of the trucks 251 of the wheel assemblies 250 may encounter uncertainty about which direction the wheels (particularly the front wheels) will be pointed when the skateboard lands once again upon the ground. The wheel assemblies may even turn randomly with respect to the longitudinal axis A-A of the skateboard deck while the skateboard is in the air during the course of the aerial trick. Indeed, a skateboard having two truck assemblies pointed in different directions during an aerial maneuver can provoke a nose dive by the tip or tail of the skateboard which causes an unsafe condition for the user. Therefore, the skateboard 10 of the present invention has been provided with a north-seeking return mechanism 42 that will automatically return the maneuverable wheel assembly 250 back to its "true north" position in which the transverse axle 260 axis T-T is approximately perpendicular to the longitudinal axis A-A of the skateboard deck 12 when the user removes foot pressure from the foot disk 180 on the skateboard deck.

Figure 26:
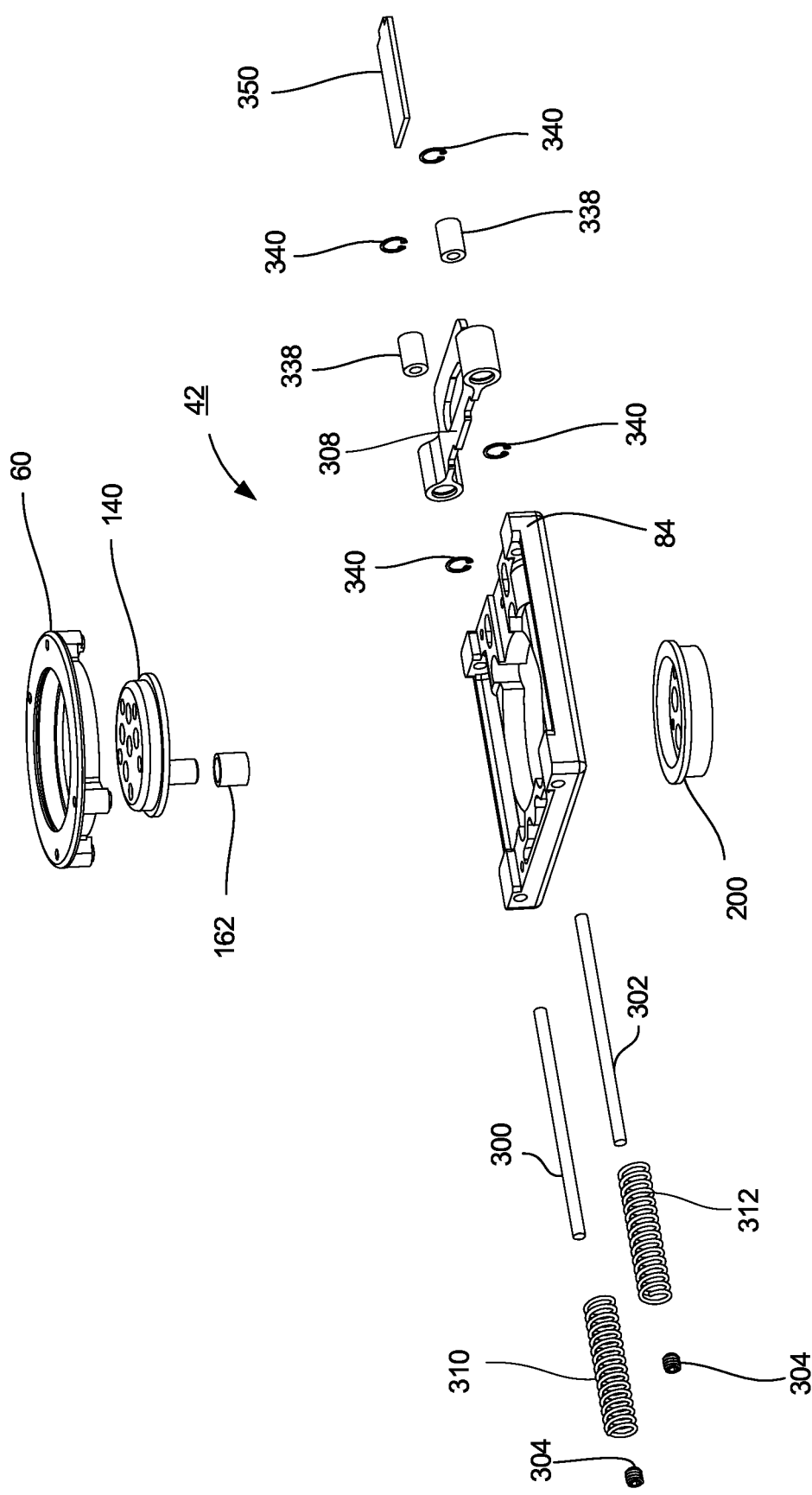
FIG. 26 is an exploded perspective view of the north-seeking return mechanism for the skateboard.

As shown more clearly in FIG. 26, piston shaft 300 comprising a cylindrical shaft is inserted through channel 92a and channel 92b in square bosses 90 on either side of open faced well 94a. Likewise, piston shaft 302 is inserted through channel 92c and channel 92d in square bosses 90 on either side of open-faced well 95. Set screws 304 are inserted into a threaded region of the outside ends of the channels 92a, 92b, 92c, and 92d to securely retain the piston shafts 300 and 302 in place traversing the open-faced wells 94 and 95 in housing 84.

Figure 27:
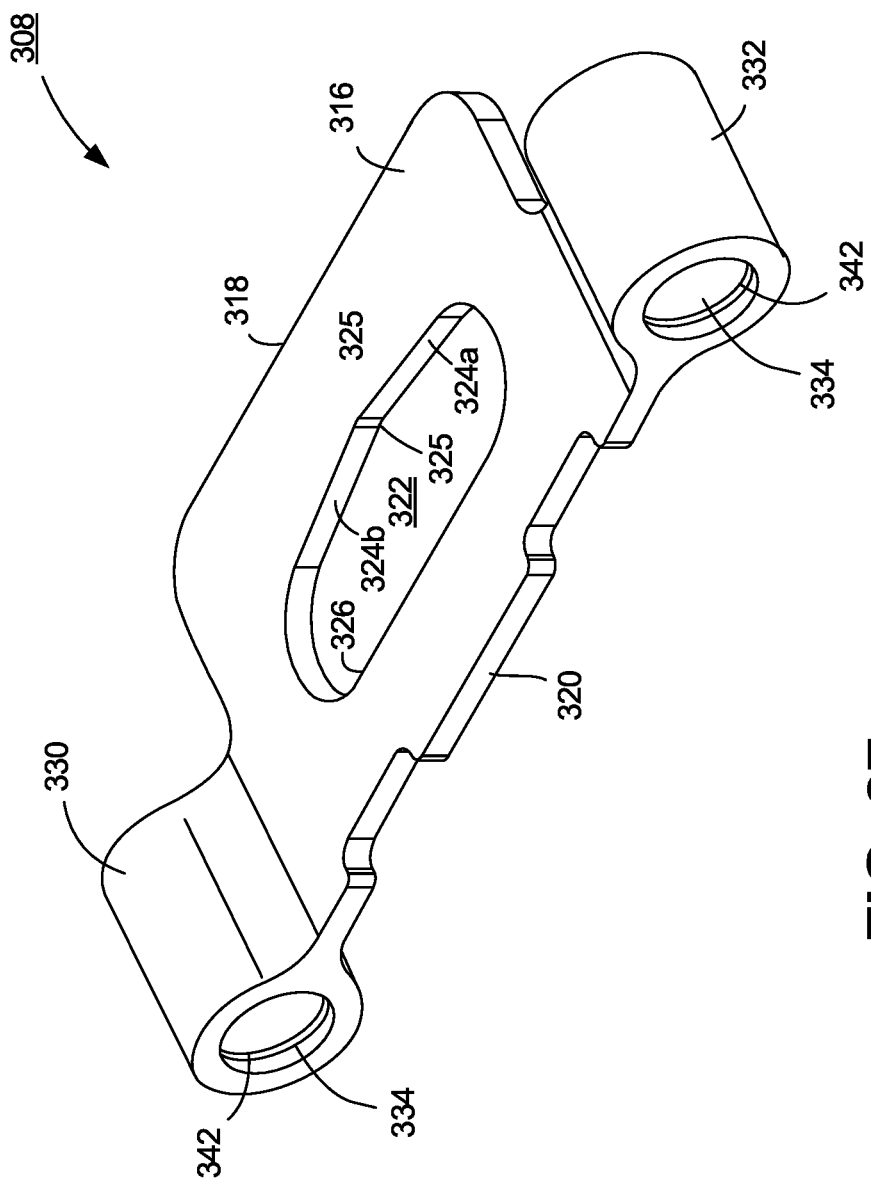
FIG. 27 is a top perspective view of the Scotch yoke for the north-seeking return mechanism.
Figure 28:
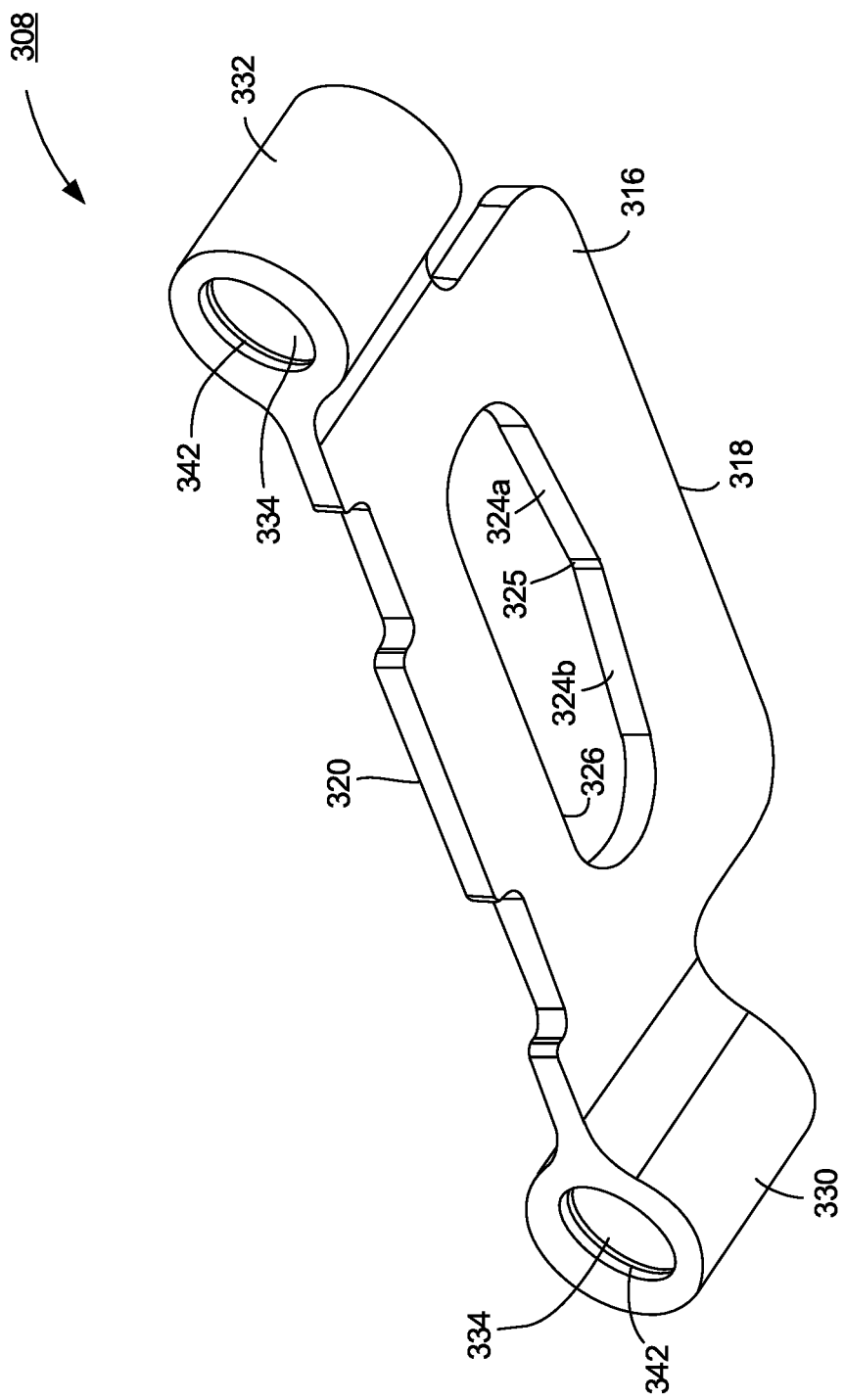
FIG. 28 is a bottom perspective view of the Scotch yoke of FIG. 27.

Meanwhile Scotch yoke 308 and compression springs 310 and 312 are positioned along piston shafts 300 and 302 within the open-faced wells 94 and 95. As shown more clearly in FIGS. 27-28, Scotch yoke comprises a flat main body 316 having a leading edge 318 and a trailing edge 320. An open window region 322 is formed within main body 316 having a forward bearing surface 324 and a rearward bearing surface 326. Extending from the ends of main body 316 are wings 330 and 332 having cylindrical through channels 334 for accommodating piston shafts 300 and 302. In this manner, Scotch yoke lies on top of housing 84 and over opening 98 with piston shafts 300 and 302 inserted through channels 334 of wings 330 and 332, respectively, of the Scotch yoke, so that the Scotch yoke may travel in a linear direction along axis X-X. Bushings 338 are inserted inside channels 334 to reduce the friction produced by the Scotch yoke 308 as it travels along the piston shafts 300 and 302. A pair of C-clips 340 are snapped into annular channel 342 formed around the periphery of each end of the wing 330, 332 of the Scotch yoke to retain bushing 338 inside the channel 334 of the wing as the Scotch yoke moves along the piston shaft.

Figure 29:
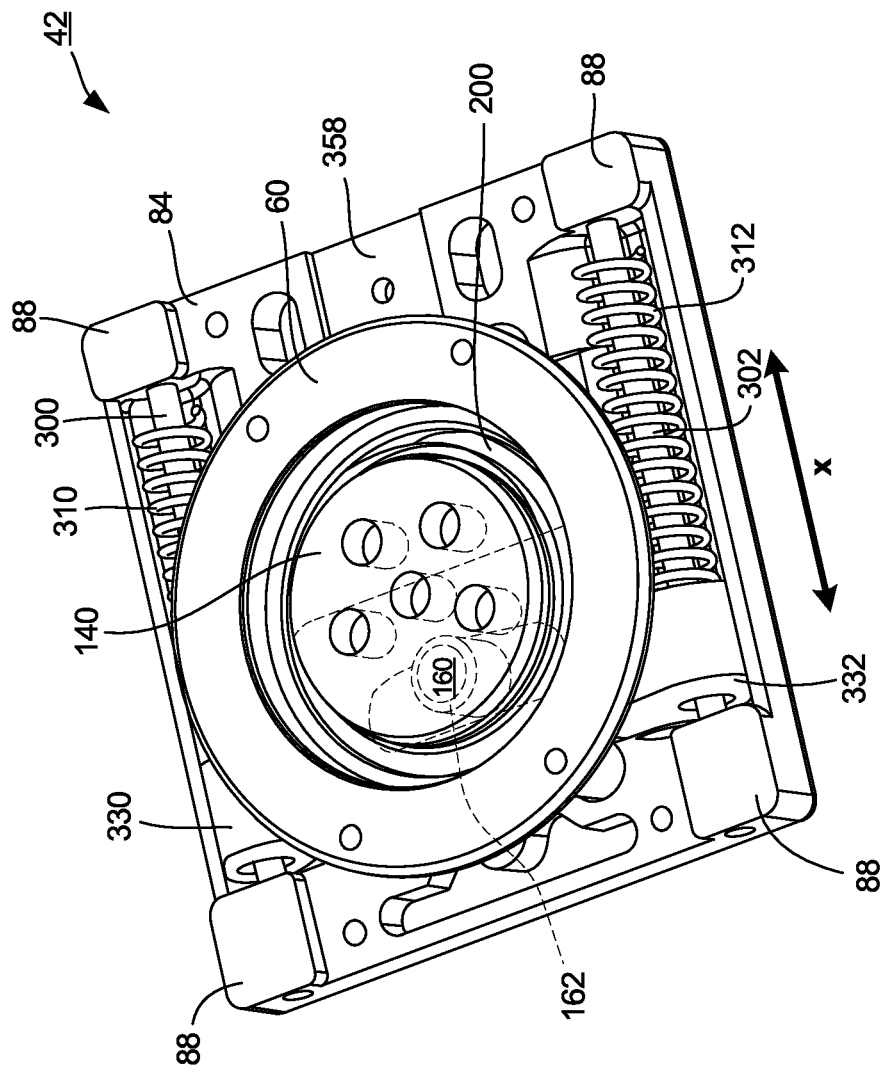
FIG. 29 is a cut-away view of the north-seeking return mechanism in its standby "true north" position.

The assembled north-seeking return mechanism 42 of the present invention is shown in its stand-by, "true north" position in FIG. 29. Drive peg 160 of crankshaft 140 is inserted through window region 322 of Scotch yoke 308 and then into hole 214 of the crankshaft receptor 200. In this position, the transverse axle 260 of wheel truck 251 will be approximately perpendicular to longitudinal axis A-A of skateboard deck 12.

When the user's foot turns disk pad 180 in either a clockwise or counterclockwise direction B (see FIG. 3), crankshaft 140 with its drive peg 160 will be rotated in the same direction B. In so doing, drive peg 160 will be pushed against forward surface 324 of window 322 of Scotch yoke 308 to move the Scotch yoke along the piston shafts 300, 302 along the X axis with the leading edge 318 of the Scotch yoke moving towards the interior region of the longitudinal axis A-A of the skateboard deck (see FIG. 30). Compression springs 310, 312 will be compressed between wings 332, 334 of the Scotch yoke and square posts 88 of housing 84. In this partially-turned position, drive peg 160 has been rotated counterclockwise in the B direction and the wheels 266 of the truck 251 have been turned to the left.

Figure 31:
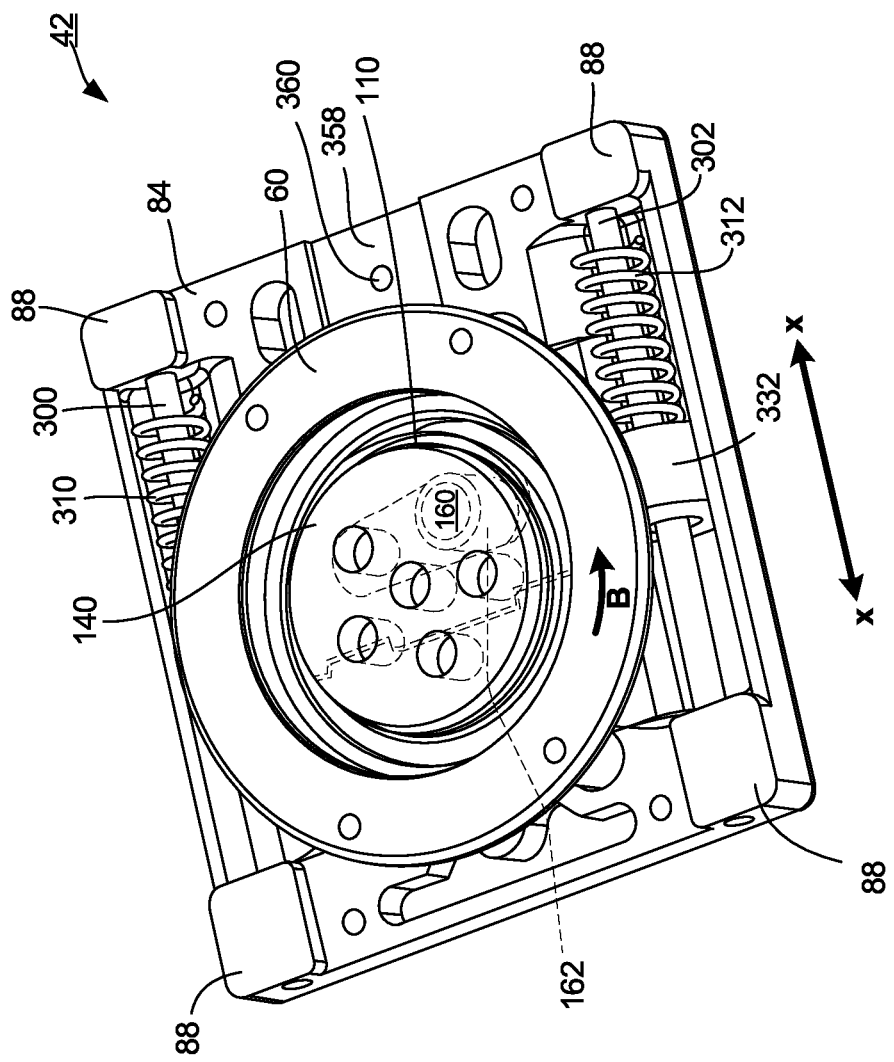
FIG. 31 is a cut-away view of the north-seeking return mechanism in its further-turned position.
Figure 32:
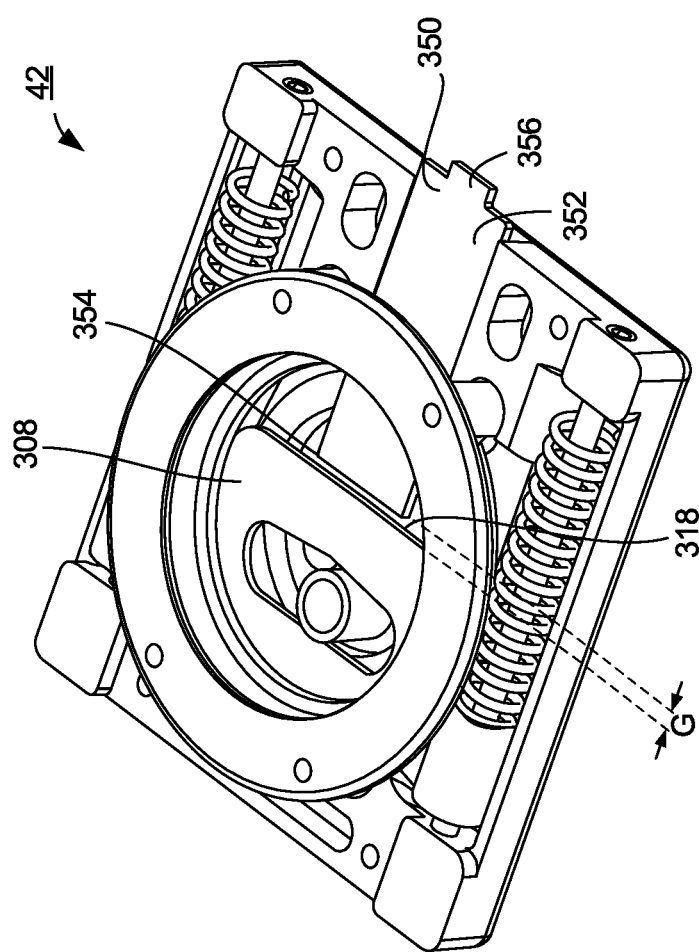
FIG. 32 is a cut-away view of the north-seeking return mechanism with the rotation limitation plate inserted to control the turning arc of the wheel assembly of the skateboard.

If the user continues to turn the disk pad 180 on the skateboard deck 12 to the left (i.e., counterclockwise direction), then the crankshaft 140 and its drive peg 160 will continue to be rotated in the counterclockwise B direction as shown in FIG. 31, and Scotch yoke 308 will be pushed further along the piston rods 300, 302 towards the interior region of the axis X-X, further compressing compression springs 310 and 312 between the wings 332, 334 of the Scotch yoke and square posts 88 of housing 84. Meanwhile, the wheels of the skateboard will be further turned to the left.

But, when the user removes foot pressure from the foot disk 180 on the skateboard deck 12, which may be done while the skateboard is in the air during an aerial trick, the crankshaft 140 and its drive peg 160 will no longer be turned and retained in the counterclockwise position. This allows the stored energy in the compression springs 310, 312 to return the compression springs to their expanded state. The compression springs will push against the wings 330, 332 of the Scotch yoke 308 to move it back along the X-X axis towards the end region of the axis. Rearward edge 326 of window region 322 of the Scotch yoke will be pushed against drive peg 160 to rotate it in a clockwise direction towards the partially-rotated position depicted in FIG. 28 to return to the standby "true north" position shown in FIG. 27. Note that the forward edge 324 of window 322 of the Scotch yoke main body 318 is angled to form V-shaped legs 324a and 324b with "resting position" 325 provided at the vertex point (see FIGS. 27-28). This geometry assists the return of the drive peg 160 to the resting position 325 which corresponds to the standby true north position shown in FIG. 29. This will cause the wheel assembly 250 to be returned to a position with the wheels approximately perpendicular to the longitudinal axis A-A along the skateboard deck 12, so that the skateboard may move forward dependably as the user lands the skateboard on the ground to complete his aerial trick.

Under some circumstances, the user may wish to restrict the turning radius of the skateboard wheels. This could be convenient for beginner skateboarders. Alternatively, it could increase the difficulty of aerial tricks during competitions for more advanced skateboarders.

Figure 33:
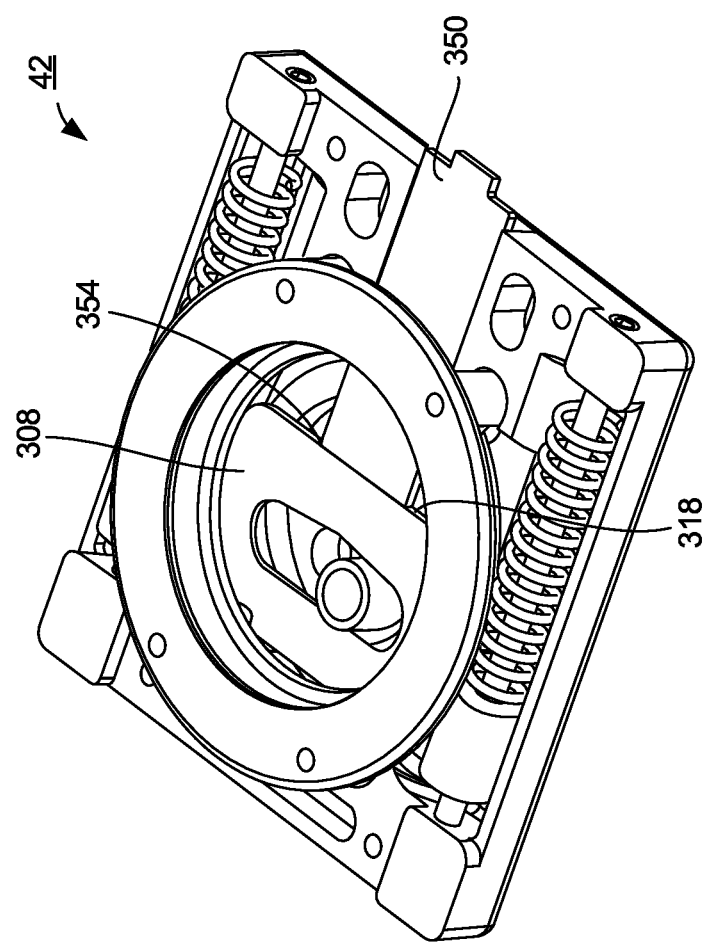
FIG. 33 is a cut-away view of the north-seeking return mechanism with the rotation limitation plate inserted and blocking further turning of the rotated wheel assembly of the skateboard.
Figure 34:
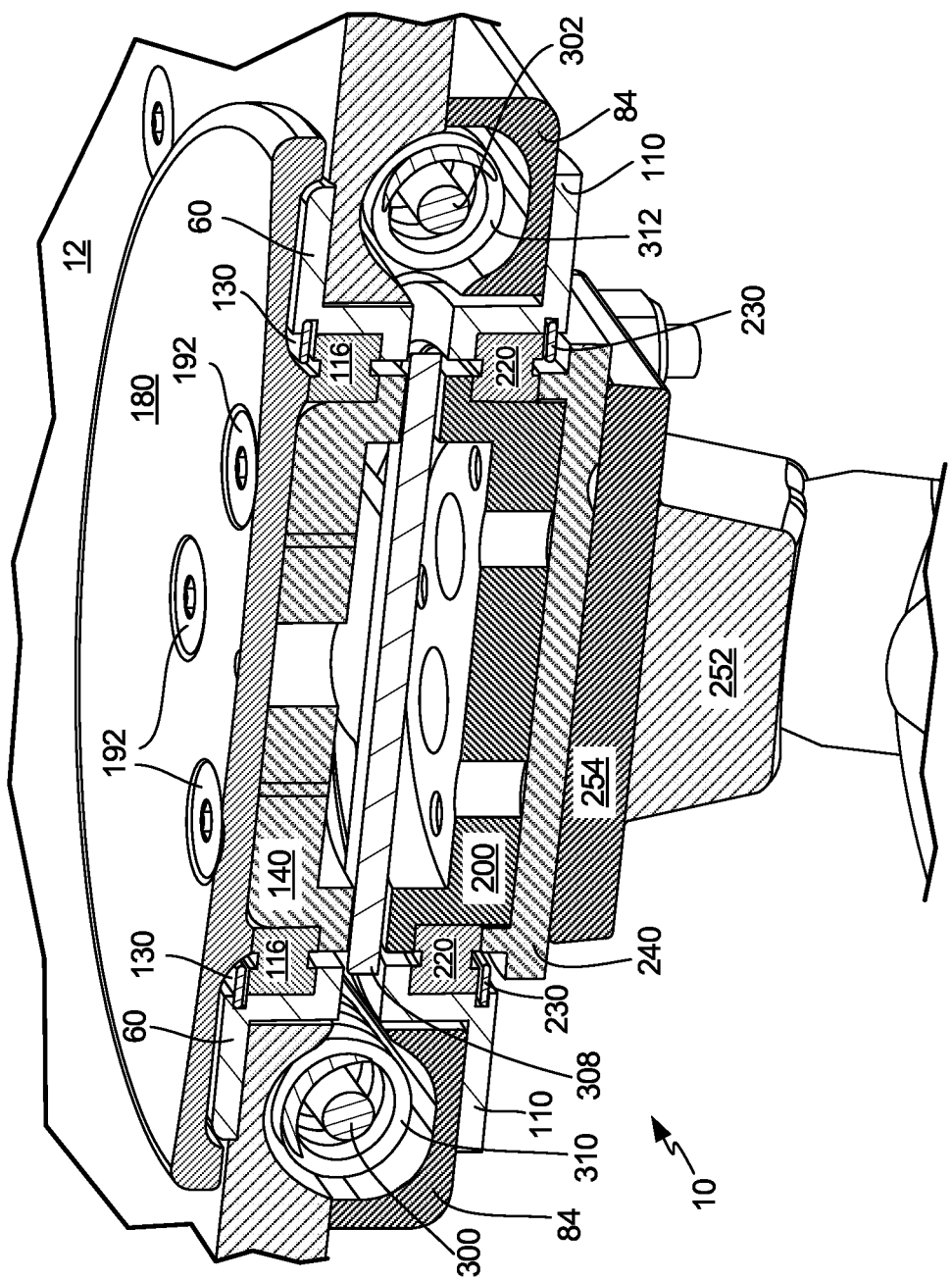
FIG. 34 is a cut-away view taken along line 34-34 in FIG. 2 of the skateboard's user-maneuverable trucks and north-seeking return mechanism in their assembled state.

Rotation limitation plate 350 (see FIG. 26) comprises an elongated, rectangular body 352 having an abutment edge 354 at its one end and a handle 356 at its other end. This rotation limitation plate 350 is slided along channel 358 formed in housing 84. A gap G is formed between the abutment edge 354 of the rotation limitation plate 350 and the leading edge 318 of Scotch yoke 308. As the user turns disk pad 180 on skateboard deck 12 to turn the wheel assembly 250 and cause the linear movement of Scotch yoke 308 along axis X-X, as described above, the leading edge 318 of the Scotch yoke 308 will come into contact within the abutment edge of the stationary rotation limitation plate 350, as shown in FIG. 33. This will prevent further turning of the skateboard wheels. A smaller gap G will produce a more limited turning arc for the skateboard wheel assembly. A larger gap G will allow a larger turning arc for the wheel assembly. In this manner, the user can pre-position the rotation limitation plate in its inserted position along channel 358 in housing 84 to adjust the degree of wheel turning arc that will be permitted.

Note that other mechanism assemblies, including a thumb screw (not shown) that interacts through hole 360 formed in housing 84, may be utilized to make this adjustment of the rotation limitation plate along the channel 358 easier to accomplish.

Figure 35:
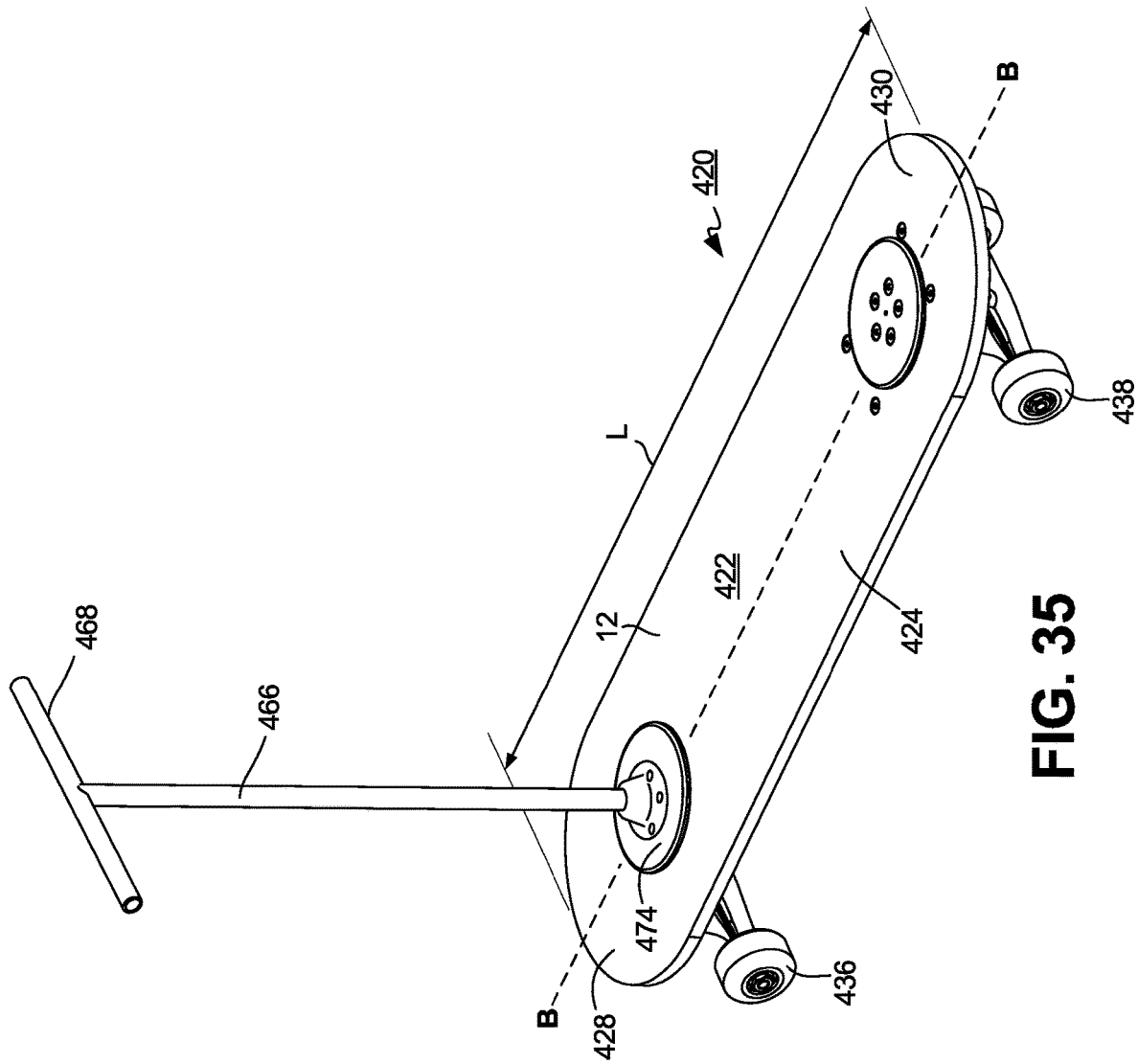
FIG. 35 is a perspective view of the scooter having two user-maneuverable trucks with a north-seeking return mechanism of the present invention.
Figure 36:
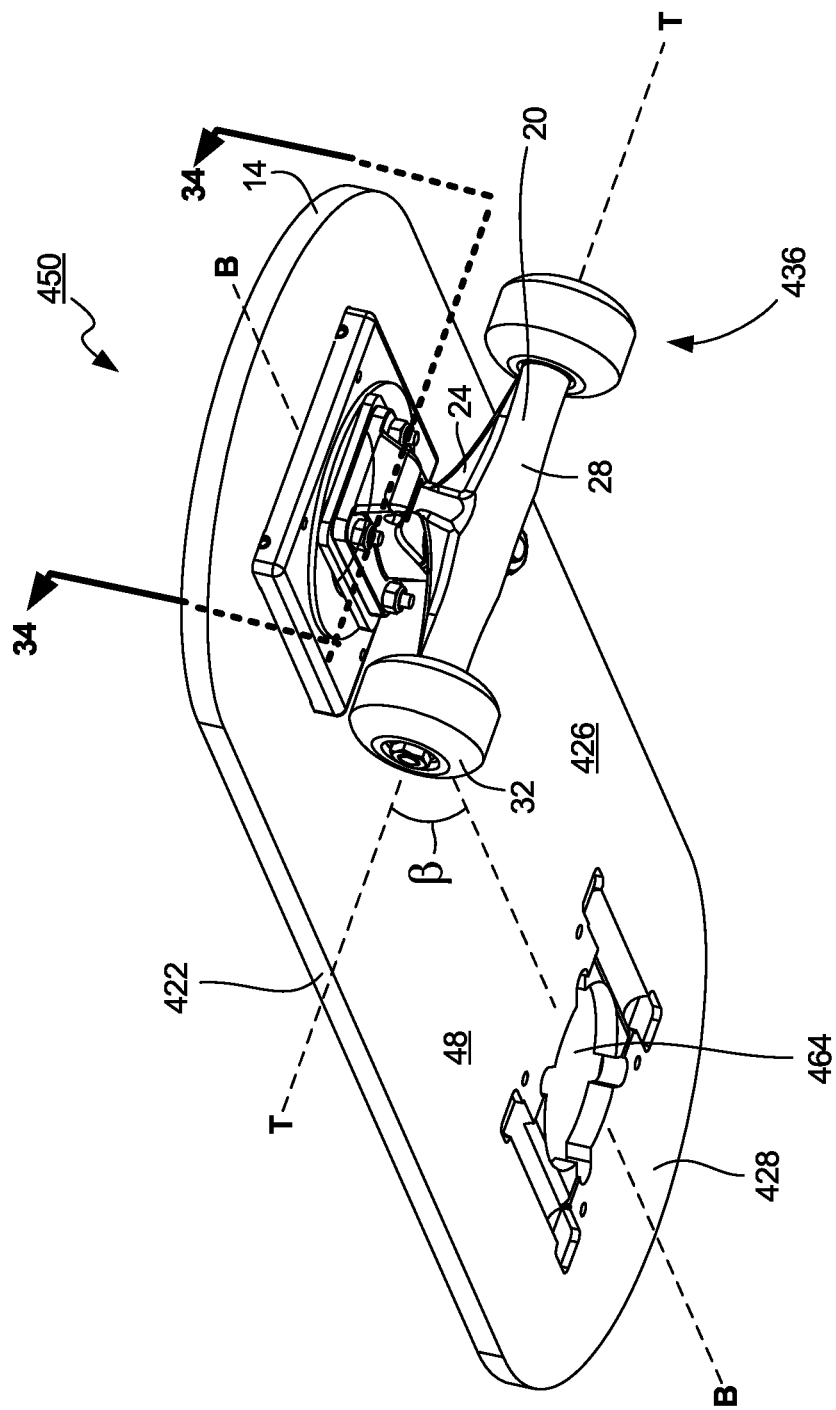
FIG. 36 is a bottom perspective view of the scooter of FIG. 35 with a double front wheel assembly, and the rear wheel assembly removed.

The user-maneuverable truck assemblies and north-seeking return mechanisms of the present invention may also be applied to other wheel-bearing, foot-propelled roller board vehicles like non-motorized scooters. As shown in FIGS. 35-36, such a scooter 420 comprises an elongated deck 422 made from an appropriate material such as wood, fiberglass, or plastic. The deck 422 has a top surface 424 and a bottom surface 426. It also typically features a rounded front end 428 and a rounded rear end 430 that avoids sharp edges that could collide with a curb, wall, or other impediment where a user is riding the skateboard, or injure the user during a fall or crash. The deck 422 will be approximately 27-33 inches long. The deck 422 may optionally contain along all or a portion of its top surface 424 a panel of traction-providing material like coated grip tape or a painted coating containing abrasive particles to help to maintain the user's foot from slipping off the board. Likewise, the top or bottom surface of the deck may contain graphical material used to provide an appealing design to the skateboard. The scooter 420 also has a longitudinal axis B-B running along its length L.

Mounted to the bottom surface 426 of scooter deck 422 are a plurality of wheel assemblies 434, typically two in number shown as 436 and 438. One wheel assembly 436 should be located near the front of the deck, and the other wheel assembly 438 should be located near the rear of the deck to provide a stable ride to the user. Each wheel assembly 436, 438 comprises a truck 440 having a flat planar top surface 442, and a transverse axle 444 connected to its bottom surface 446. A single or double wheel 446 is connected to the axle 444. The wheels are made from a suitable material like polyurethane that provides durability over time as the skateboard is ridden by the user on abrasive surfaces like concrete or asphalt, while also providing some measure of cushion to the user as the skateboard wheels travel over bumps along the riding surface like a street, driveway, sidewalk, trail, or ramped skateboard park. In its standby position, the transverse axle 444 is defined by transverse axis T-T which is approximately perpendicular to longitudinal axis B-B of the skateboard deck 422. In this manner, the scooter 420 travels on its wheels in a forward or backwards direction substantially parallel to longitudinal axis B-B.

The front wheel assembly 436 of scooter 420 may be pivoted by means of handlebar 450, so that the transverse axis T-T of the axle 444 can be maneuvered by the user's hands to turn at an angle β with respect to the longitudinal axis B-B of deck 422 that is greater than or less than 90°. The rear wheel assembly (not shown) may comprise a transverse axle 444 that is fixed with respect to the longitudinal axis B-B as is known in the prior art. Alternatively, this rear wheel assembly may comprise a second pivotable wheel assembly that can be maneuvered by the user's foot while riding the skateboard. In the case of two such pivotable wheel assemblies, they may be maneuvered by the user's hands and foot independently with respect to each other. The pivotable wheel assemblies 436, 438 may be maneuvered by the user along a full 360° arc of motion. Alternatively, the permitted arc of motion may be restricted to less than 360°, as described below.

Figure 37:
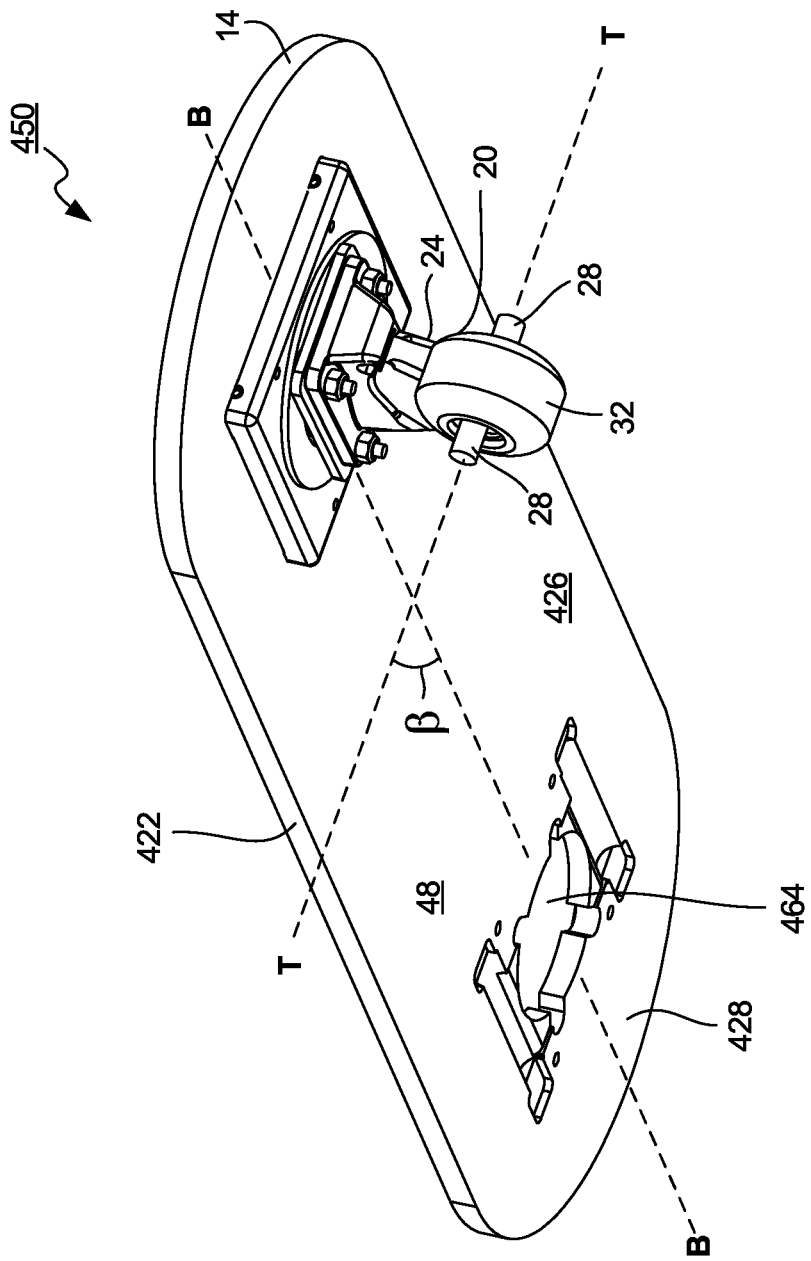
FIG. 37 is a bottom perspective view of the scooter of FIG. 35 with a single front wheel assembly, and the rear wheel assembly removed.

Indeed, the truck for the scooter wheel assembly 434 is the same as the truck 251 shown in FIGS. 20-21 and described above. The rear truck should typically have a conventional hanger/axle defining a distance of, e.g., 146, 156, or 179 mm between the two wheels in order to provide s stable ride for the scooter. Meanwhile, the forward truck should have feature a shorter hanger/axle between the two wheels in order to make it easier for the user to turn the front wheel, while the scooter is moving. Such a distance for this forward hanger/axle might be about ½-1 inch. Alternatively, the front axle may comprise a single wheel mounted along the axle like a roller blade wheel (see FIG. 37).

Figure 38:
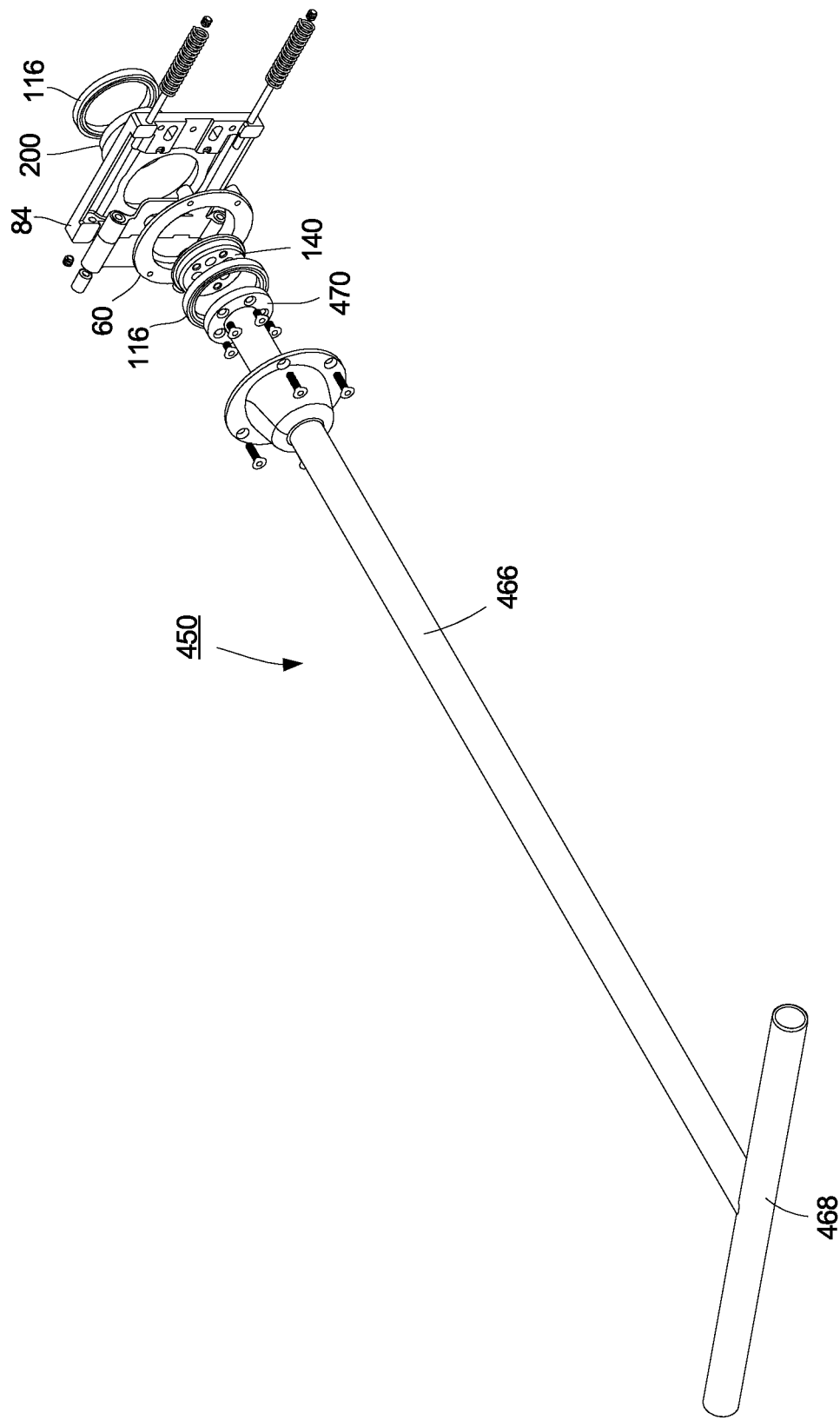
FIG. 38 is an exploded perspective partial view of the scooter of the present invention with the deck removed.

The scooter assembly 460 of the present invention having user-maneuverable wheel assemblies 436, 438 and a north-seeking return mechanism 462 are shown in the exploded view of FIG. 38. In the case where the skateboard 10 features two user-maneuverable wheel assemblies 436, 438, the deck 422 of the scooter comprises a pair of openings 464. Each opening is preferably circular in shape, although any other shape will suffice. The openings and surrounding deck region bear the same structural features as those shown in FIGS. 4-5 described above.

Figure 39:
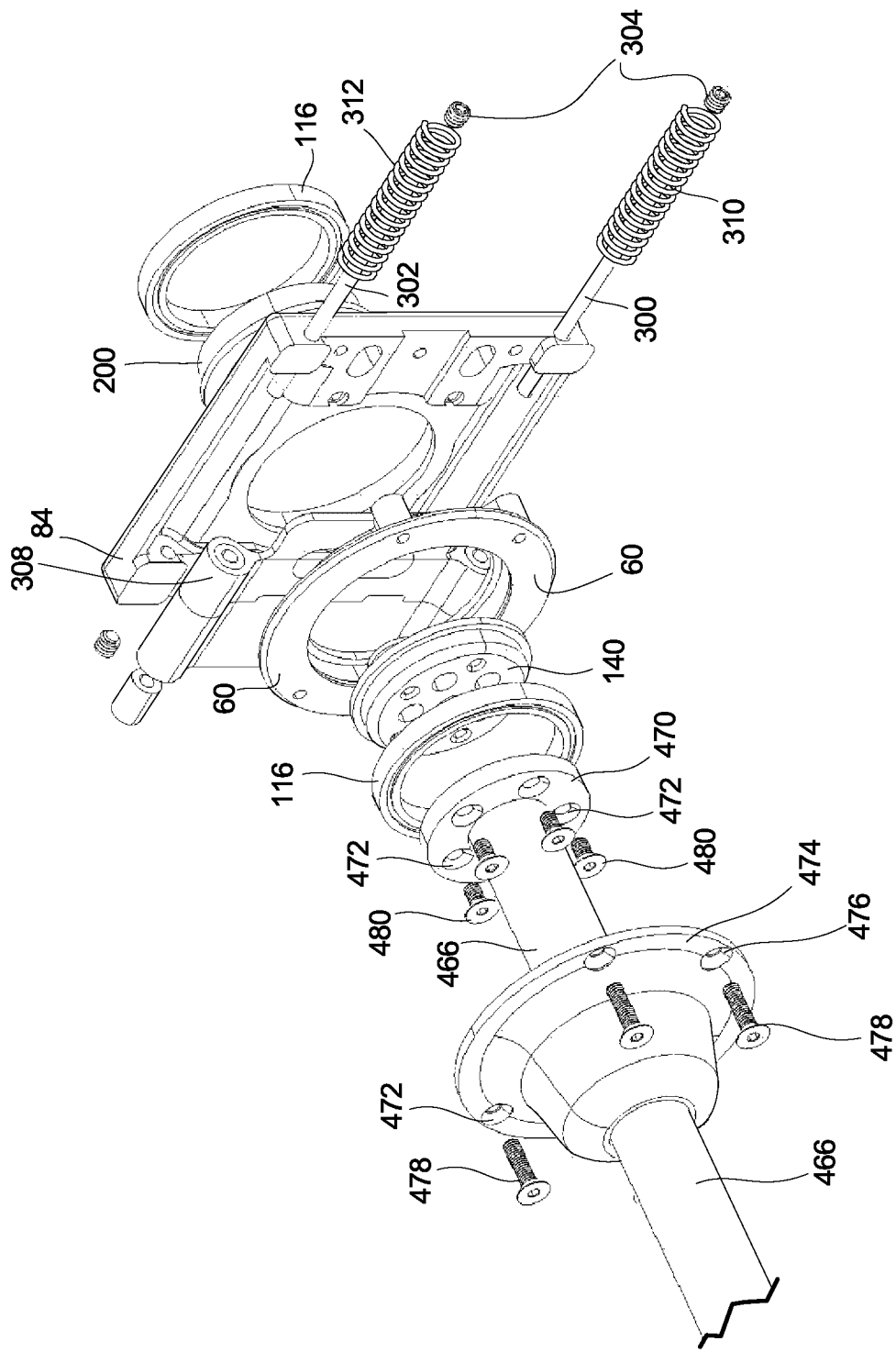
FIG. 39 is an enlarged exploded perspective partial view of FIG. 38.

As shown more clearly in FIG. 39, handlebar 450 comprises a post 466 that is vertically-oriented with respect to scooter deck 422. Handle 468 connect transversely to the top of the post 466 provides means for the user's hands to maneuver the handlebar 450 to steer the scooter. At the bottom of post 466 mounting base 470 having a plurality of holes 472 (preferably five) formed there through. A decorative bell-shaped cowling 474 having a hole in it slides along post 466 to cover the mounting assembly of the handlebar to the scooter deck, as described below. A plurality of holes 476 are formed around the periphery of cowling 474 for screws 478. Moreover, this bell-shaped cowling provides stability to the vertically-mounted post 466 so that the user does not accidently pull it towards the deck of the scooter during a maneuver.

For purposes of the scooter 420, the upper bearing housing 60, upper bearing 116, crankshaft 140, housing 84 for the north-seeking return mechanism, crankshaft receptor 200, lower bearing 116, and lower bearing housing 110 are the same in terms of structure and function as the corresponding parts described above for skateboard 10. Instead of foot pad 180 being connected to crankshaft 140 by means of bolts 192, mounting base 470 on handle bar post 466 is connected to crankshaft by means of bolts 480. Thus, when the user turns handlebar 450 with respect to longitudinal axis B-B of the deck 422, crankshaft 140, which is operatively connected to crankshaft receptor 200, which is operatively connected to the truck for wheel assembly 466 will likewise be turned in the same direction to the same degree. Similarly, when the user releases force from the handlebar, the north-seeking return mechanism 82 will operate as described above to automatically turn the axle of wheel assembly 466 back to its standby position which is parallel to the longitudinal axis B-B. If the rear wheel assembly 468 is operatively connected to a foot disk 180 mounted into the scooter deck 422, as described above, the user can use his rear foot to steer the rear wheel assembly by means of the foot disk independently of the front wheel assembly 466 which is turned by means of handlebar 450.

While the integrated housing 400 that incorporates the lower bearing housing 110 may provide greater strength than the separate north-seeking return mechanism housing 84 and lower bearing housing 110, described above and shown in FIGS. 3 and 25, it has been discovered that under some circumstances this structure may be insufficient to withstand aggressive tricks performed on the skateboard. More specifically, during aerial maneuvers, the wheel assemblies 250 of the skateboard can land on the ground with 5,000 pounds of downwards force. Such significant forces applied to those wheel assemblies can cause the snap ring 230 to become disengaged from the housing 400 (or the lower bearing housing 110 if such a separate bearing housing is used. But, the snap ring is employed to secure the lower bearing 220 in position inside the bearing housing or its equivalent structure inside north-seeking return mechanism housing 400. If the bearing 220 becomes detached from the bearing housing, then the wheel assembly 250 will not be turned properly by means of the rotated foot pad 180.

Figure 40A:
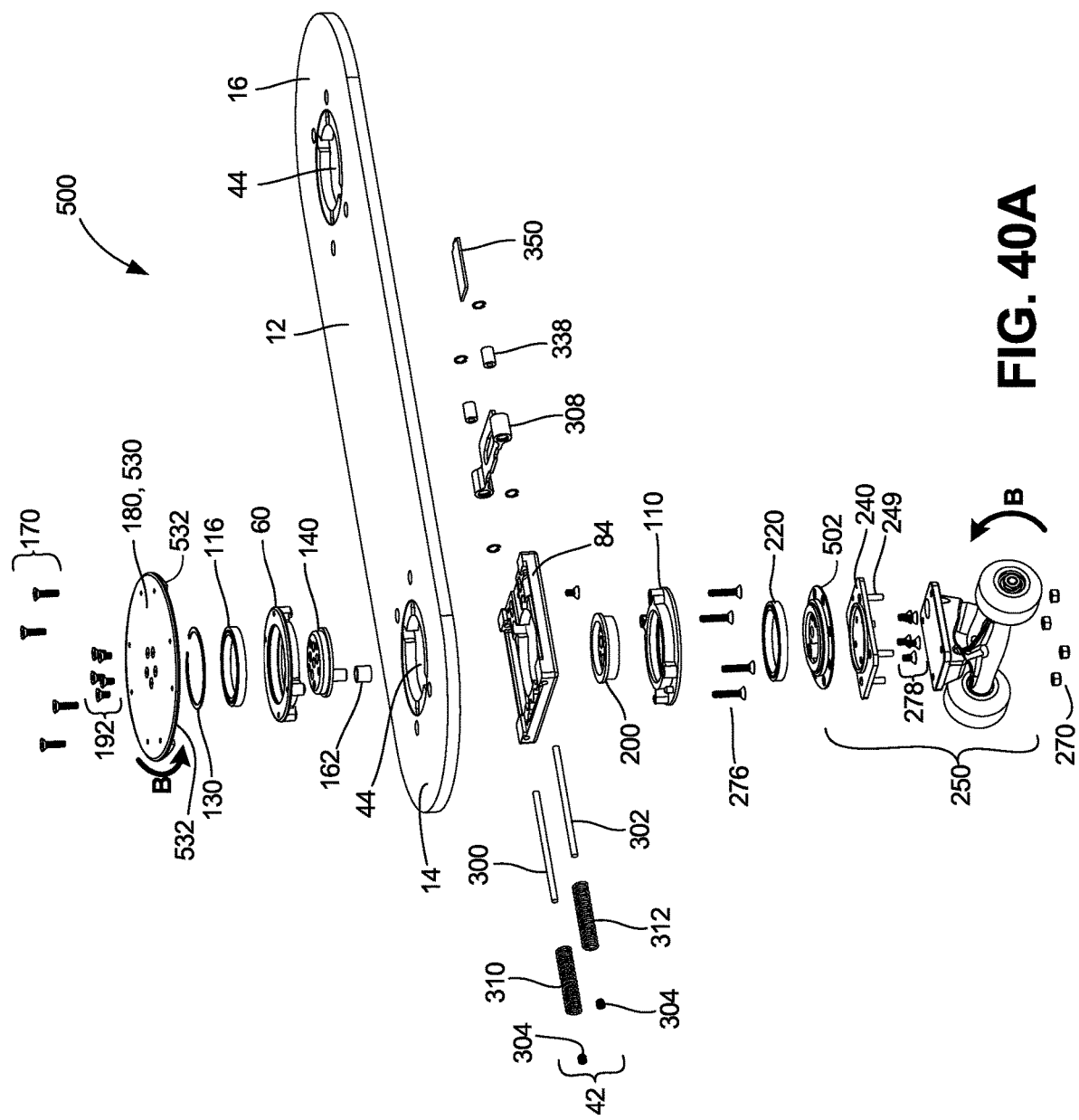
FIG. 40A is an exploded perspective view of the skateboard of the present invention, containing the retaining plate for the lower bearing housing, an enlarged foot disc.
Figure 42:
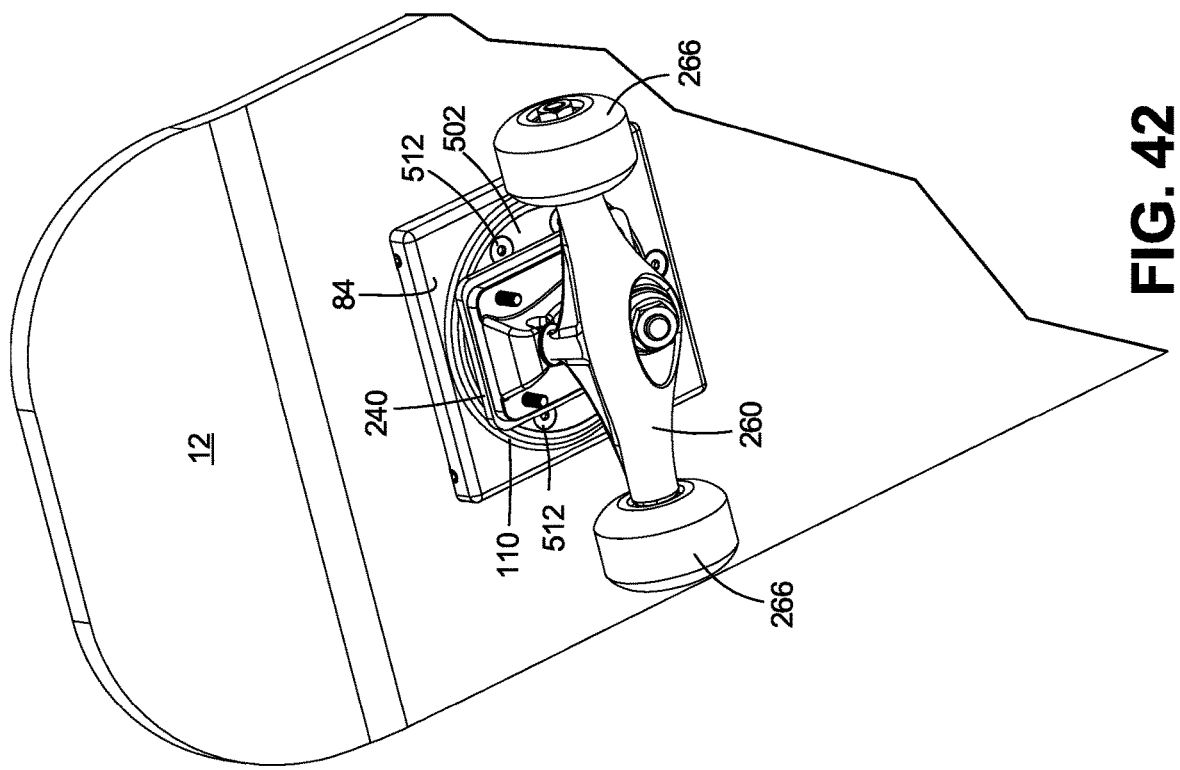
FIG. 42 is cut-away, bottom perspective view of the retaining plate of FIG. 41 attached to the lower bearing housing.
Figure 41:
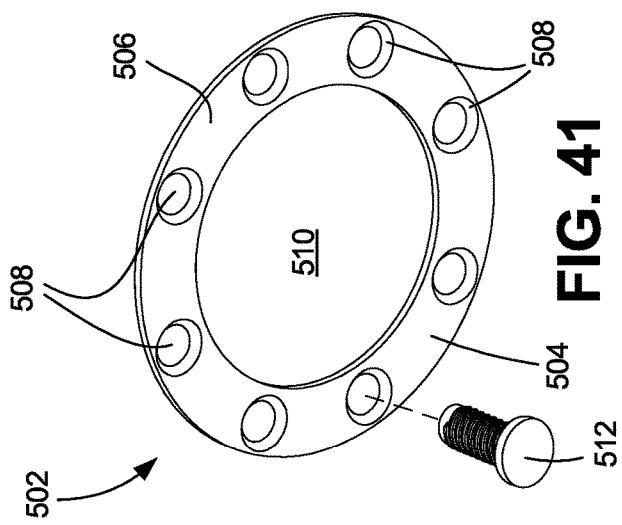
FIG. 41 is a perspective view of the retaining plate.

In response, a retention plate 502 is substituted for the lower snap ring 230, as shown more clearly in the exploded FIG. 40A view of this modified embodiment of the skateboard assembly 500. As shown in FIGS. 41-42, this retention plate 502 comprises a flat, round plate 504 defined by an annular region 506 with a plurality of holes 508. Round opening 510 is defined by the annular region of the plate.

The retention plate 502 is attached to the bottom surface of lower bearing housing 110 or integrated north-seeking return mechanism housing by means of a plurality of bolts 512. In this manner, the retention plate 502 securely maintains lower bearing 220 inside the internal chamber of the lower housing 110 or integrated north-seeking mechanism housing 400 so that truck plate 240 rotates smoothly with respect to the housing attached to the bottom of the skateboard deck 12. This, in turn, enables the wheel assembly 250 to be smoothly rotated by means of foot pad 180 when the user's foot turns the foot pad, and the north-seeking return mechanism 84 to counter-rotate the foot pad and associated wheel assembly 250 back to its true-north position when the user's foot no longer applies rotational force upon the foot pad.

The north-seeking return mechanism 84 of the present invention is crucial for counter-rotating the foot pad 180 and the associated wheel assembly to their true-north position. This feature ensures that the axles of the front and rear wheel assemblies will be approximately transverse to the longitudinal axis A-A of the skateboard deck 12 when an aerial maneuver is completed. Otherwise, if the front and rear wheel assemblies land upon the ground out of transverse alignment, the nose or tail of the skateboard can dip towards the ground in an unpredictable manner to ruin the aerial maneuver or threaten the safety of the skateboard rider.

Figure 30:
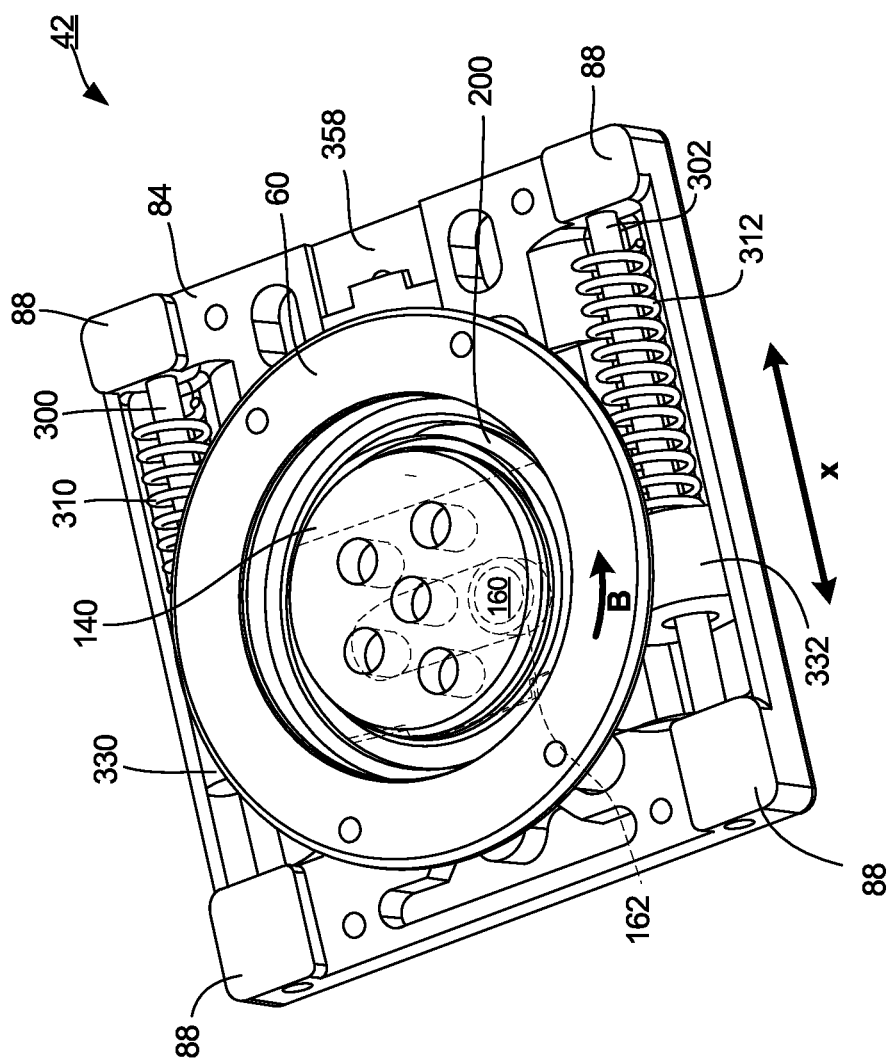
FIG. 30 is a cut-away view of the north-seeking return mechanism in its partially-turned position.

However, the operation of this north-seeking return mechanism is dependent upon the compression springs 310, 312 contained inside the housing 84 (see FIGS. 29-31). The foot pad 180 and wheel assembly 250 are counter-rotated to their true-north position as the energy stored in the compression springs expands the compression springs to their original, non-compressed length to push the Scotch yoke back along the piston rods 300, 302 to its standby position. But, the counter-rotational response of the north-seeking return mechanism 42 may be modified by adjusting the preload of the compression springs 310, 312.

Figure 43:
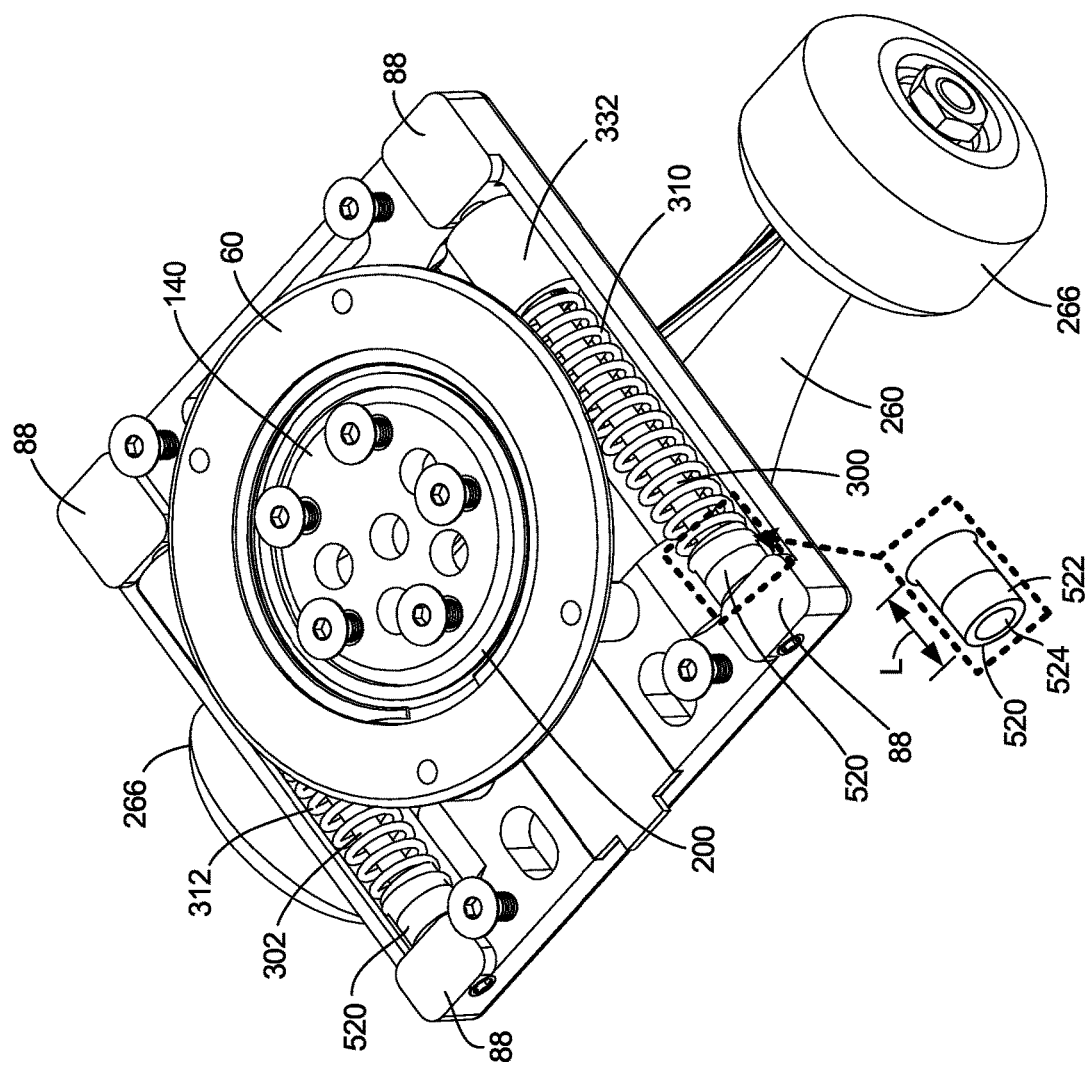
FIG. 43 is a cut-away view of the north-seeking return mechanism with spacers positioned along the piston rods to apply a preload of force upon the compression springs.

As shown in FIG. 43, a spacer 520 may be inserted inside the housing 84 of the north-seeking return mechanism 42. This spacer comprises a cylindrical body 522 formed from a suitable material like plastic or metal with a through bore 524. The spacer 520 is inserted around piston rod 300, 302 between one end of compression spring 310, 312 and the interior wall of the square shaped boss 88 of the housing. The spacer 520 has a length L.

The spacer 520 acts to take up space along piston rod 300, 302 inside open-faced well 94, 95, and apply a preload upon compression spring 310, 312 inside the open-faced well in order to increase the compression load upon the spring when the return mechanism 42 is in its true-north position (FIG. 43). As the compression spring 310, 312 is further compressed inside the open-faced well of housing 84 as the foot pad 180 is rotated by the user's foot to move the Scotch yoke 308 linearly along piston rods 300, 302 (See FIGS. 30-31), the compression load will be further increased upon the compression spring. But when the user releases the rotational foot force upon the foot pad 180, the compression spring 310, 312 will expand to its original length with even greater force than if the spacer 520 were not present in the housing 84. This increased compression load will cause the enhanced force to be applied against the Scotch yoke to move it more quickly along the piston rods 300, 302, counter-rotating the crankshaft receptor 200, crankshaft 140, and foot pad 180 in the process.

A variety of spacers 520 of different lengths L may be selected depending on the preload force that the user wants to apply to the compression spring 310, 312 in its standby state. The lengths L of the spacer should be ⅛-¼ inch, preferably an ⅛ inch.

Figure 44:
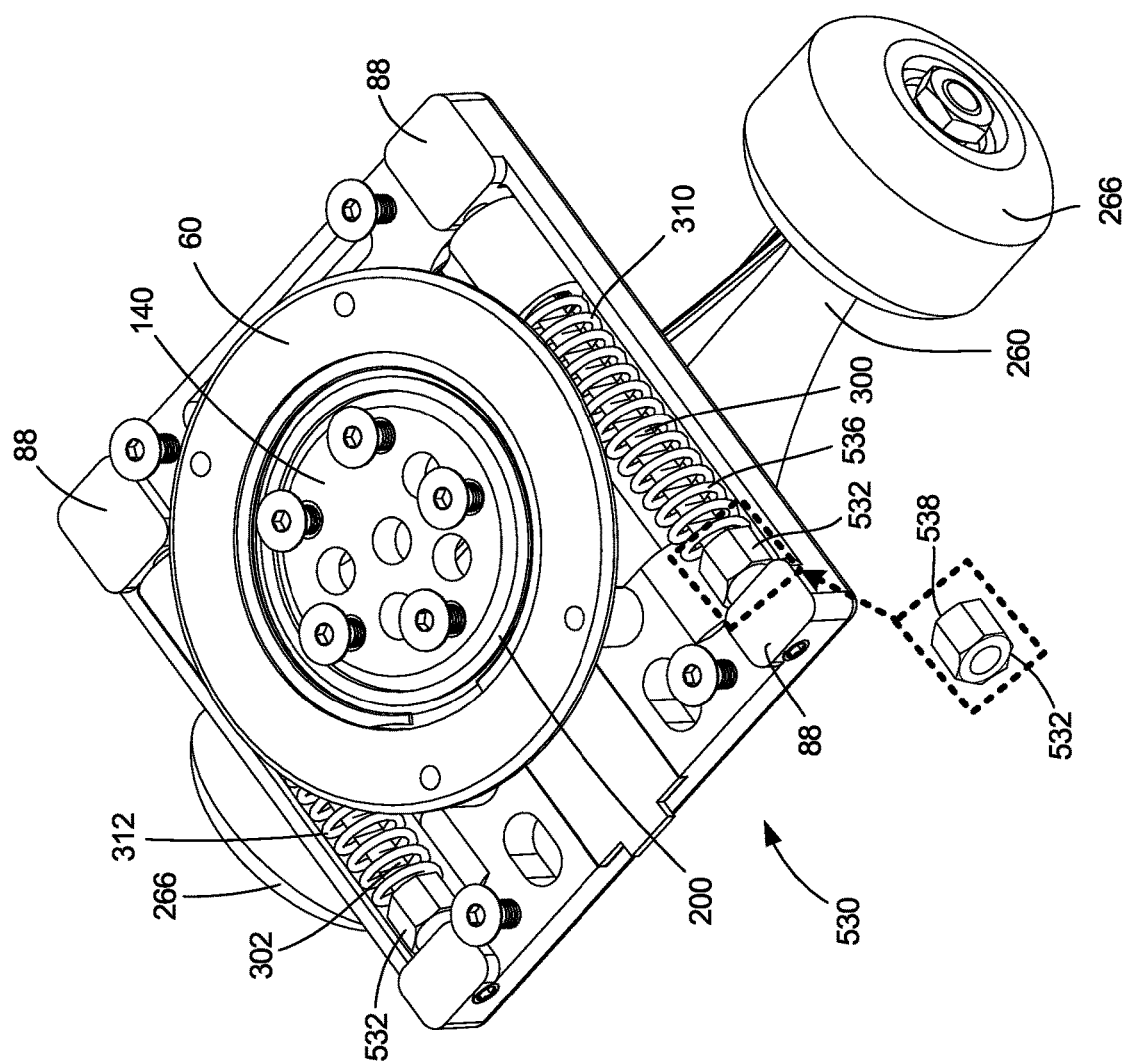
FIG. 44 is cut-away view of the north-seeking return mechanism with adjustable nuts positioned along the piston rods to apply a preload of force upon the compression springs.

In an alternative embodiment 530 depicted in FIG. 44, an adjustable nut 532 may be used in lieu of spacer 520. This threaded nut 532 bears helical threads 534 along its inner surface. These threads cooperate with helical threads 536 formed along the exterior surface of piston rod 300, 302. The bearing face 538 of nut 532 will act to apply a preload upon compression spring 310, 312 in a similar manner to the spacer 520 embodiment of FIG. 43. However, the position of the nut 532 is adjustable along piston rod 300, 302 to allow the user to increase or decrease the preload force applied upon the compression spring 310, 312 in its standby condition. This adjustable nut 532 eliminates the need for a number of spacers 520 of different lengths L. It also eliminates the need for the user to disassemble north-seeking return mechanism 42 to insert spacer 520, or swap out a spacer of a different length L to adjust the preload force applied to the compression spring 310, 312.

Figure 40B:
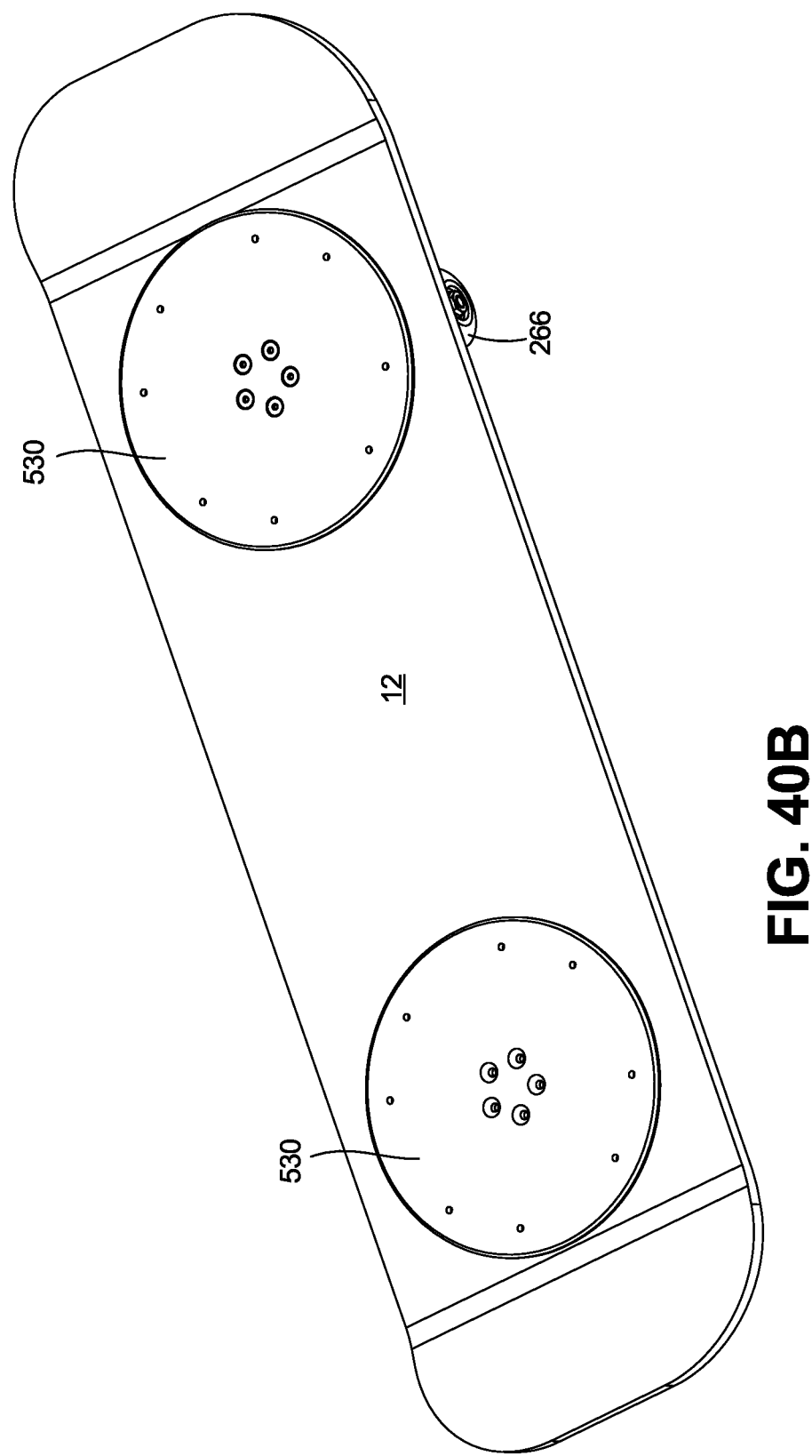
FIG. 40B is a perspective view of the skateboard containing enlarged foot disks and associated user-maneuverable trucks and wheel assemblies in the forward and rear positions.

Depending upon the size of the user's foot, the shoe may extend beyond the perimeter of foot pad 180 to accidentally engage deck 12. Dragging the foot across deck 12 can impede the foot's rotation of foot pad 180 and its associated wheel assembly 250. Therefore, in another embodiment of the present invention, an enlarged foot pad 530 can be used, as shown in FIGS. 40A and 40B. Such an enlarged foot pad 530 has a larger diameter than foot pad 180 shown in FIG. 3. This enlarged foot pad 530 should have a diameter range covering the full range of adult and children's shoe or foot lengths.

Figure 45:
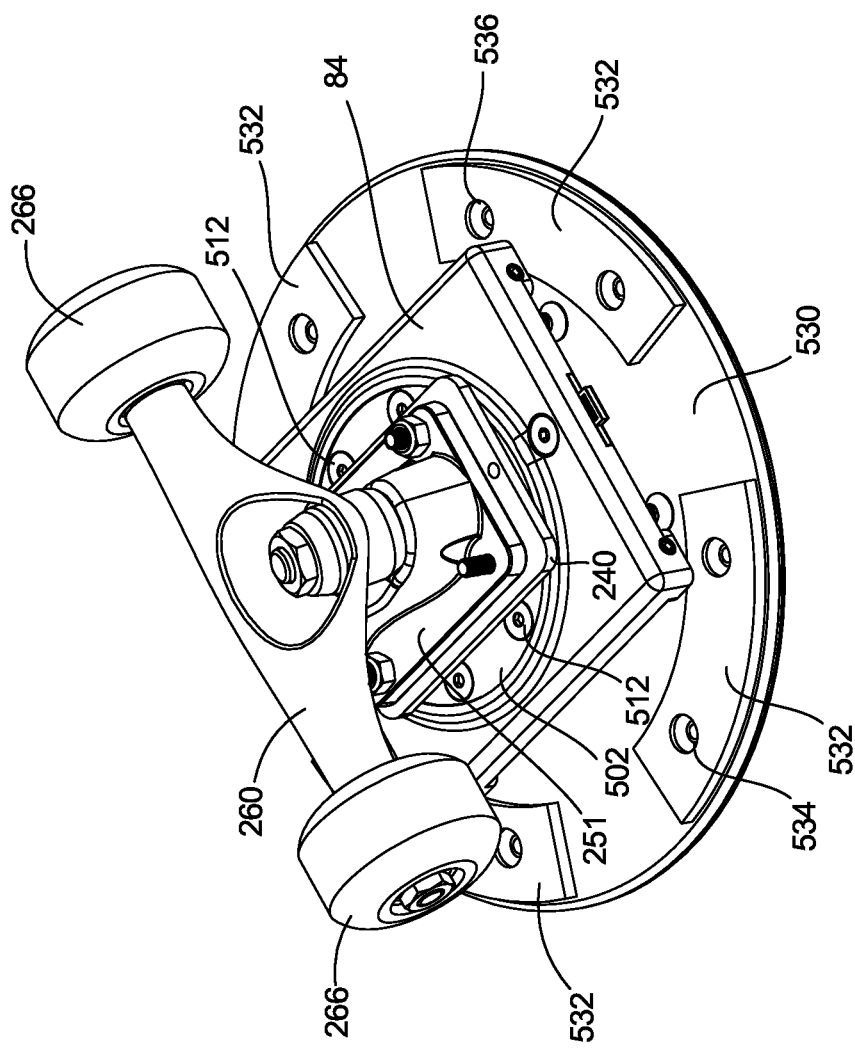
FIG. 45 is a bottom perspective view of the foot disc, user-maneuverable trucks and north-seeking return mechanism assembly with low-friction pads secured to the bottom surface of the foot disc.

However, as the diameter of the foot pad 530 is increased, it will become much larger than the diameter of the upper bearing housing 60 and consequently opening 44 in the skateboard deck 12. Thus, instead of housing the foot pad fit inside the deck opening so that its top surface is substantially co-planar with the top deck surface, as described above and shown in FIG. 1, enlarged foot pad 530 is positioned on top of deck 12, as shown in FIG. 40B. At the same time, a plurality of low-friction pads 532 are secured to the bottom surface of foot pad 530 around its circumference, as shown in FIG. 45. Such low-friction pads 532 are flat with holes 534 for accommodating bolts 536 that secure the pads to openings (not shown) formed within the bottom surface of the foot pad.

The foot pads 532 should be made from a suitable plastic polymer material that has a low coefficient of friction. Such a material includes Delrin® (acetyl homopolymer) made by DuPont. A complete ring of the low-friction material may cover the circumference of the foot pad 530. But, a plurality of discrete portions of the spacer material, such as four pieces 532, is preferred. The spacers act to reduce frictional drag as the user's foot rotates the foot pad 530 along the top surface of the skateboard deck 12. Moreover, the pads 532 act to provide lateral stability to the foot pad so that it does not wobble during operation with respect to the top surface of the deck.

As shown in FIG. 21, truck 251 employs upper bushing 270 and lower bushing 272 spaced along king pin 257 between base plate body 256 and hanger 260. These bushings typically formed from a resilient polymer material like polyurethane provide some measure of shock absorbency to the skateboard as the user travels over bumps or hits the ground following a jump or aerial maneuver.

But the bushings 270, 272 also compress on one side of the truck 251 to allow the board 12 to lean with respect to the wheels 266. This allows a user to turn the board direction above and beyond the action of the maneuverable foot pads used to turn the wheel assemblies. King pin nut 268 may be tightened or loosened to increase or decrease the degree of bushing compression to adjust the turning radius and response of the truck. Less compressed bushings produce easier turning of the skateboard, which can be helpful for novice riders.

However, a novice or inexperienced rider can be further assisted by replacing the polyurethane or rubber bushings 270, 272 with bushings made from a hard material like nylon, polyetherimide ("PEI") plastics like ULTEM® plastic sold by Plastics International of Eden Prairie, Minn., or polyaryletherketone plastics like polyether-ether-ketone ("PEEK") plastics. These are materials exhibiting a high durometer value. This hardened material for the bushings will facilitate turning the board direction via the user leaning his body with respect to the board. This reduces the need to turn the wheel assemblies 250 via the foot pad 180, 530.

One of the effects produced by the user-maneuverable wheel assemblies of the present invention is that the skateboard user, especially skilled riders, turn out to ride the foot pads 180 with their feet rather than the deck 12 of the skateboard, itself. This result reduces the need for a continuous solid deck 12 that is conventional for skateboards.

Figure 46:
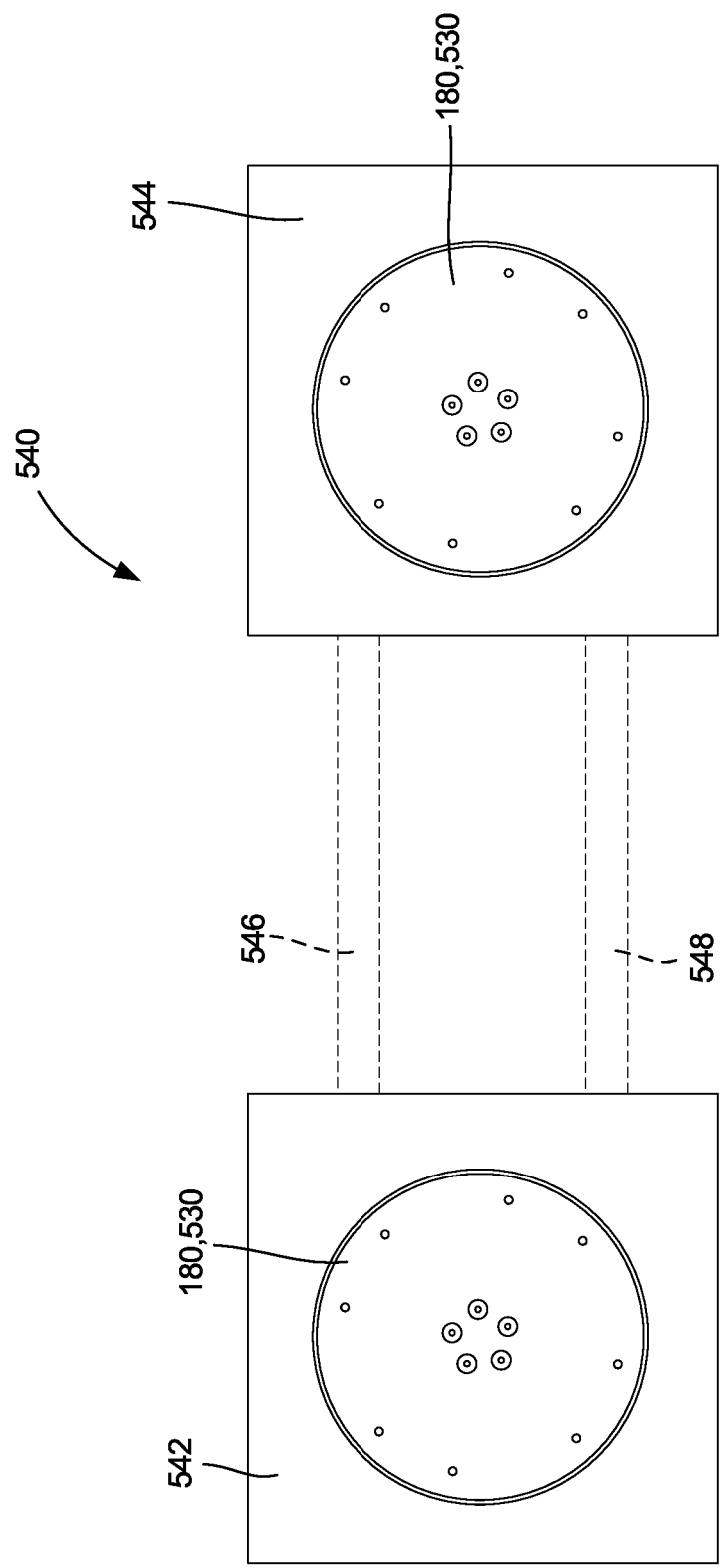
FIG. 46 is a plan view of an alternative tubular structure for the deck of the skateboard.

An alternative embodiment 540 of the "deck" is shown in FIG. 46 comprising a tubular structure. A small front deck 542 and rear deck 544 are connected to each other by means of longitudinal tubes 546 and 548. The front deck 542 and rear deck 544 each comprise an opening 550 and 552, respectively that is similar to openings 44 formed in deck 12 (see FIG. 3), and accommodate the upper bearing housing 60 and crankshaft 140 described above for the rotatable foot pad 180. The front deck 542 and rear deck 544 also comprise the plurality of threaded holes 554 around the perimeter of openings 550 and 552 for receiving the bolts used to attach the housing 84 for the north-seeking return mechanism 42, as described above. Such a tubular structure for the skateboard "deck" 540 made from steel or other metal can be cheaper to manufacture than conventional decks 12 made from fiberglass or other composite plastic materials. At the same time, a metal structure exhibits the necessary strength to resist the forces applied upon the deck and wheel assemblies during aerial tricks and maneuvers. Meanwhile, the user can easily stand with his feet upon the two foot pads 180, 530.

A simpler north-seeking return mechanism 560 is depicted in FIG. 47. The foot pad 562 is operatively attached to deck 12 using the upper bearing housing 60. It turns the wheel assembly 250 by means of the rotary crankshaft 140 and crankshaft receptor 200 also described above. However, instead of the relatively complicated north-seeking return mechanism 42 containing the Scotch yoke 308, piston rods 300, 302, and compression springs 310, 312 described above, the mechanism 560 includes a housing 568 attached to the bottom of the deck into which the crankshaft attached to the foot pad 562 depends. Two coil springs 564 and 566 are also contained inside the housing 568. One end of each of the springs 564, 566 is attached to the 9:00 (left) and 3:00 (right) side positions, respectively, of the crankshaft 140. The other ends of the compression springs are attached to the forward interior wall 570 of the housing 568.

In FIG. 47, the wheel assembly is in the true-north position. When the user's foot turns the foot pad 562, e.g., in a clockwise direction, the wheel assembly will be turned in a rightward direction via the interlocking crankshaft 140, crankshaft receptor 200, truck plate 240, and wheel assembly 250 that are operatively connected to the rotated foot pad 562. Bearings contained inside the upper and lower bearing housings ensure smooth turning operation. At the same time, the clockwise turning of the foot pad will compress coil spring 564 and stretch coil spring 566. When the user removes the rotational force applied by his foot to foot pad 562, the energy stored in the springs will cause compression spring 566 to push the crankshaft in a counterclockwise direction, while compression spring 564 pulls the crankshaft also in the counterclockwise direction, thereby resulting in the foot pad and wheel assembly being counter-rotated toward the true-north position. If compression springs 564 and 566 are properly balanced in terms of their length and resistance, this mechanism 560 will result in the wheel assembly recovering its true-north position. Meanwhile, this mechanism has fewer parts than the true-north recovery mechanism 42 described above, for the two coil springs perform the recovery function without having to convert the rotational movement applied to the foot pad into linear movement of a Scotch yoke contained inside the housing. This alternative north-seeking return mechanism 560 should accommodate approximately a 90 degree range of rotation for the wheel assembly, instead of the 360 degree range of rotation permitted by the Scot yoke of the true-north return mechanism 42.

Yet another embodiment of a north-seeking return mechanism 580 in combination with a tubular "deck" 582 for a skateboard is shown in FIGS. 48-50. As shown in FIGS. 48A and 48B, a front foot pad 584 is connected to the top end 586 of a crankshaft 588. The lower end 590 of the crankshaft 588 is connected to the truck of a wheel assembly 592. Similarly, a rear foot pad 594 is connected to the top end 594 of a second crankshaft 596. The lower end 598 of the crankshaft is connected to the truck of a second wheel assembly 600. The crankshafts are contained in a forward housing 602 and a rear housing 604. Tubular support 606 connects the forward housing 602 and rear housing 604, and defines a longitudinal axis C-C for the north-seeking return mechanism 580.

As shown more clearly in FIGS. 49A and 49B, the crankshaft 588 and 596 comprise flat-plane crankshafts. Each one is vertically mounted in its respective housing along a vertical axis D-D. An inlet crank portion 610 and outlet crank portion 612 are connected to each other by means of an eccentrically oriented wing 614 comprising an upper horizontal leg 616, vertical intermediate leg 618, and lower horizontal leg 620. The upper and lower horizontal legs 616 and 620 are co-planar. The crankshafts are preferably cast from a continuous piece of metal for strength and seamless motion as the crankshaft rotates about its vertical axis D-D.

Connecting rod 622 comprises a piston 624 with a circular linkage 626 at its one end. The circular linkage 626 surrounds vertical intermediate leg 618 of the eccentrically mounted wing 614 of the crankshaft. The piston portion 624 of the connecting rod 622 extends inside tubular support 606. A shoulder 628 is formed along the connecting rod 622 between the circular linkage 626 portion and piston portion 624.

A foot pad 630 is attached to the inlet crank portion 610 of the crankshaft. A bearing 632 (not shown) facilitates the rotated movement of the foot pad. The outlet crank portion 612 is attached to the truck plate 634 of the wheel assembly 592, 600. A bearing 636 (not shown) facilitates the rotated movement of the truck plate and wheel assembly 592, 600. In this manner, when the user's foot rotates the foot pad in the clockwise or counterclockwise direction, the crankshaft will be rotated inside the housing in the same direction and to the same degree as the rotated foot pad, as will the wheel assembly that is connected to the outlet crank portion 612 of the crankshaft. Meanwhile, a compression spring 638 surrounds the piston portion of the connecting rod. Its one end touches shoulder 628 of the connecting rod, while its other end touches pivot block 640 that slidably engages the distal end 642 of the connecting rod. The pivot block 640 is located further inside the tubular support 606.

Figure 50A:
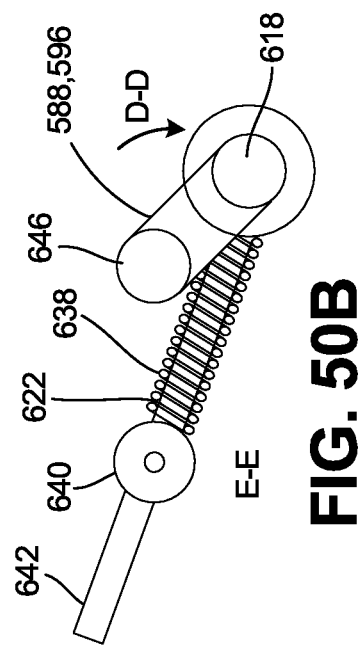
FIG. 50A is a plan view of the crankshaft, connecting rod, and compression spring of the FIG. 49A third-embodiment of the north-seeking return mechanism shown in its standby, true-north position.

As shown in FIGS. 48A, 49A, and 50A, the true-north position for the wheel assembly where its axle is traverse to axis C-C of the tubular support exists when the upper and lower horizontal legs 616 and 620 of the eccentrically-oriented wing 614 are co-planar with longitudinal axis C-C, and the vertical intermediate leg 618 is the furthest distance from the tubular support. In this position, the connecting rod 622 is withdrawn as fully as possible forward or rearward from the support tube 606. The compression spring 638 resides in its low-energy state.

But, when the crankshaft 588, 596 is rotated in a clockwise or counterclockwise direction by means of the foot pad 630, the eccentrically-oriented wing 614 and its vertical intermediate leg 618 will be rotated in an arc towards the support tube. This will cause the connecting rod 622 that is rotatably connected to the crankshaft's vertically intermediate leg 618 by means of circular linkage end 626 to extend into the hollow tubular support 606, contracting compression spring 638 in the process.

FIG. 50A depicts the mechanism from overhead. It shows connecting rod 622 pivotable connected to vertical intermediate leg 618 of the crankshaft 588, 596 which is turned about its vertical axis of rotation 646 defined by the inlet crank portion 610 and outlet crank portion 612 of the crankshaft. Pivot block 640 supports the distal end of the connecting rod 622. Compression spring 638 is supported by the connecting rod 622 between its shoulder 628 and pivot block 640. This is the true-north position for the associated wheel assembly of the skateboard.

Figure 50B:
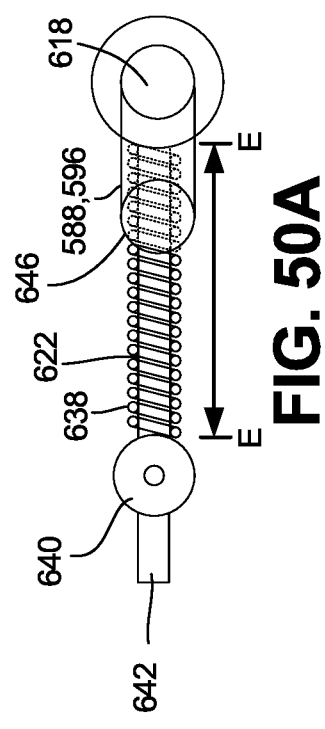
FIG. 50B is a plan view of the mechanism of FIG. 50A at the 45 degree rotated position.

When the foot pad 584, 594 is rotated 45 degrees in a clockwise direction, as shown in FIG. 50B, the crankshaft's vertical intermediate leg 618 is rotated 45 degrees along arc D-D. This will cause the connecting rod 622 to pivot with respect to pivot block 640 with the distal end of the connecting rod sliding further through the pivot block to shorten the distance E-E between the connecting rod's shoulder 628 and the pivot block 640. This contracts compression spring 638 to induce a higher energy state.

Figure 50C:
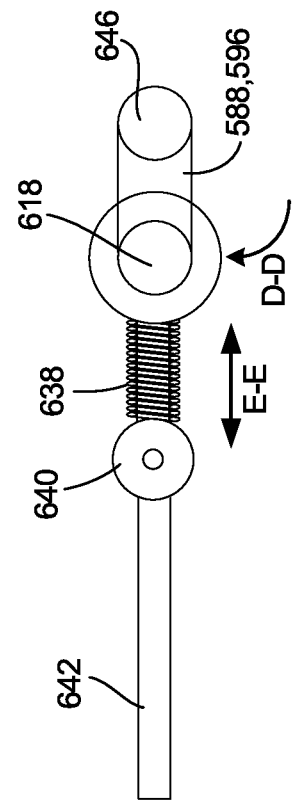
FIG. 50C is a plan view of the mechanism of FIG. 50A at the 90 degree rotated position.

If the user continues to turn foot pad 584, 594 to the 90 degree clockwise position shown in FIG. 50C, the crankshaft's vertical intermediate leg 618 will likewise be rotated along arc D-D to the 90 degree position. This will cause connecting rod 622 to further slide inwardly through pivot block 640 to further shorten compression spring 638.

Figure 50D:
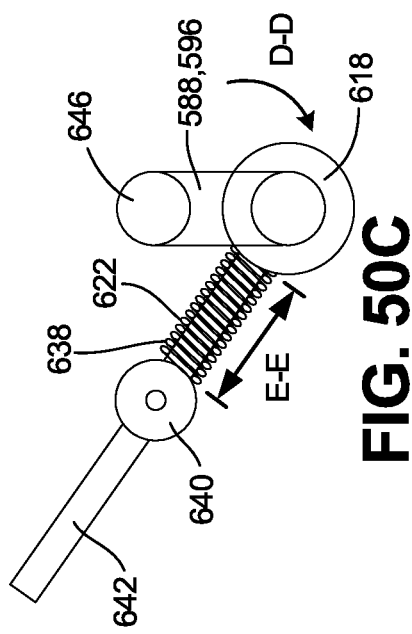
FIG. 50D is a plan view of the mechanism of FIG. 50A at the 180 degree rotated position which corresponds to FIGS. 49B and 48B.

If the user continues to turn foot pad 584, 594 to the 180 degree clockwise position shown in FIG. 50D, distance E-E along the connecting rod 622 is shortened still more to further contract compression spring 638. This is the maximum contraction, highest energy state for the compression spring 638 shown in FIG. 49B.

Figure 50E:
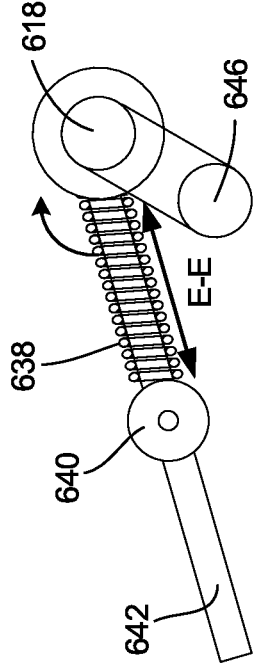
FIG. 50E is a plan view of the mechanism of FIG. 50A at the 270 degree rotated position.
Figure 50F:
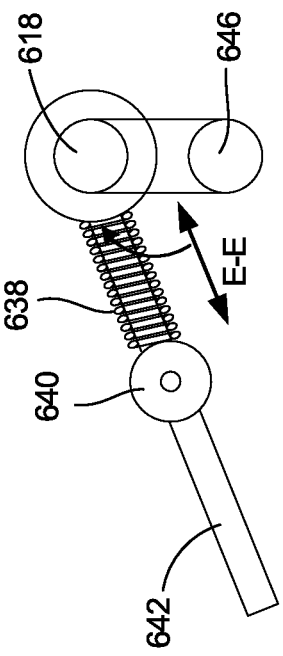
FIG. 50F is a plan view of the mechanism of FIG. 50A at the 315 degree rotated position.

The foot pad 584, 594 can continue to be turned by the user to the 270 degree position shown in FIG. 50E and the 315 degree position shown in FIG. 50F, for this north-seeking recovery mechanism allows the foot pad and the wheel assembly to be turned throughout a 360 degree arc. The foot pad and wheel assembly can also be turned by the user in a counterclockwise direction with the same effect.

When the user's foot releases the rotational force from the foot pad 584, 594, the stored energy in the retracted compression spring 638 will cause the spring to expand to its original length to push against the shoulder 628 of connecting rod 622 to extend the connecting rod outwardly from pivot block 640 and out of the tubular support, counter-rotating the crankshaft in the process to return it to its true-north position. Thus, this north-seeking return mechanism 580 converts the rotational movement of the crankshaft 588, 596 into linear movement of the connecting rod 622 similarly to the north-seeking return mechanism 42 translating the rotational movement of crankshaft 140 into linear movement of Scotch yoke 308. Moreover, mechanism 580 enables 360 degree rotation and counter rotation of the wheel assembly just like mechanism 42 achieves. But mechanism 580 uses fewer parts than mechanism 42 does.

Finally, the scooter embodiment of the present invention shown in FIGS. 38-39 has a handle bar post 466 that is mounted to the user-maneuverable truck mechanism along a vertical axis. But, it may be more ergonomic for the user to have the handle bar post raked towards the user so that he does not need to lean or reach as far forward to grasp the handle bar 468. Moreover, a raked post will enable the front wheel assembly of the scooter to be mounted further forward along the scooter deck which can improve the stability of the scooter as its front and rear wheel assemblies ride along the ground surface.

Figure 51:
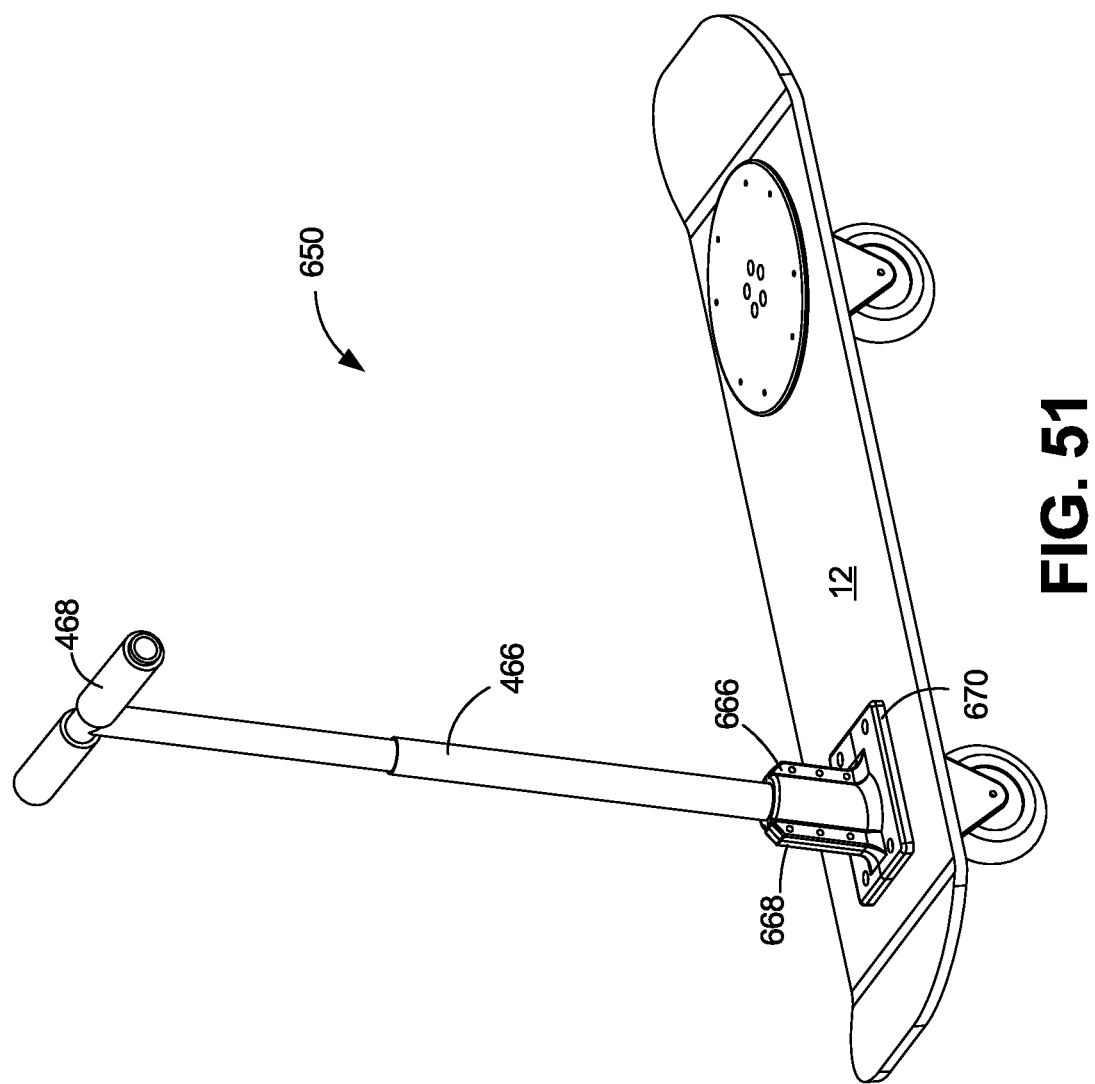
FIG. 51 a perspective view of the scooter with a raked handle bar post.
Figure 52:
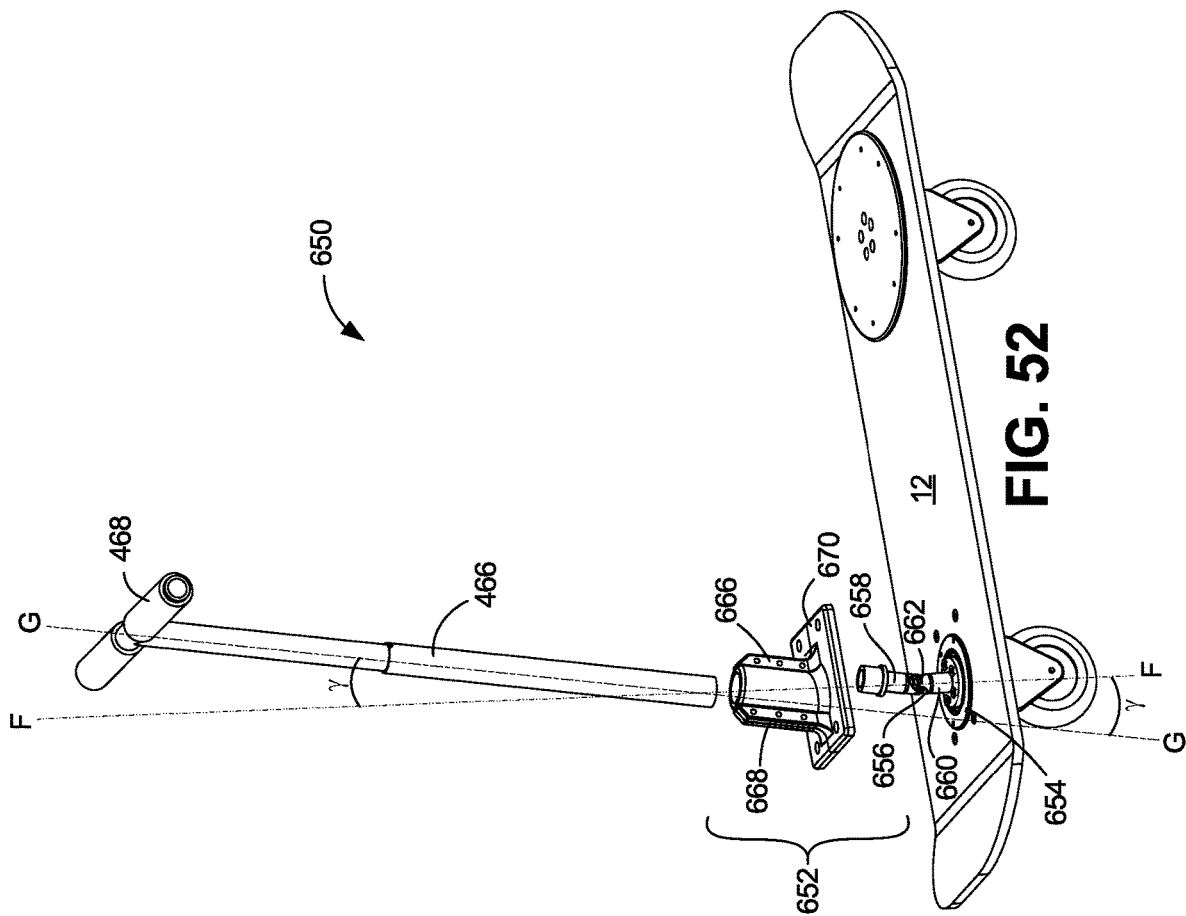
FIG. 52 is an exploded view of the mechanism for mounting the raked hand bar post of FIG. 51 to the scooter.

FIGS. 51-52 show an alternative embodiment 650. The same upper bearing housing 60, bearing 116, crankshaft 140, crankshaft receptor 200, bearing 116, and lower bearing housing as shown in FIG. 39 are used to operably connect the handle bar post 466 to the front wheel assembly 652. But, an adaptor plate 654 is bolted onto deck 12. Universal joint 656 has an upper post 658 and a lower post 660 pivoting with respect to each other within a vertical plane by means of linkage pin 662. The lower post of the universal joint 656 is attached to the crankshaft 140. Meanwhile, upper post 658 of the universal joint 656 is inserted into the hollow bottom of handle bar post 466. Housing 666 has body portion 668 attached to flange portion 670. The flange portion 670 is bolted to deck 12. Body portion 668 surrounds handle bar post 466 to provide structural support to the post. Handle bar post 466 is raked towards the rear end of the scooter deck 12 by means of the universal joint 658 and housing body 666. Angle $\gamma$ defined between vertical axis F-F and raked axis G-G is about 15-25 degrees, preferably about 20 degrees.

Figure 53:
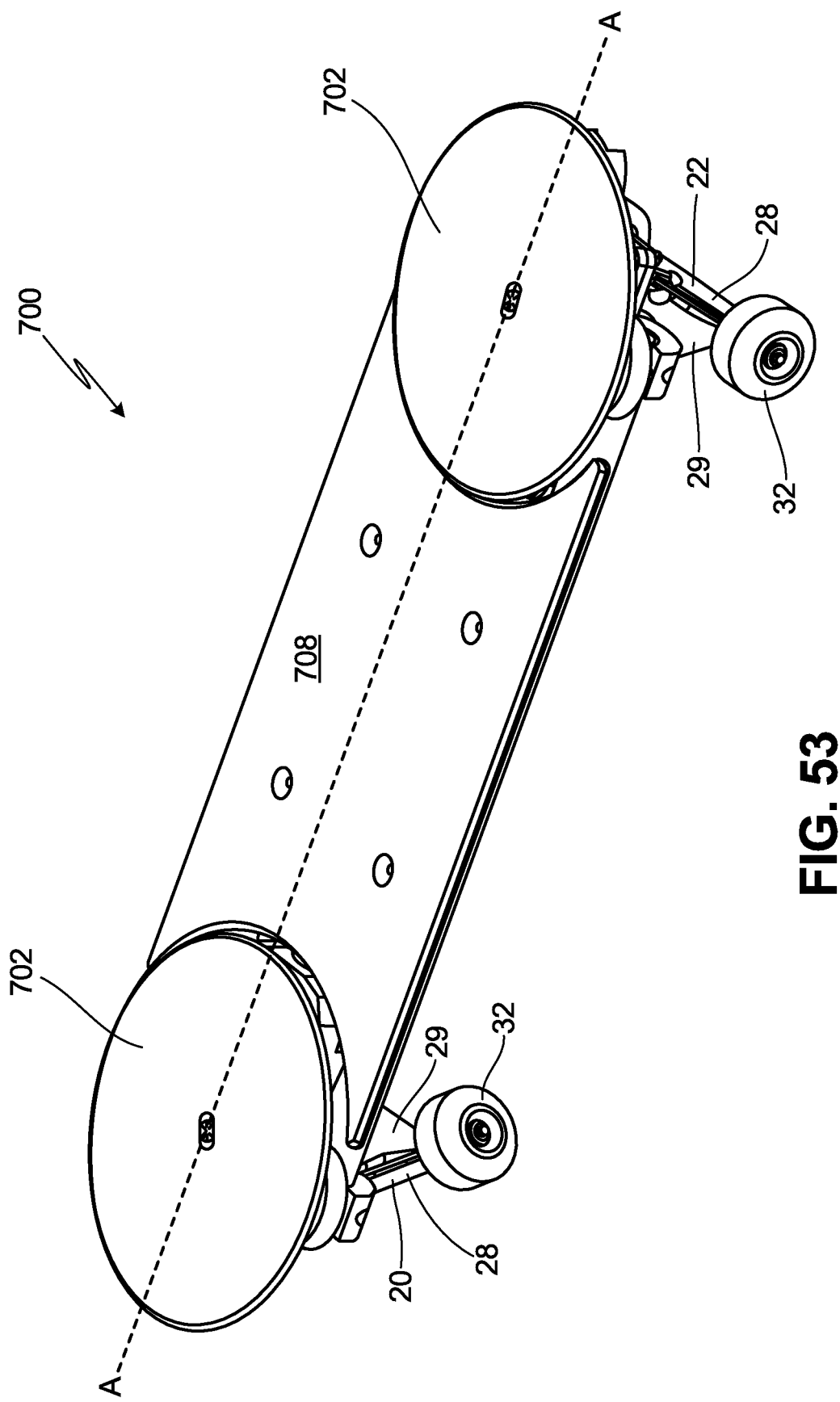
FIG. 53 is a top perspective view of a third embodiment of the roller board and its north-seeking return mechanism.
Figure 54:
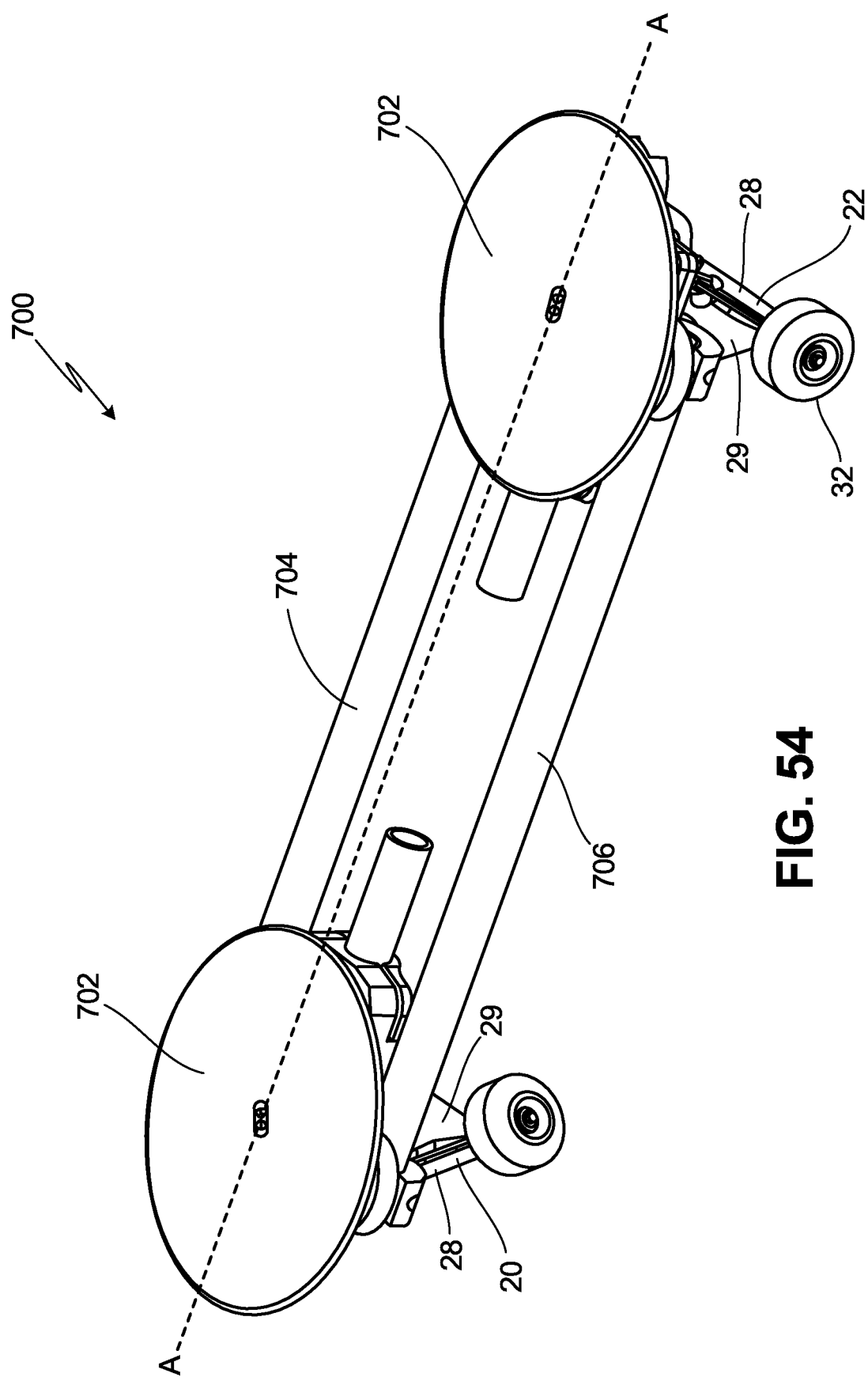
FIG. 54 is a perspective view of the third embodiment of FIG. 53, but omitting a deck from the device.
Figure 55:
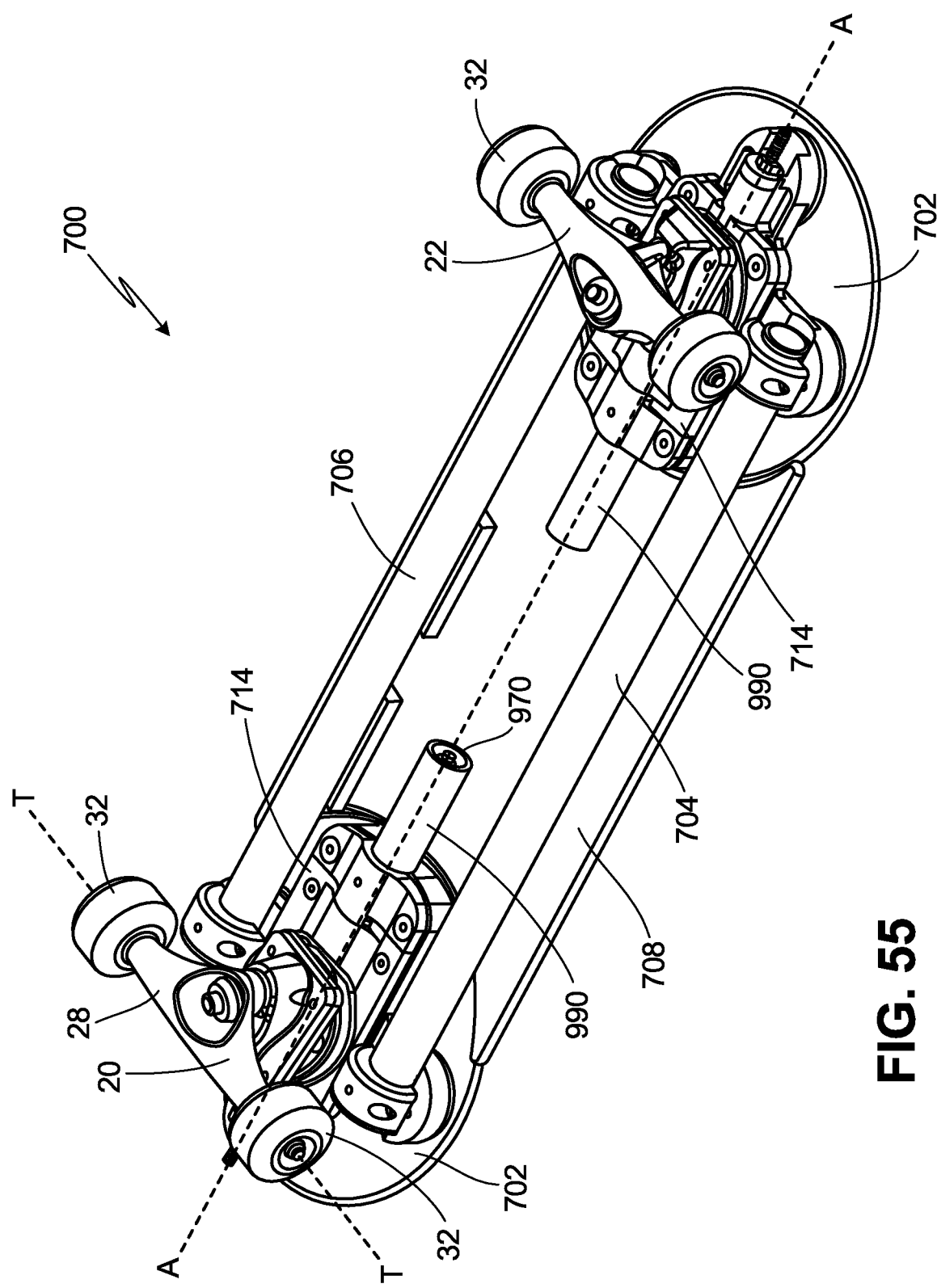
FIG. 55 is a bottom perspective view of the roller board device of FIG. 53.

An alternative, and in many cases simplified, embodiment of the skateboard 700 of the present invention is shown in FIGS. 53-55. It comprises at least one foot pad 702 that may be manipulated by the user's foot to turn a wheel assembly 20, 22 that bears the parts and structure described above. Front wheel assembly 20 may be pivotable by the user, while rear wheel assembly 22 is fixed with its transverse axle 28 defined by a transverse axis T-T which is approximately perpendicular to longitudinal axis A-A of the skateboard 700. Alternatively, both front wheel assembly 20 and rear wheel assembly 22 may be independently pivotable by the user's feet as he stands on the footpads 702.

The two wheel assemblies 20, 22 are connected to each other by means of tubes 704 and 706 to provide the structure of the skateboard 700. These tubes 704, 706 should be made from a light-weight, but sufficiently strong material like aluminum or steel that can withstand the forces applied to the wheel assemblies as the user propels the skateboard 700 along uneven terrain, or performs aerial tricks that often cause the skateboard's wheels to strike the ground, skateboard park, or other surface with a great deal of force.

The skateboard 700 may additionally include a deck 708 that is attached to the top surface of the connecting tubes 704, 706, as shown in FIGS. 53 and 55. This deck 708 can comprise the materials and dimensions described above for deck 12. But deck 708 preferably does not extend underneath foot pads 702 so as not to interfere with the user's maneuvering of the foot pads during operation of the skateboard. Alternatively, skateboard 700 can omit deck 708, as shown in FIG. 54, so that the user's feet ride the two foot pads 702 with connecting tubes 704, 706 exposed to connect the two wheel assemblies 20, 22. It has been found that inexperienced users may prefer a skateboard 700 with a deck 708 to provide a secondary region to step upon during operation of the skateboard. But, experienced users do not really need the deck 708, because they are skilled enough to maintain their feet on the foot pads 702, and prefer the deconstructed appearance of the skateboard without a deck and appreciate its reduced weight during the performance of aerial tricks.

Figure 56:
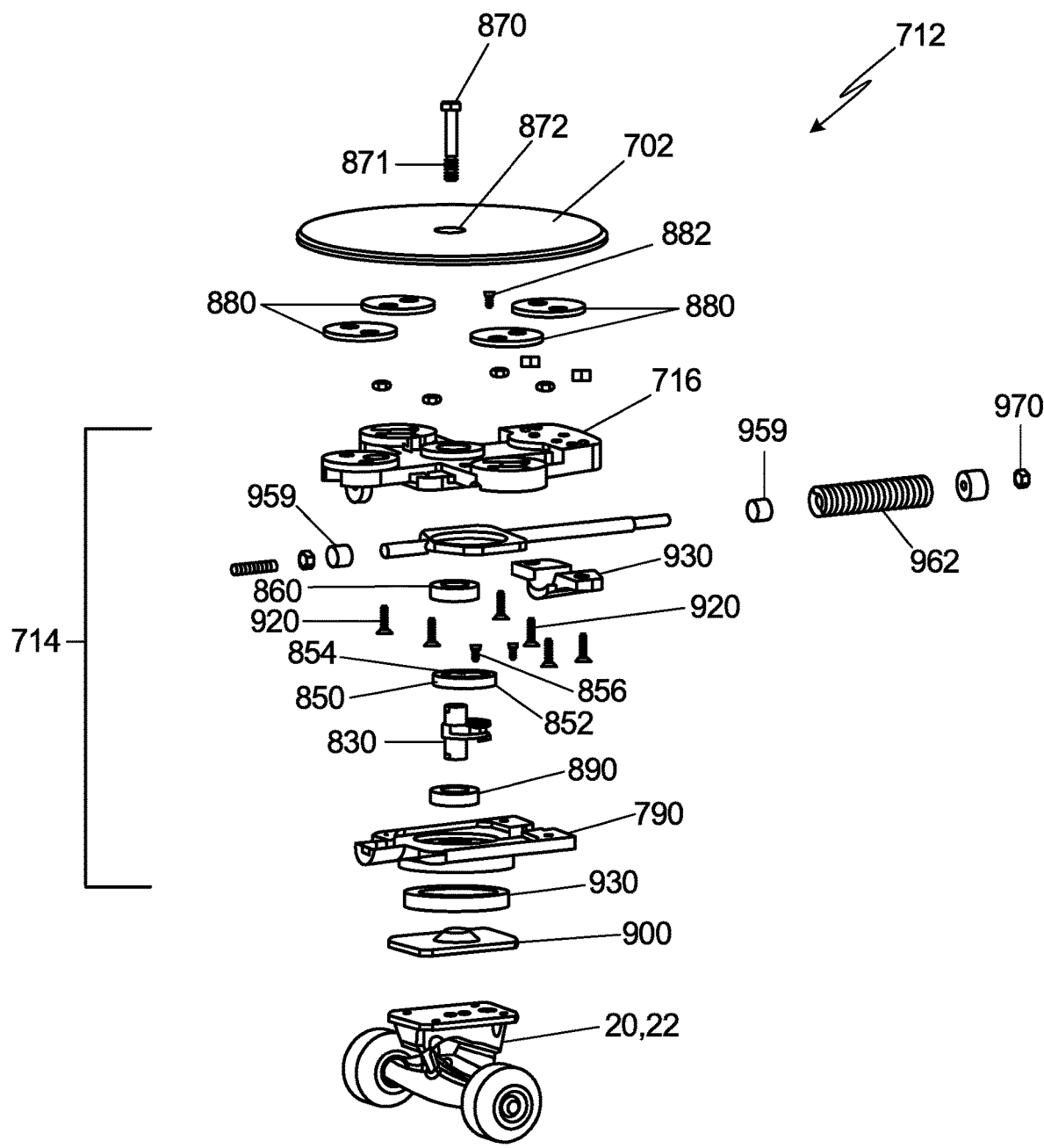
FIG. 56 is an exploded perspective view of the roller board embodiment of FIG. 53.
Figure 57:
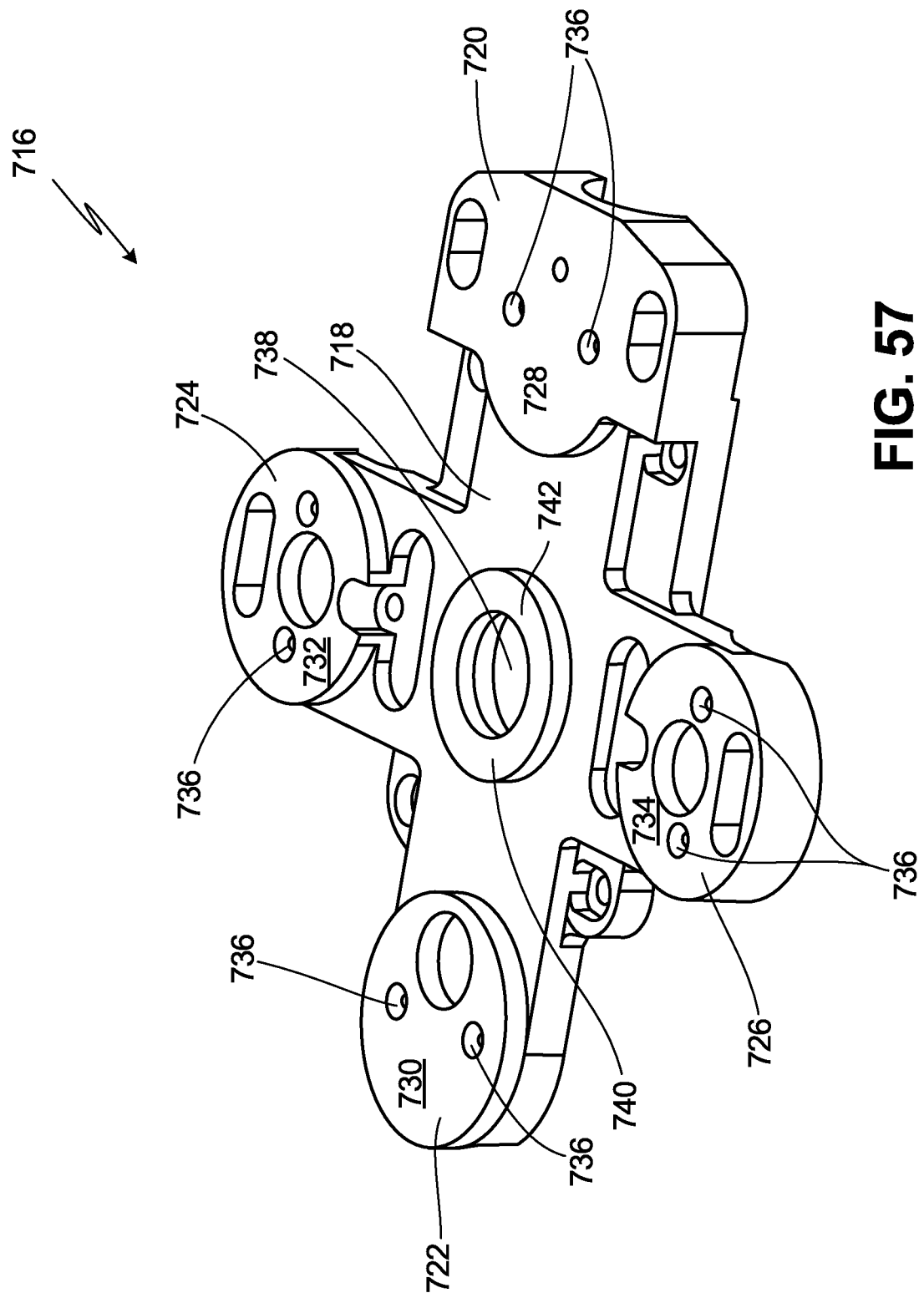
FIG. 57 is a top perspective view of the upper housing of the north-seeking return mechanism for the roller board embodiment of FIG. 53.

The skateboard assembly 712 of the present invention having user-maneuverable wheel assemblies 20, 22 and a north-seeking return mechanism 714 is shown in the exploded view of FIG. 56. The upper housing 716 for the north-seeking return mechanism 714 is shown more clearly in FIGS. 57-58. It comprises a main body 718 having a forward portion 720 that points towards the forward or rear ends of the skateboard 700 when assembled to the skateboard, depending upon whether the housing forms part of the north-seeking return mechanism 714 for the front wheel assembly 20 or the rear wheel assembly 22, respectively. The rear portion 722 of the main body 718 points towards the interior region of the skateboard for purposes of the north-seeking return mechanism 714. Wings 724 and 726 extend laterally from the main body 718.

Upper housing 716 is molded from a suitable, hardened plastic material or more preferably is made from cast or machined aluminum. Forward portion 720 features a flat planar top surface 728, while rearward portion 722 features a flat planar top surface 730. Wings 724 and 726 feature flat planar top surfaces 732 and 734, respectively. A pair of threaded holes 736 are formed in each of these flat planar surfaces. Central hole 738 passes through the center point of main body 718. Ring wall 740 extends upwardly from the top surface of main body 718 to surround central hole 738. This ring wall 740 features a flat top surface 742 that is approximately co-planar with the flat planar top surfaces 728, 730, 732, and 734.

Figure 58:
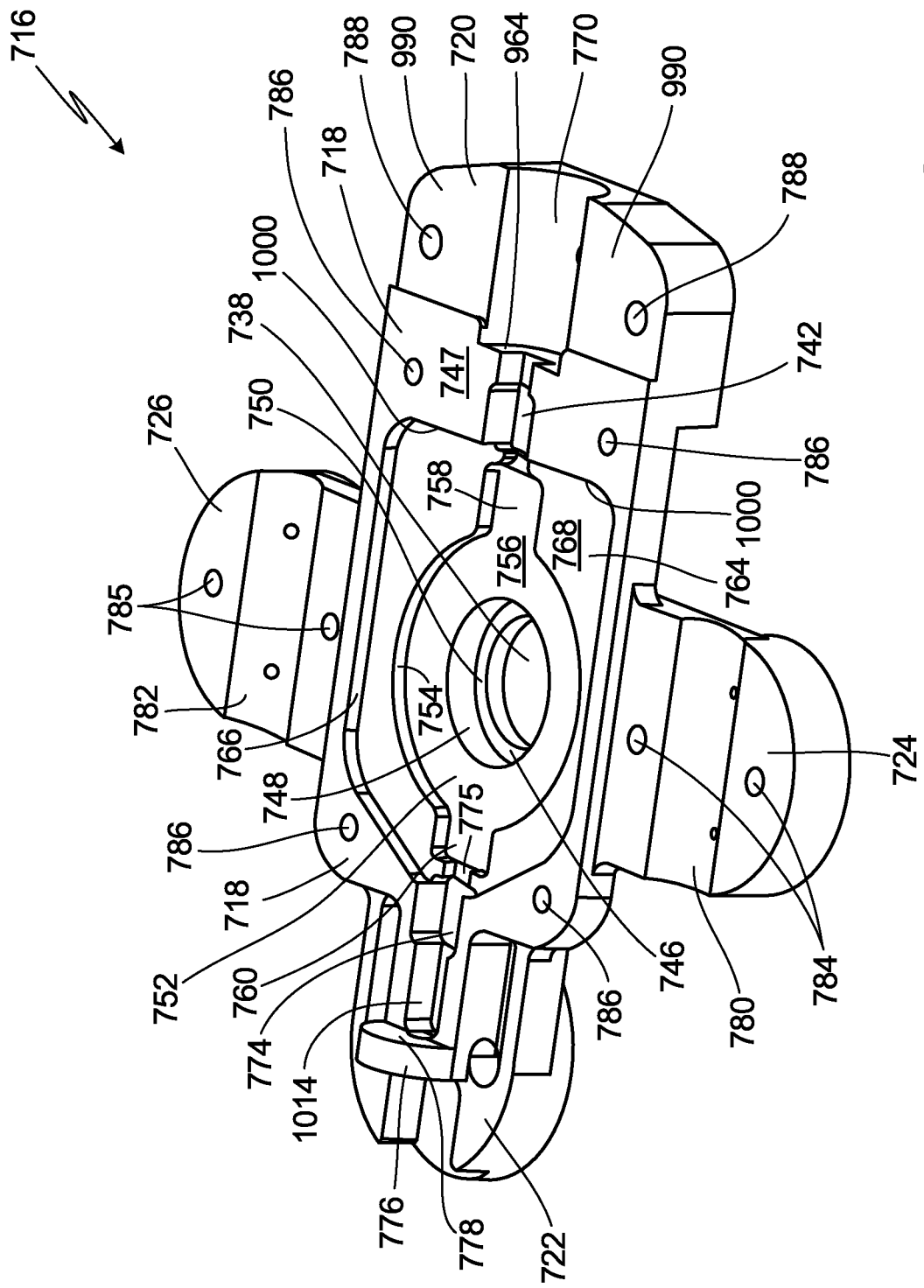
FIG. 58 is a bottom perspective view of the housing of FIG. 57.

Looking at FIG. 58 which provides a bottom view of upper housing 716, the housing's main body 718 has a flat planar bottom surface 747. Formed within the main housing body and extending upwardly from bottom surface 747 (downwardly into the page of FIG. 58) is first annular recess 746. This first annular recess is defined by a side ring wall 748 having a diameter that is greater than the diameter of central hole 738, and a bottom surface 750. The first annular recess 746, side ring wall 748 and central hole 738 are concentric. Bottom surface 750 forms a ledge for containing a bearing 860 that will be described more fully below.

Also concentric with central hold 738 is a second annular recess 752 that is formed within the upper housing main body 718 and extends upwardly from its bottom surface 747, although not as far as first annular recess 746 extends. This second annular recess 752 has a diameter that is greater than the diameter of first annular recess 746. A ring wall 754 surrounds the second annular recess, defining a flat bottom surface 756. Forward extension region 758 and rear extension region 760 also comprise part of this second annular recess 752 and are co-planar with bottom surface 756.

Finally, third recess 764 is formed within upper housing main body 718 extending immediately from the bottom surface 747, although not as far upwardly as first annular recess 746 or second annular recess 752. This third recess 764 is surrounded by perimeter wall 766 to define flat support surface 768. Third recess 764 may be any suitable shape, although a pentagonal shape is preferred. First annular recess 746, second annular recess 752, and third recess 764 are all concentric with central hole 738 of the upper housing's main body 718.

Formed within the forward portion 720 of upper housing 716 is through recess 770 that is half circular in cross-sectional shape. It communicates with third recess 764 by means of passageway 772.

Formed within rearward portion 722 of upper housing 716 is recess 774 that extends from third recess 764 via passageway 765, and terminates at bulkhead 776. A threaded hole 778 is formed within bulkhead 776 to communicate with recess 774.

Finally, half-circular recesses 780 and 782 are formed within the bottom surfaces of wings 724 and 726, respectively. Threaded holes 784 and 785 are formed within the bottom surface of wings 724 and 726, respectively.

Meanwhile, four threaded holes 786 are formed within the corners of bottom surface 747 of main body 718. Two threaded holes 788 are formed within the bottom surface of forward portion 720 of the upper housing 716. Lower housing 790 is also molded from a suitable hardened plastic material, or more preferably is made from cast or machined aluminum. The lower housing is shown more clearly in FIGS. 59-60. Looking at FIG. 59 which provides a top view, the lower housing has a top surface 792. It features extending downwardly from the bottom surface 792 a third recess 794 having a perimeter wall 800 corresponding in dimensions and the preferred pentagonal shape to the third recess 764 of upper housing. This perimeter wall 800 defines a bottom surface 796 for the third recess.

The lower housing 790 also features a second annular recess 802 having a ring wall 804 and bottom surface 806 corresponding in shape and dimensions to second annular recess 752 of upper housing 716. Finally, it features a first annular recess 808 having a ring wall 810 and bottom surface 812 forming a ledge that corresponds in shape and dimensions to first annular recess 746 of upper housing 716. Third recess 794, second annular recess 802, and first annular recess 808 are concentric with central hole 738 formed within the body of lower housing 790.

Finally, lower housing 790 has formed within it an open-ended passageway 814 at its forward end that extends from third recess 794 and corresponds in shape and dimensions to passageway 772 of upper housing 716 that extends from third recess 764. It also features an open-ended recess 816 that extends from third region 794 and has a shape and dimensions corresponding to recess 774 that extends from third recess 764 within upper housing 716. Four through holes 818 are formed within the corners of lower housing 790.

Figure 60:
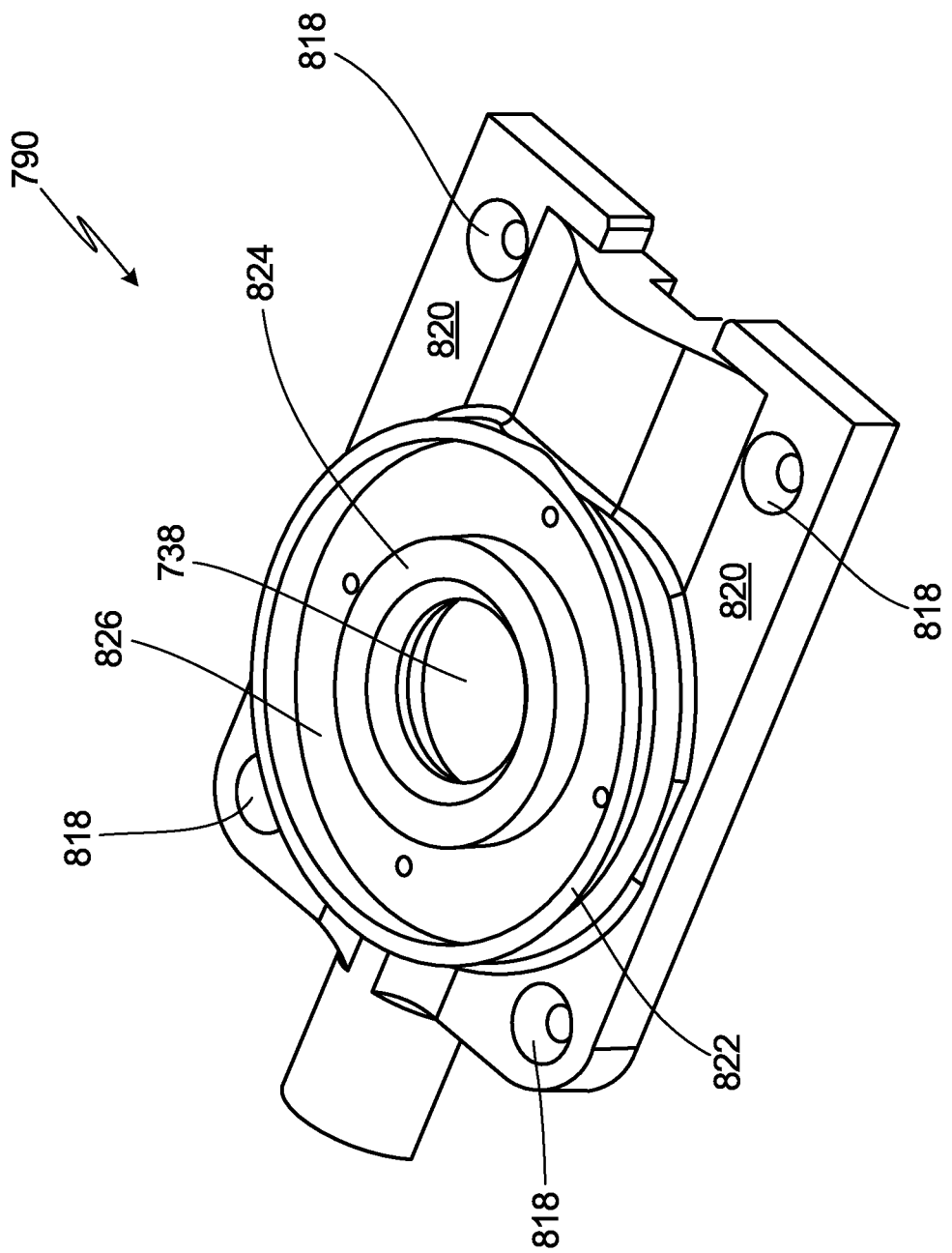
FIG. 60 is a bottom perspective view of the housing of FIG. 59.

Looking at FIG. 60 which provides a bottom view of the lower housing 790, outer ring wall 822 extends downwardly from the housing's bottom surface 820. The outer ring wall 822 and inner ring wall 824 cooperatively defines annular region 826. These ring walls are concentric with central hole 738.

Figure 61:
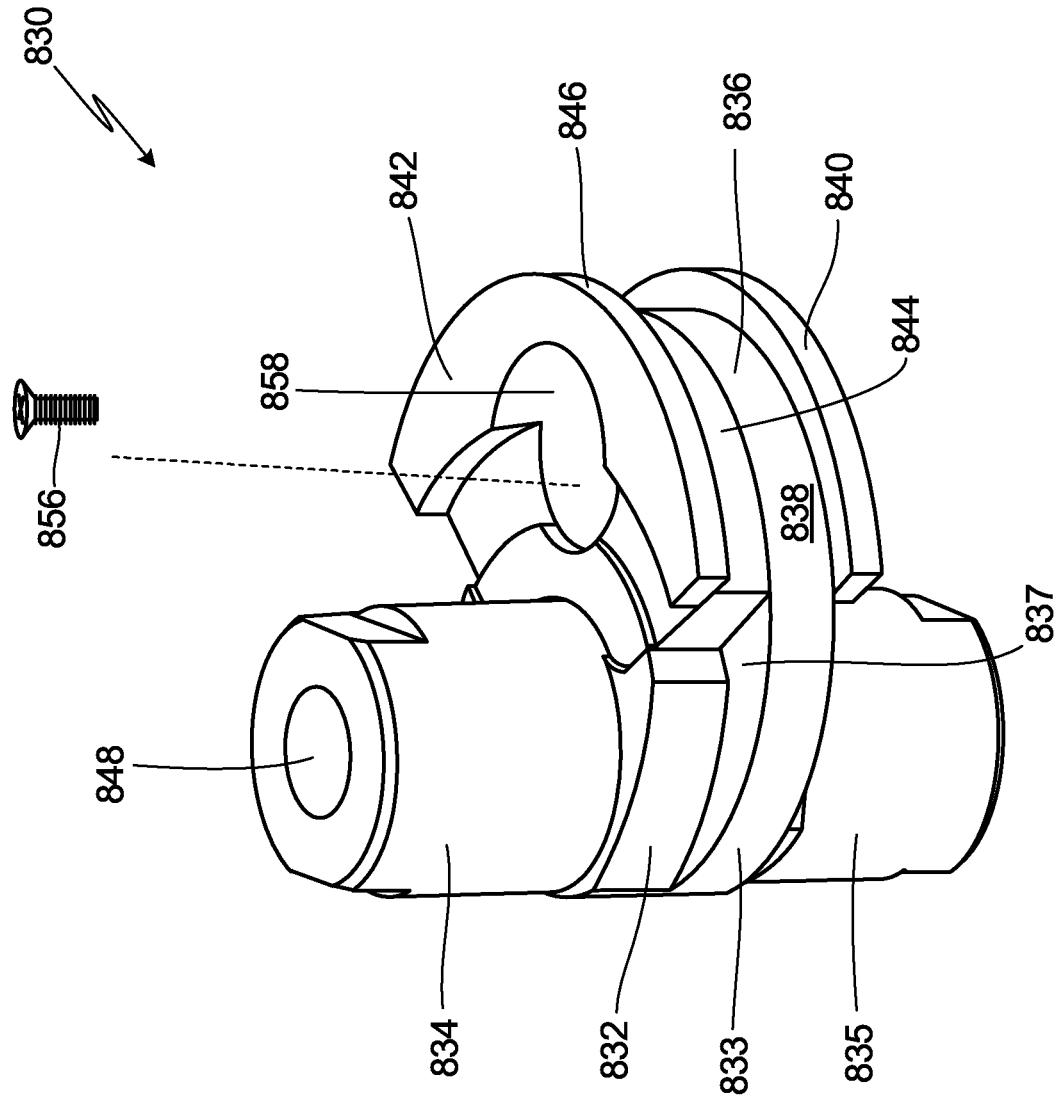
FIG. 61 is a perspective view of the crankshaft having an offset cam lobe of the north-seeking return mechanism.

Crankshaft 830 is shown in FIG. 61. It comprises a main body 832 having an upper shaft 834 and a lower shaft 835 extending therefrom. Extending laterally from the midpoint of the main body and partially around its circumference is an offset cam lobe 836 having a peripheral wall 838 and an annular skirt 840. Meanwhile, a separate mating clamp 842 has a peripheral sidewall 844 and annular skirt 846 with the same dimensions as peripheral sidewall 838 and annular skirt 840 of offset cam lobe 836. Through bore 848 passes vertically through main body 832 and its two shaft portions.

Center bearing 850 (see FIG. 56) comprises a roller bearing mechanism that is known in the art. It is preferably circular in shape having an outer ring wall called a "race" with an exterior surface 852 and an inner ring wall with an inner surface 854. The outer ring wall and inner ring wall cooperate to define an annular channel therebetween. A plurality of spherical ball bearings made from hardened steel (not shown) are positioned inside the annular channel around the perimeter of the center bearing 850. Such a roller bearing may be sourced from the Silverthin Bearings Group of Mechatronics, Inc. of Preston, Wash. The ball bearings came with the roller bearing product.

The inner wall 854 of center bearing 850 matches the circumference produced by the combined skirt 833 of crankshaft main body 832 and sidewall 838 of offset cam lobe 836. Thus, the center bearing 850 may be inserted around the peripheral walls of skirt 833 and offset cam lobe sidewall 838 with its bottom surface abutting the top surface of annular skirt 840. Clamp 842 is then inserted into the crankshaft assembly resting upon the top surface 837 of offset cam lobe 836 with the clamp's outer sidewall 844 abutting the inner surface 854 of the center bearing 850 and its annular skirt 846 abutting the top surface of the center bearing. Screw 856 passes through a hole 858 in the clamp 842 into engagement with a threaded hole (not shown) in offset cam lobe 836 to secure the clamp to the offset cam lobe, thereby holding center bearing 850 securely in place around crankshaft 830. Outer surface 852 of center bearing 850 provides a bearing surface for the north-seeking return mechanism 714, as described more fully below.

Upper bearing 860 (see FIG. 56) comprises a roller bearing mechanism similar to central bearing 850. It has an interior circumference such that it will fit around upper shaft 834 of crankshaft 830. Meanwhile, its outer circumference causes it to fit inside first annular recess 746 in the upper housing 716 with its outer circumference abutting sidewall 748 of the first annular recess and the top surface of the upper bearing abutting bottom wall surface 750 of the first annular recess. The upper portion of upper shaft 834 of crankshaft 830 extends through center hole 738 in the upper housing 716 (see FIG. 58). In this manner, upper bearing 860 causes crankshaft 830 to turn freely inside the upper housing.

Lower bearing 890 (see FIG. 56) comprises a roller bearing mechanism similar to central bearing 850 and upper bearing 860. It has an interior circumference such that it will fit around lower shaft 835 of crankshaft 830. Its outer circumference causes it to fit inside first annular recess 808 in the lower housing 790 with its outer circumference abutting sidewall 810 of the first annular recess and the bottom surface of the lower bearing 890 abutting top wall surface 812 of the first annular recess. The lower portion of lower shaft 835 of crankshaft 830 extends through center hole 738 in the lower housing 790 (see FIG. 59). In this manner, lower bearing 890 causes crankshaft 830 to turn freely inside the lower housing.

Bolt 870 is inserted through aperture 872 in foot pad 702 (see FIG. 56). The bolt then passes through central hole 738 in upper housing 716 of north-seeking return mechanism 714 and then through crankshaft 830 via vertical through channel 848 (see FIG. 61). Thus, when the user's foot turns foot pad 702 on skateboard 700 in a clockwise or counter clockwise direction, bolt 870 will cause crankshaft 830 to be turned in the same direction to the same degree of rotation.

The bottom surface of foot pad 702 rests upon support surface 728 on forward portion 720 and support surface 730 on rearward portion 722 of upper housing 716. Support surfaces 732 and 734 on wings 724 and 726, respectively, of upper housing 716 likewise help to support the foot pad. This arrangement enables a stable rotation of foot pad 702 along upper housing 716. This is important because there may be no skateboard deck extending underneath the foot pad to support it, unlike skateboard 10. Instead, embodiment 700 of the skateboard has upper housing 716 supporting the foot pad 702 in addition to containing the parts of the north-seeking return mechanism 714 described below.

A plurality of low-friction spacer pads 880 (see FIG. 56) may optionally be attached to the support surfaces 728, 730, 732, and 734 of upper housing 716 by means of screws 882. These low friction pads 880 should be made from a suitable plastic polymer material that has a low coefficient of friction. Such a material includes Delrin® (acatylhomopolymer) made by DuPont. A plurality of discrete pads may be used but alternatively a continuous ring of low-friction material that supports the circumference of food pad 702 may be employed. These spacer pads 880 act to reduce frictional drag as the user's foot rotates foot pad 702 with respect to skateboard 700 or its deck 708. Moreover, the pads 880 act to provide lateral stability to the foot pad 702 so that it does not wobble during operation with respect to the skateboard 700.

Lower housing 790 is then assembled to upper housing 716 with the lower shaft 835 of crankshaft 830 inserted into first annular recess 808 in lower housing 790 of north-seeking return mechanism 714, as described above (see FIG. 59). Second annular recess 802 in the lower 790 housing accommodates the bottom surface of center bearing 850 surrounding crankshaft 830. Meanwhile, second annular recess 752 in upper housing 716 accommodates the top surface of center bearing 850. Four screws 920 pass through the four corner holes 818 in lower housing 790 with the chamfered surfaces of lower housing bottom surface 820 accommodating the screw heads. Screws 818 engage the four threaded corner holes 786 formed in upper housing 716 to securely attach the lower housing to the upper housing with the crankshaft 830 and its three roller bearings contained therein.

The end of bolt 870 passes through center hole 738 in lower housing 790. Its threaded end 871 then is screwed into engagement with a threaded hole 902 formed in truck plate 900 (see FIG. 56). Truck plate 900 comprises a rectangular body 904 having holes 906 near its four corners. Circular ring wall 908 is integrally formed in the truck plate to extend above the rectangular body. The ring wall provides a reception area 910 to accommodate the bottom surface of lower shaft 835 of crankshaft 830 extending below lower housing 790. The threaded end 871 of bolt is attached to truck plate 900 via threaded aperture 902 formed within the truck plate inside the ring wall. Studs 912 having a head 912a and a threaded shank 912b are inserted through holes 906 to extend below the rectangular body.

Alternatively, nut 914 may be tightened around the threaded end 871 of bolt that extends below truck plate 900 (see FIG. 62). The point is to securely connect the truck plate to crankshaft 830 and foot pad 702, so that as the user turns the foot pad, the truck plate turns in a similar manner.

The wheel assembly 250 is completed by connecting truck plate 900 to base plate 254 of truck 251 by means of the threaded studs 912. The ends of the studs are inserted through holes 258 formed in the base plate 254 so that bottom surface of the rectangular body 904 of the truck plate 900 abuts top surface 256 of truck 251 (see FIGS. 23 and 3). Nuts 914 are then attached to the threaded regions of the shank 912b of the studs to securely connect the truck plate 900 to the truck 251.

Four bolts 920 are used to secure lower housing 790 to upper housing 716 via the holes 922 formed through the corners of the lower housing and the threaded holes 924 formed within the corners of the upper housing. This produces a completed assembly so that when the user's foot turns foot pad 702, the truck and wheel assembly 250 is turned in the same direction and to the same degree as the foot pad via bolt 870 that connects truck plate 900 to foot pad 702.

Friction-proof pad 930 may be inserted into annular recess 826 on the bottom surface of lower housing 790 so that it is positioned between the lower housing and truck plate 900. This pad will reduce the friction as the truck plate is turned by foot pad 702 and crankshaft 830 with respect to the stationary housing assembly that is attached to rails 704 and 706 that provide the structure for the "deck" of skateboard 700.

The skateboard 700 of the present invention has been provided with a north-seeking return mechanism 714 that will automatically return the maneuverable wheel assembly 250 back to its "true north" position in which the transverse axle 26 axis T-T is approximately perpendicular to the longitudinal axis A-A of the skateboard 700 when the user removes foot pressure from foot pad 702.

Figure 62:
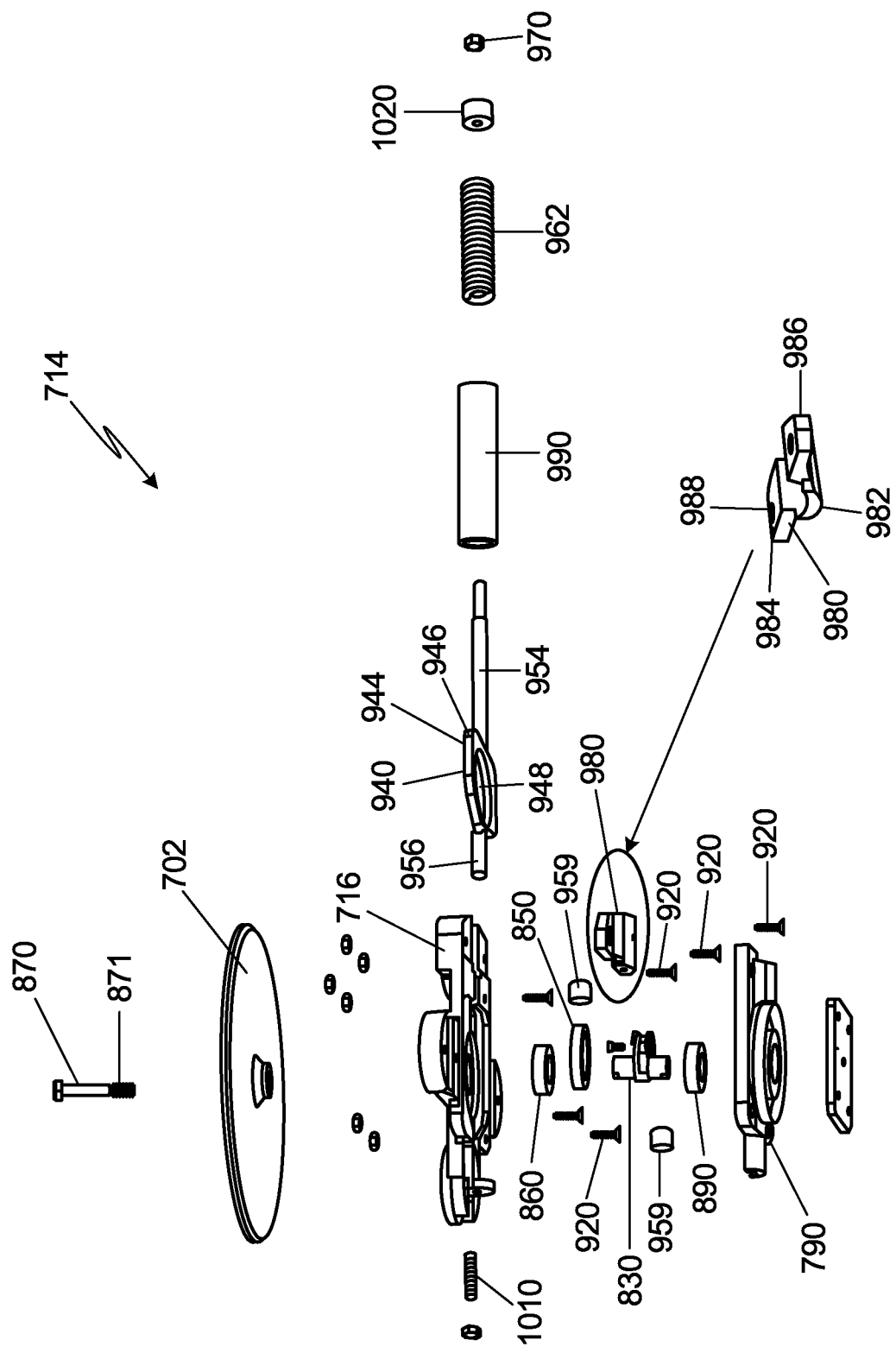
FIG. 62 is an exploded perspective view of the north-seeking return mechanism.

As shown more clearly in FIG. 62, Scotch yoke 940 comprises a flat main body 942 having a leading edge 944 and a trailing edge 946. An open window region 948 is formed within main body 942 having a forward bearing surface 950 and a rearward bearing surface 952 (see FIG. 63). Extending laterally from the trailing edge is piston shaft 954 which is preferably cylindrical in shape. This piston shaft 954 features a distal end portion 953 having a reduced diameter to define a shoulder 955. Extending laterally from leading edge 944 of the Scotch yoke is guide shaft 956 which is also preferably cylindrical in shape.

Figure 64:
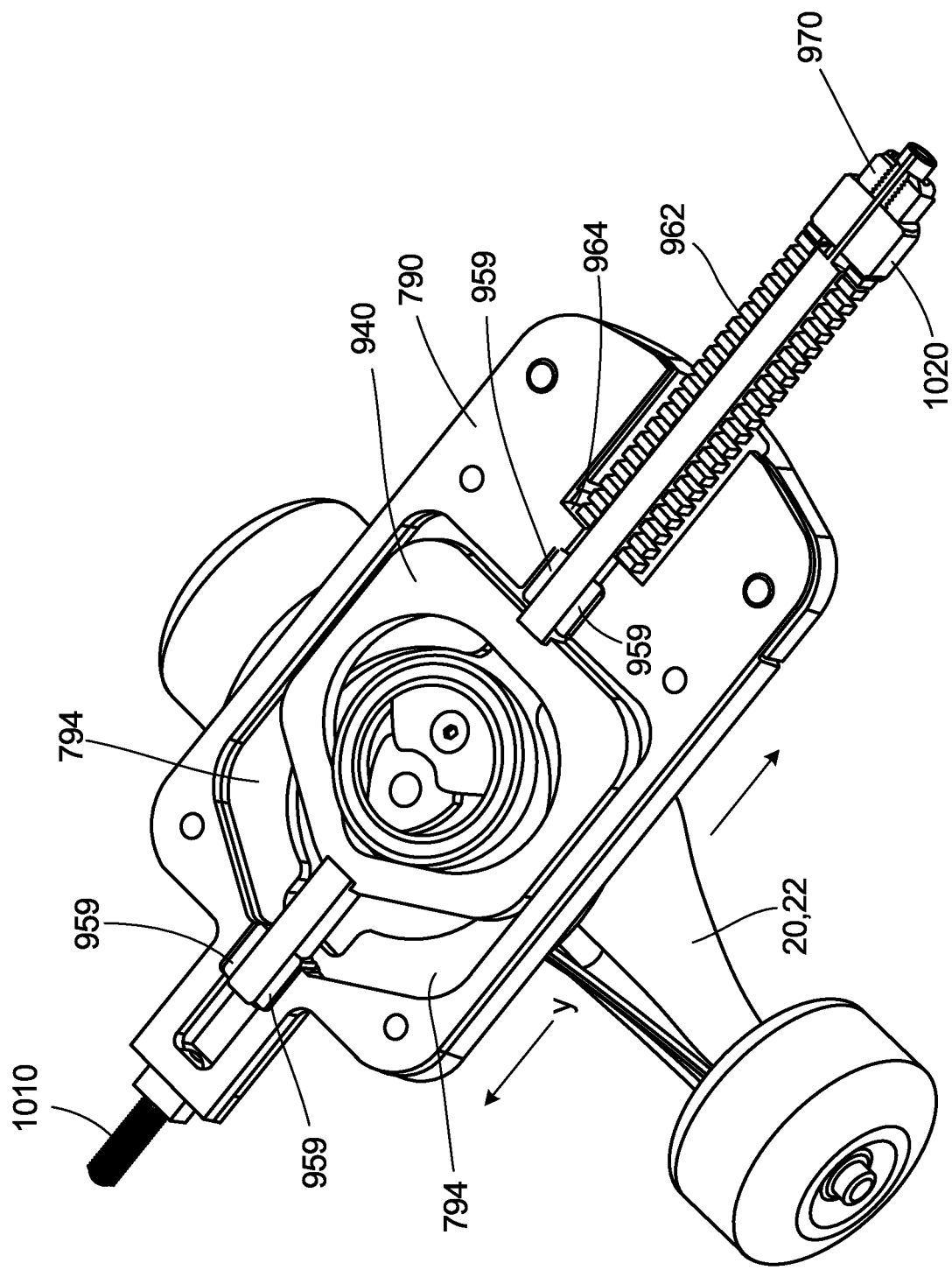
FIG. 64 is a top perspective view of the lower housing and wheel assembly with the Scotch yoke inserted into the housing, and the upper housing removed for ease of viewing.

FIG. 64 shows lower housing 790 of the north-seeking return mechanism 714 with Scotch yoke 940 inserted inside it in the standby position. The Scotch yoke fits within third recess 794 of the lower housing 790 and third recess 764 of upper housing 716 when the two housings are assembled. These two third recesses cooperate to form a chamber 960 in which the Scotch yoke moves along the y-y axis (see FIG. 64). Meanwhile, guide shaft 956 of Scotch yoke 940 fits inside recess 816 of lower housing 790 and recess 774 of upper housing. Piston shaft 954 of the Scotch yoke fits inside recess 814 of lower housing 790 and recess 772 of upper housing 716, as shown in FIG. 64.

The width $W_2$ of cooperating third recesses 794 and 764 is slightly larger then the width $W_1$ of the Scotch yoke so that the Scotch yoke undergoes stable movement along the y-y axis without sideways wobble. The length $L_2$ of the cooperating third recesses 794 and 764 is greater than the length $L_1$ of the Scotch yoke to provide room within chamber 960 for the Scotch yoke to move along the y-y axis (see FIGS. 59 and 63). Bushings 959 are inserted inside recess 772 and recess 774 in upper housing 716 and recesses 814 and 816 in lower housing 790 to reduce the friction produced by the Scotch yoke 940 as it travels within chamber 960.

Compression spring 962 is positioned around piston shaft 954 with its one end abutting end wall 964 of recess 770 of upper housing 716 (see FIG. 58), and end wall 966 of lower housing 70 (see FIG. 59) and as supported by bracket 980 that is attached to upper housing 716. The other end of compression spring 962 abuts adjustment nut 968 which is threadably connected to the distal end 953 of the piston shaft 954 of Scotch yoke 940, as shown in FIGS. 63 and 64. The nut 970 may be used to quickly and conveniently adjust the force load applied to the compression spring inside the north-seeking return mechanism 714. A bushing 1020 may be interposed around the distal end 953 of piston shaft 954 between compression spring 962 and the nut 970 to provide greater surface area for the nut to exert force upon the compression spring.

Clamp 980 (see FIGS. 56 and 62) comprises an arced central body 982 and two flat wings 984 and 986 attached to opposite sides of the central body with holes 988 formed within the wings. Clamp 980 is attached to the lower surface 990 of upper housing 716 by means of screws 992 that fit through holes 988 in the clamp and threadably engage holes 924 in the upper housing (see FIG. 58). The arced region of clamp 980 and arced recess 770 of the upper housing 716 cooperate to hold in place tube 990. This tube extends from the assembled upper housing 716 and lower housing 790 of the north-seeking return mechanism 714 to provide lateral support for the piston Scotch yoke shaft 954 and compression spring 962, as shown more clearly in FIG. 66.

Figure 65:
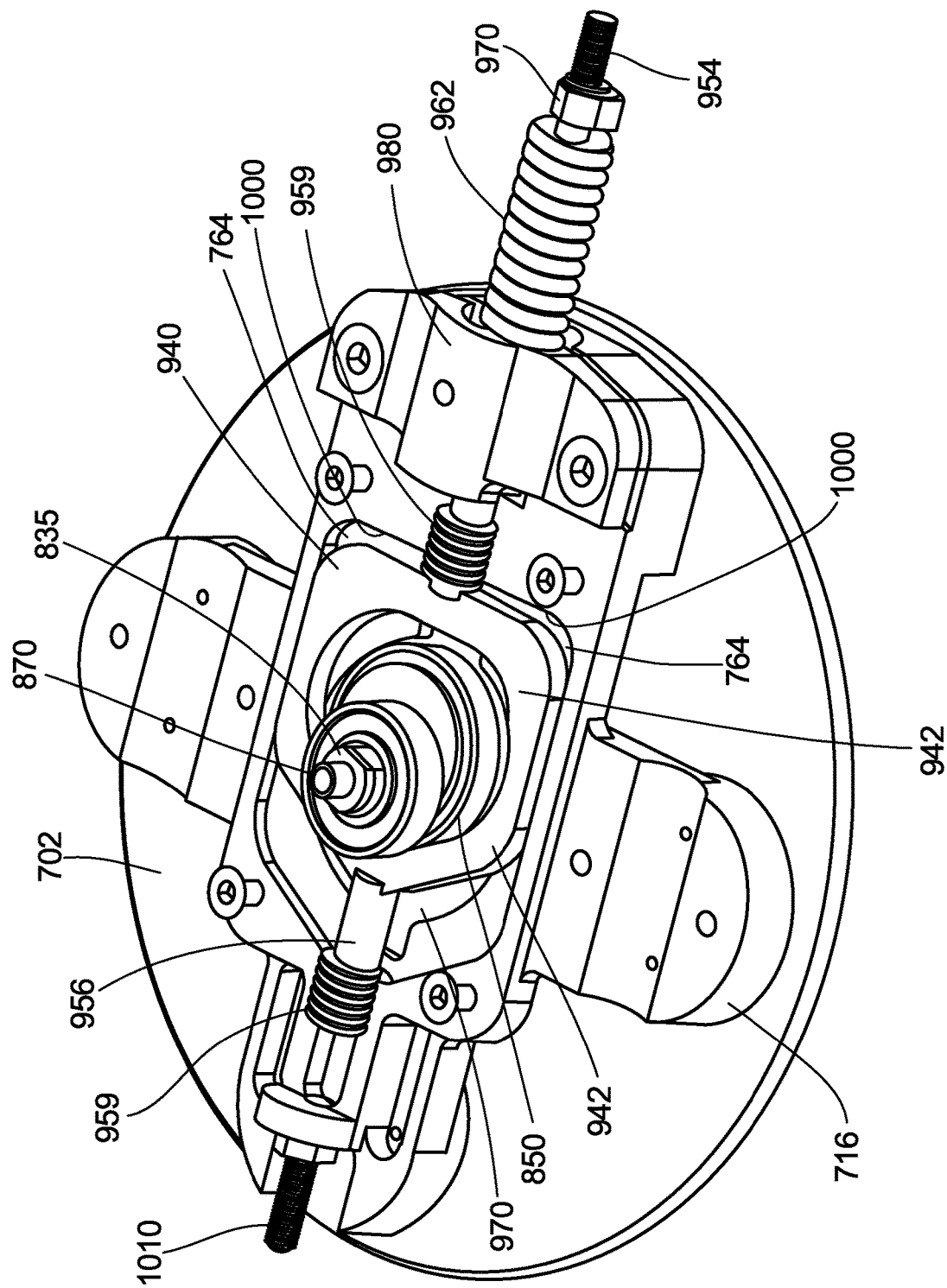
FIG. 65 is a cut-away view of the north-seeking return mechanism in its standby "true north" position.
Figure 66:
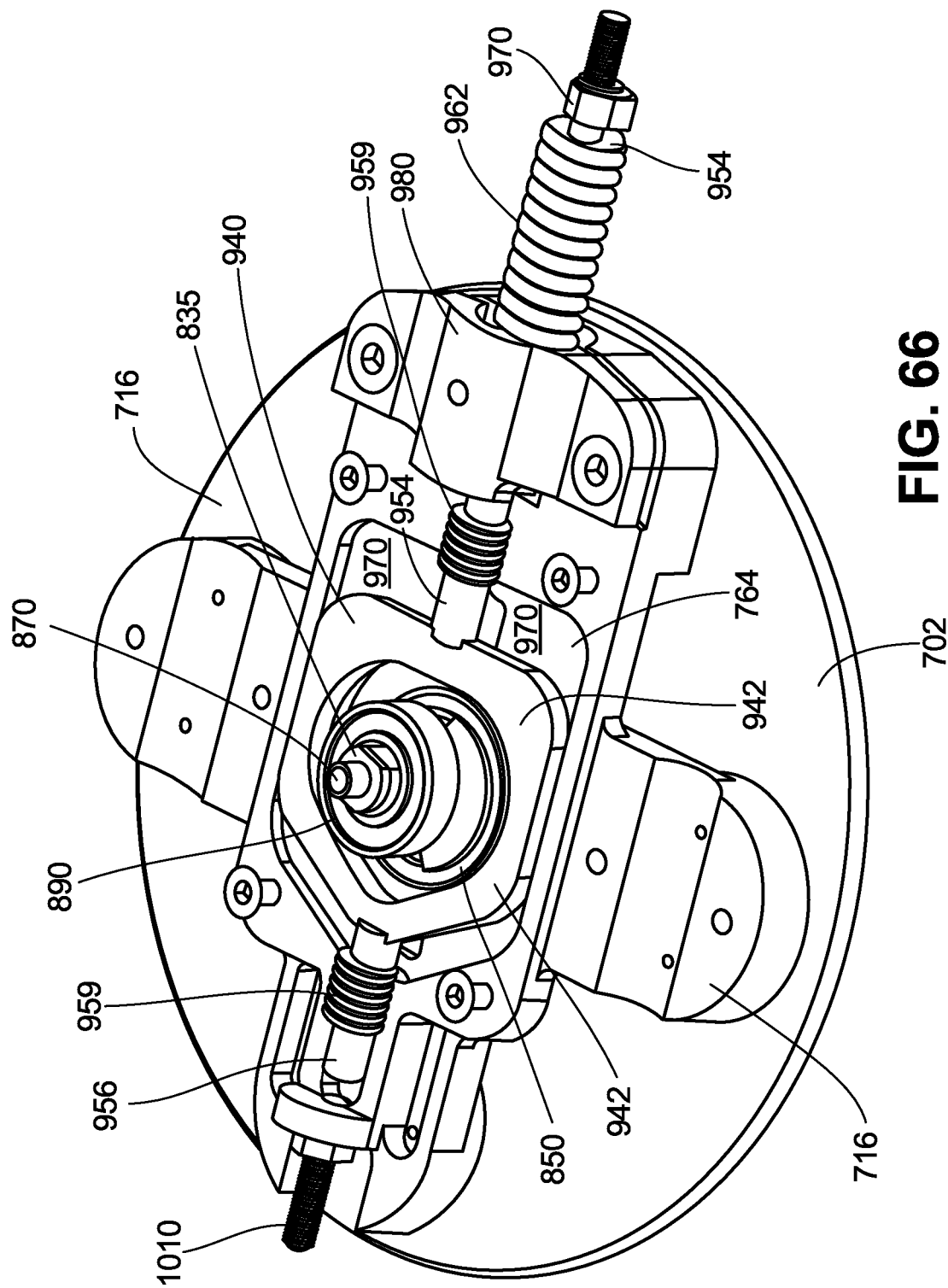
FIG. 66 is a cut-away view of the north-seeking return mechanism in its partially-turned position.
Figure 67:
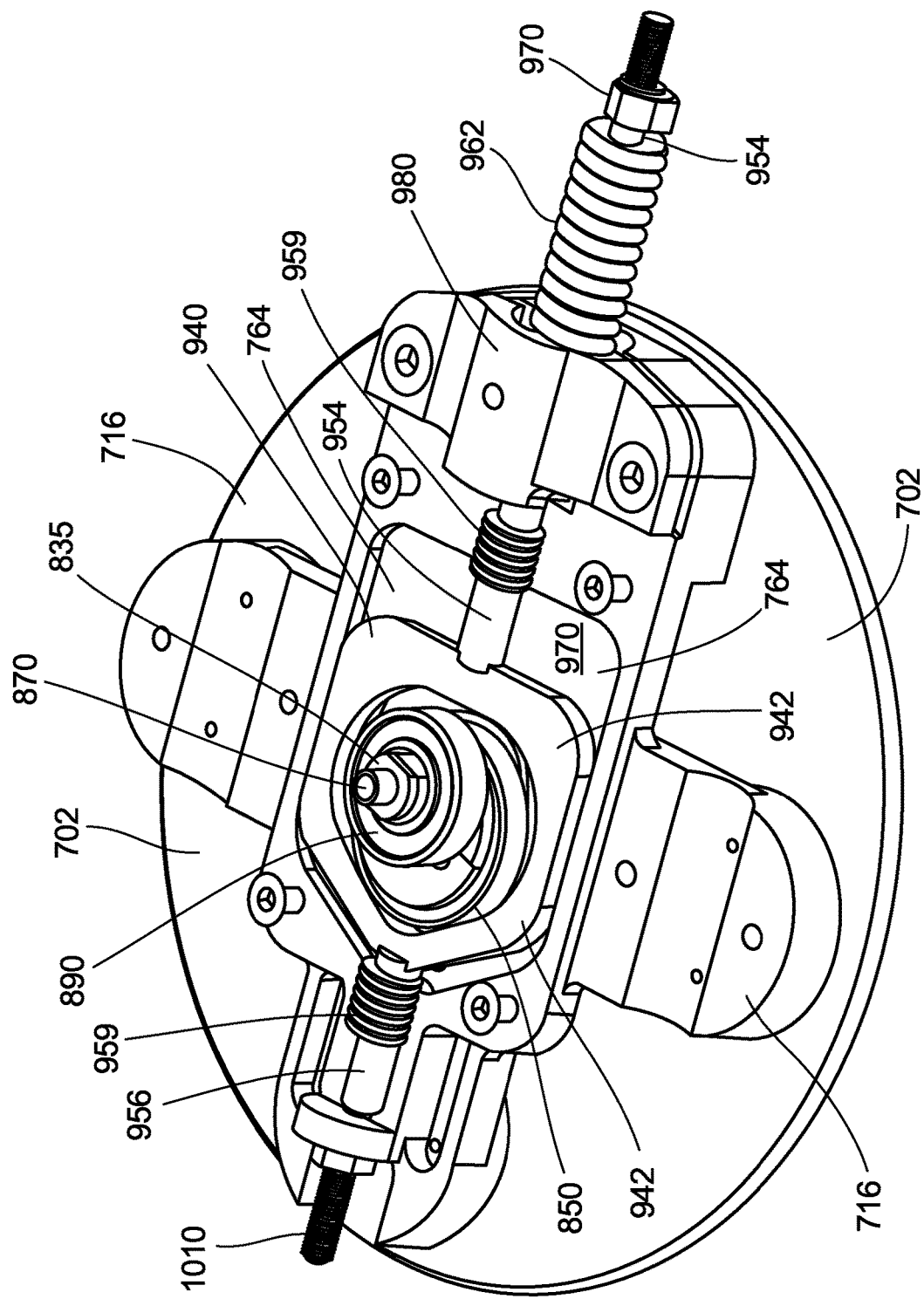
FIG. 67 is a cut-away view of the north-seeking return mechanism in its further-turned position.
Figure 68:
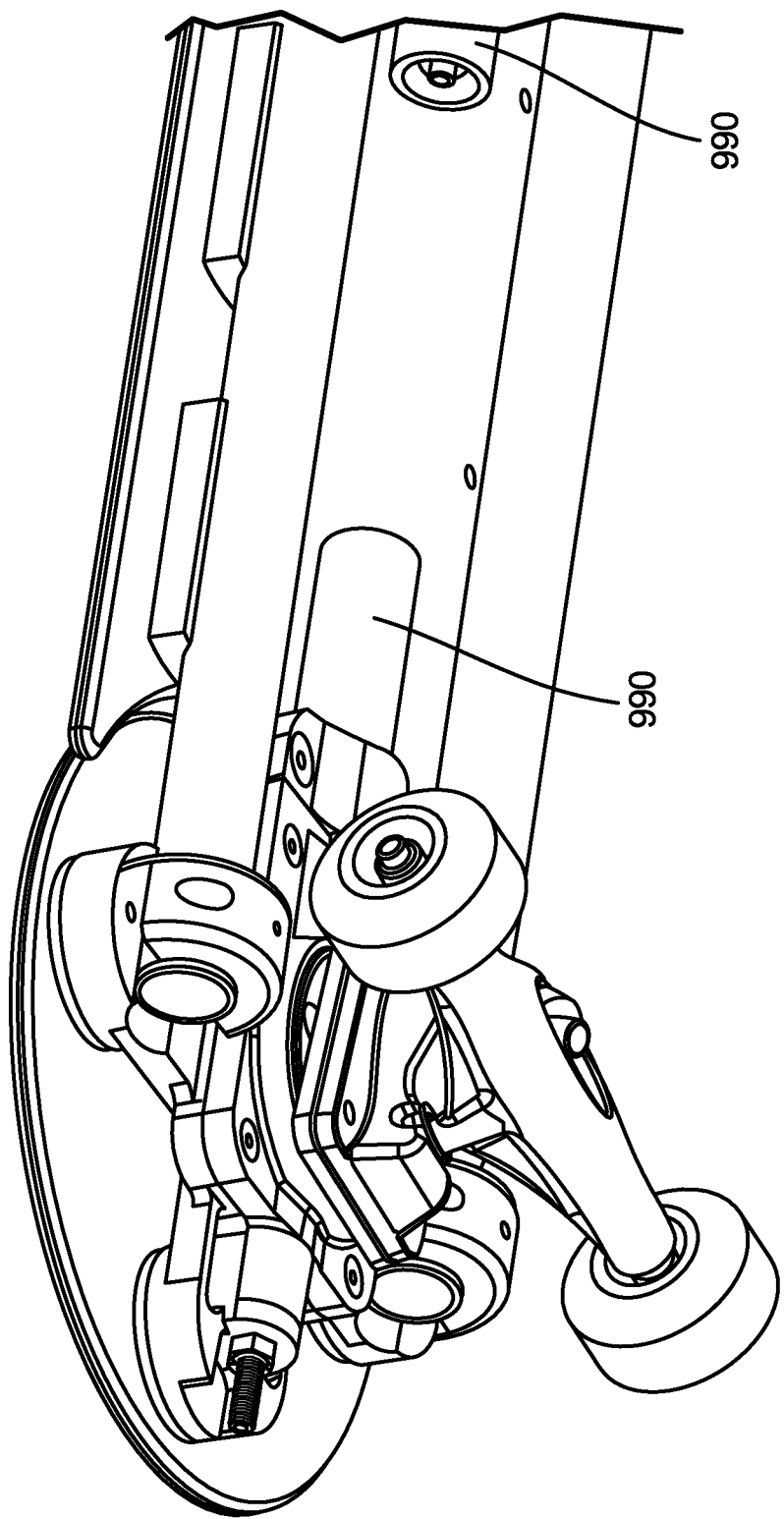
FIG. 68 is a bottom partial perspective view of the roller board device of FIG. 53.

FIGS. 65-67 show an upside-down view of the upper housing 716 attached to the foot pad 702 with the Scotch yoke 940 inside chamber 970, and lower housing 790 removed for ease of view. In the standby position of FIG. 65, Scotch yoke 940 is positioned towards end wall 1000 of sidewall 766 of third recess 764 (see FIGS. 58 and 65), which is to the right end of the chamber as shown in FIG. 65. Compression spring 962 is fully extended between abutment surface 964 of recess 770 and nut 970 (and busing 1020 if it is used). Offset cam lobe 836 of crankshaft 830 is positioned so that center bearing 850 abuts bearing surfaces 950*a* and 950*b* of the open window 948 of Scotch yoke 940 into which the crankshaft 830 extends.

As the user's foot turns the foot pad 702 in a counterclockwise direction, crankshaft 830 is similarly rotated so that offset cam lobe 836 and center bearing 850 bear against longitudinal sidewall 1002 of the main body 832 of the crankshaft. This will cause the Scotch yoke 940 to move along axis y-y within third recess 764 and chamber 960 produced by the cooperating upper housing 716 and lower housing 790. Piston shaft 954 will likewise move to cause nut 970 and bushing 1020 to compress spring 962.

As the user's foot continues to turn foot pad 702 in the counterclockwise direction, the offset cam lobe 836 of crankshaft 830 will move to the retracted position shown in FIG. 67 with the Scotch yoke 940 moved towards the left end of the chamber. Piston shaft 954 will further cause nut 970 and bushing 1020 to compress spring 962. Note that the symmetrical design will produce the same effect on crankshaft 830 if the user turns the foot pad 702 in the clockwise direction.

When the user removes his foot from foot pad 702, the stored energy in compressed spring 962 will be released so that the spring extends back to its extended position shown in FIG. 65. The spring will push against bushing 1020 and nut 970 along piston shaft 954 to return Scotch yoke 940 to its standby position sown in FIG. 65. V-notch 951 formed within the insidewall of main body 942 of Scotch yoke 940 will assist in offset cam lobe 836 and central bearing 850 returning reliably to the "true-north" position. This will cause the axle of wheel assembly 20, 22 to once again be positioned along axis T-T that is approximately transverse to longitudinal axis A-A of the skateboard 700.

Nut 970 may be tightened or loosened by the user along a threaded end portion 953 of piston shaft 954 to conveniently increase or decrease the compression load on compression spring 962. Increasing the compression load will increase the speed with which Scotch yoke 940 is returned to its standby position shown in FIG. 65 with the wheel assembly 20, 22 in its true-north position. The nut 970 may be readily accessed within tube 990 (see FIG. 55) so that this compression force can be conveniently adjusted without the need to open up the housings for true-north seeking mechanism 714.

Figure 59:
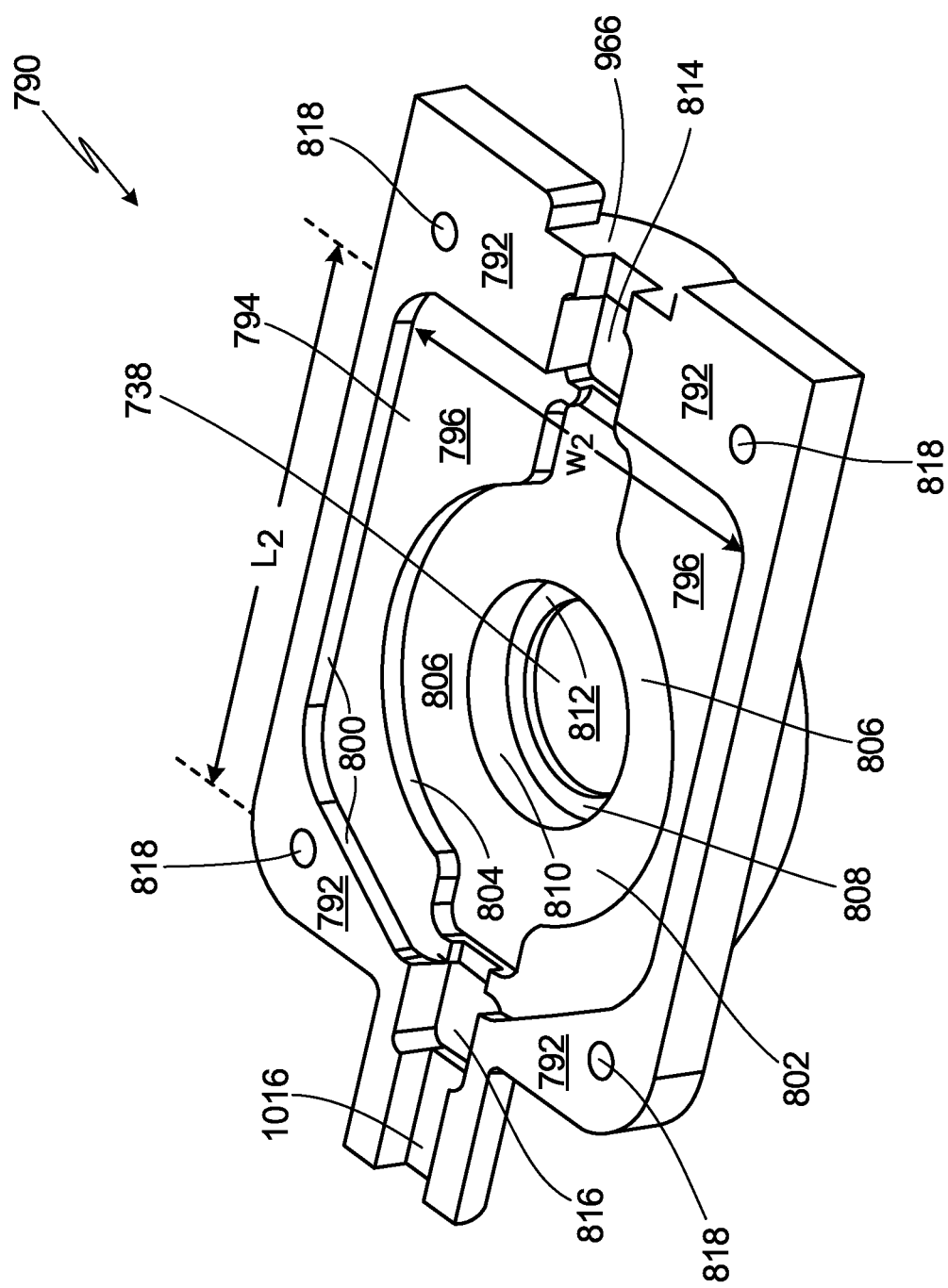
FIG. 59 is a top perspective view of the upper housing of the north-seeking return mechanism for the roller board embodiment of FIG. 53.

Set screw 1010 extends into a chamber 1012 defined by recess 1014 in upper housing 716 and recess 1016 in lower housing (see FIGS. 58 and 59). This set screw threadably engages a threaded opening 778 in end wall 776 of recess 1014 of the upper housing 716. As the set screw is rotated by the user to extend into chamber 1012, it will block the movement of forward shaft 956 of Scotch yoke 940 within chamber 1012. By limiting the forward movement of the Scotch yoke in chamber 970 in this manner, this mechanism can be used to limit the permissible degree of rotational movement of crankshaft 830 and wheel assembly 20, 22 via foot pad 702 that is attached to the crankshaft. Beginning skateboards may particularly benefit from a truck assembly with a reduced arc of rotational movement. Again, this set screw 1010 may be conveniently accessed by the user since it extends outside of housings 716, 790 without any need to disassemble the housings.

The design of this third embodiment 700 of the roller board invention reduces the number of parts and resulting complexity found in the first embodiment 10. The upper bearing housing and lower bearing housing for holding the upper and lower bearings have been eliminated. The piston rod forms part of the Scotch yoke, instead of having to employ two separate piston rods. Unlike the first embodiment for the roller board 10 and much of the prior art, a single compression spring is used instead of two separate compression springs. The housing design for this third embodiment allows the single compression spring 962 to apply its force uniformly across the width of the Scotch yoke that moves within the housing chamber without sideways wobble. Normally, two compression springs would be required to exert force against the left and right portions of the Scotch yoke. Finally, the third embodiment 700 of the roller board design employs a unitary crankshaft with an offset cam lobe instead of the crankshaft 140 having a drive peg and separate crankshaft receptor 200 of the first embodiment 10.

The above specification and associated drawings provide a complete description of the structure and operation of the skateboard having user-maneuverable trucks and a north-seeking return mechanism of the present invention. Many alternative embodiments of the invention can be made without departing from the spirit and scope of the invention. Therefore, the invention resides in the claims herein appended.

What is claimed is:

1. A roller board device operated by a user with one or more user-maneuverable wheel assemblies that are automatically returned to their "true north" position, comprising:
   (a) an elongated structure having a longitudinal axis, the elongated structure having a top surface and a bottom surface;
   (b) at least one wheel assembly comprising a truck and axle with at least one wheel rotatably mounted to the axle;
   (c) a rotation assembly operatively attached to the elongated structure, one end of the rotation assembly being connected to the wheel assembly positioned below the elongated structure, the other end of the rotation assembly being connected to a user interface member extending upward beyond the top surface of the elongated structure;
   (d) a north-seeking return mechanism secured to the elongated structure, the north-seeking return mechanism having a housing containing a Scotch yoke that is moved along a linear axis between a standby position and a retracted position within the housing, and having a single piston rod extending from the Scotch yoke and engaging a spring disposed between a distal end of Scotch yoke and an exterior wall of the housing, the rotation assembly operatively connected to the Scotch yoke to convert rotational movement of the user interface member into linear movement of the Scotch yoke;
   (e) wherein in its true-north position, the axle of the wheel assembly is substantially transverse to the longitudinal axis of the elongated structure with the Scotch yoke in its standby position along the linear axis inside the north-seeking return mechanism housing;
   (f) wherein when the user applies rotational force to the user interface member to turn it to the left or right, the rotation assembly and wheel assembly are rotated in the same direction and degree to allow the roller board device to be turned, the rotated rotation assembly interacting with the Scotch yoke of the north-seeking return mechanism to move the Scotch yoke along its linear axis to a retracted position to compress the spring; and
   (g) wherein when the user releases the rotational force upon the user interface member, the spring extends from its compressed state to its elongated state to move the Scotch yoke of the north-seeking return mechanism back along the linear axis from its retracted position to its standby position, counter interacting with the rotation assembly to return the wheel assembly of the roller board device to its true north position.

2. The roller board device of claim 1 further comprising a preload enhancer positioned along the piston rod for shortening the length of the spring when it is in its standby state.

3. The roller board device of claim 2, wherein the preload enhancer comprises an adjustable nut.

4. The roller board device of claim 1, wherein the spring comprises a compression spring.

5. The roller board device of claim 1, wherein the user interface member comprises a disk-shaped foot pad for engagement by a foot of the user.

6. The roller board device of claim 4 further comprising at least one low-friction pad attached to the bottom surface of the foot pad to reduce friction and enhance lateral stability as the foot pad is turned with respect to the housing of the roller board.

7. A roller board device operated by a user with one or more user-maneuverable wheel assemblies that are automatically returned to their "true north" position, comprising:
   (a) an elongated structure having a longitudinal axis, the elongated structure having a top surface and a bottom surface;
   (b) at least one wheel assembly comprising a truck and axle with at least one wheel rotatably mounted to the axle;
   (c) a rotation assembly attached to the elongated structure, one end of the rotation assembly being connected to the wheel assembly positioned below the elongated structure, the other end of the rotation assembly being connected to a user interface member extending upward beyond the top surface of the deck;
   (d) a north-seeking return mechanism secured to the elongated structure, the north-seeking return mechanism having a housing containing a Scotch yoke that is moved along a linear axis between a standby position and a retracted position with the housing, and having a single piston rod extending from the Scotch yoke, the north-seeking return mechanism also having a unitary crankshaft with an offset cam lobe, a single spring being disposed along the piston rod between an exterior surface of the housing and a bushing or nut, the rotation assembly operatively connected to the crankshaft to convert rotational movement of the user interface member into linear movement of the Scotch yoke within the housing via the offset cam lobe of the crankshaft;

(e) wherein in its true north position, the axle of the wheel assembly is substantially transverse to the longitudinal axis of the elongated structure with the Scotch yoke in its standby position along the linear axis inside the north-seeking return mechanism housing;

(f) wherein when the user applies rotational force to the user interface member to turn it to the left or right, the rotation assembly and wheel assembly are rotated in the same direction and degree to allow the roller board device to be turned, the rotated rotation assembly interacting with the crankshaft of the north-seeking return mechanism to move the Scotch yoke along its linear axis to a retracted position to compress the spring; and (g) wherein when the user releases the rotational force upon the user interface member, the spring extends from its compressed state to its elongated state to move the Scotch yoke of the north-seeking return mechanism back along the linear axis from its retracted position to its standby position, counter interacting with the rotation assembly to return the wheel assembly of the roller board device to its true north position.

8. The roller board device of claim 7 further comprising a bushing along the piston rod for providing a bearing surface for interacting with the spring.

9. The roller board device of claim 7, wherein the spring comprises a compression spring.

10. The roller board device of claim 1 further comprising a planar deck attached to the top surface of the elongated structure.

11. The roller board device of claim 7, wherein the rotation assembly further comprises at least one roller bearing.

12. The roller board device of claim 7, wherein the roller board device comprises a skateboard.

13. The roller board device for claim 7, wherein the roller board device comprises a scooter.

14. The roller board device of claim 7, comprising a first user-maneuverable wheel assembly operatively mounted to a forward position along the deck, and a second user-maneuverable wheel assembly operatively mounted to a rearward position along the elongated structure.

15. The roller board device of claim 7, wherein the user interface member comprises a disk-shaped foot pad for engagement by a foot of the user.

16. The roller board device of claim 13, wherein the user interface member comprises a handle bar connected to a vertical shaft extending above the deck.

17. The roller board device of claim 16, where the vertical shaft is raked to extend at an angle above the deck from the front end of the deck towards a user riding the scooter.

18. The roller board device of claim 14, wherein the two user-maneuverable wheel assemblies may be turned by the user independently of each other.

19. The roller board device of claim 7, wherein the elongated deck comprises a small front deck and a small rear deck connected to each other by means of a tubular structure, a first wheel assembly being rotatably connected to front deck, and a second wheel assembly being rotatably connected to the rear deck.

* * * * *